United States Patent [19]

MacLeay et al.

[11] 4,069,377

[45] Jan. 17, 1978

[54] POLYMERIZATION OF ETHYLENICALLY UNSATURATED MONOMERS EMPLOYING SECONDARY-ALIPHATIC α-SUBSTITUTED AZOALKANES

[75] Inventors: Ronald Edward MacLeay, Williamsville; Chester Stephen Sheppard, Tonawanda, both of N.Y.

[73] Assignee: Pennwalt Corporation

[21] Appl. No.: 695,495

[22] Filed: June 14, 1976

Related U.S. Application Data

[62] Division of Ser. No. 453,447, March 21, 1974, Pat. No. 4,025,502.

[51] Int. Cl.$^2$ .................... C08F 4/04; C08F 12/02; C08F 112/02

[52] U.S. Cl. .................... 526/218; 260/2.5 N; 526/209; 526/211; 526/219; 526/344; 526/346

[58] Field of Search .............. 526/219, 218, 211, 209, 526/344, 346

[56] References Cited

U.S. PATENT DOCUMENTS

| | | | |
|---|---|---|---|
| 3,917,744 | 11/1975 | MacLeay et al. | 526/219 |
| 3,931,143 | 1/1976 | MacLeay et al. | 526/219 |
| 3,956,269 | 5/1976 | Sheppard et al. | 526/219 |

*Primary Examiner*—Herbert J. Lilling

[57] ABSTRACT

Secondary-aliphatic α-substituted azoalkanes, such as 1-isopropylazo-1-azidocyclohexane, and processes using such azoalkanes as polymerization initiators for vinyl monomers and as curing agents for resins.

8 Claims, No Drawings

POLYMERIZATION OF ETHYLENICALLY UNSATURATED MONOMERS EMPLOYING SECONDARY-ALIPHATIC α-SUBSTITUTED AZOALKANES

This is a division of application Ser. No. 453,447, filed Mar. 21, 1974, now U.S. Pat. No. 4,025,502.

BACKGROUND

This invention relates to secondary-aliphatic (alkyl, cycloalkyl and aralkyl) azoalkanes containing one α-substituent per azo group which have been found to be more thermally stable than corresponding tertiary azo compounds such as those disclosed in our Canadian Pat. No. 924,299 and therefore to operate as vinyl polymerization initiators or curing agents for resins at higher temperatures.

It is well known in the polymer field that polymer properties can be altered considerably by the conditions under which the polymerization is run. Reaction temperature is often a critical variable in the polymerization reaction. Therefore it is important to have an initiator with the proper decomposition rate at the temperature the polymerization is run. Often polymerizations are run with several initiators of widely varying half-life present. For instance, a low temperature initiator may be employed to generate a high concentration of free radicals to initiate the polymerization and provide an exotherm, a medium temperature initiator may then be employed to generate free radicals through the bulk of the polymerization and finally a high temperature initiator used to finish off the polymerization. Similar mixtures can be used to cure polyester resins. A low temperature initiator can be used to initiate the gelling and curing in a short time or at a low temperature. This will generate enough of an exotherm to kick-off the high temperature initiator which will provide the hard cure. Therefore it is advantageous to have a series of initiators available with a wide range of stabilities so that specific industrial needs may be met. The addition of the series of sec-alkyl-α-substituted azoalkanes to the already known t-alkyl-α-substituted azoalkanes will increase the operating ranges that polymerizations can be carried out using azo initiators.

We are not aware of any prior art reporting compounds as disclosed and claimed herein, although many secondary alkyl azoalkanes have been reported in the literature. For example, J. A. Berson et al, J.A.C.S. 84, 3337 (1962) studied the decomposition of 2-azobornane, azoisopropane and azoethane. S. G. Cohen et al, J.A.C.S. 72, 3947 (1950), studied the decomposition rates of 1-azo-bis-1-arylalkanes. Previous studies on such α-aryl-substituted azo compounds were also made by Thiele, Ber., 42, 2578 (1909); Lochte et al, J.A.C.S. 44, 2556 (1922); Schulze et al, J.A.C.S. 48, 1031 (1926); and Fodor et al, Ber., 76B, 334 (1943). R. C. Neuman, Jr. et al, J. Org. Chem., 35, 3401 (1970) studied the thermal decomposition of α-cumylazocyclohexane. L. Spialter et al, J. Org. Chem. 30, 3278 (1965) reported the preparation of unsymmetrical secondary alkylazoalkanes. C. G. Overberger et al, J.A.C.S., 81, 2154 (1959) studied the decomposition rates of symmetrical and unsymmetrical secondary azoalkanes, finding that only those compounds containing an α-phenyl group decomposed at an appreciable rate at 120° C. or below. Cyclic azoalkanes have been reported by C. G. Overberger et al in J.A.C.S., 86, 658 (1954); J.A.C.S., 86, 5364 (1964), J.A.C.S., 80, 6556 (1958), J.A.C.S., 77, 4651 (1955) and J.A.C.S. 87, 4119 (1965); S. G. Cohen et al in J.A.C.S., 84, 586 (1962); and R. M. Moriarty in J. Org. Chem., 28, 2385 (1963). U.S. Pat. No. 3,350,385 reports secondary azoalkanes proposed by tautomerization of the corresponding hydrazone. Secondary-alkyl-α-hydroperoxyazoalkanes are reported in our copending application U.S. Ser. No. 88,249, filed Nov. 9, 1970. 2-(1-Phenyl-2-propyl)azo-2-acetoxypropane is reported by D. C. Iffland et al, J.A.C.S., 83, 747 (1961), such acyloxy compounds being too thermally stable to have practical utility as initiators or curing agents.

BRIEF SUMMARY OF THE INVENTION

This invention relates to
A. Secondary-aliphatic (alkyl, aralkyl and cycloalkyl) α-substituted azoalkanes of the formula (I):

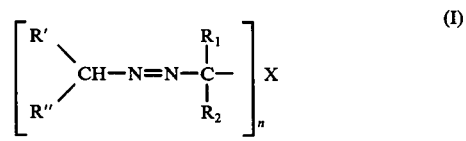

where:

$n$ is 1 or 2;

R' and R" are the same or different and can be alkyl of 1-12 carbons (normally 1-6 and preferably 1-4), cycloalkyl (mono, bi or tri) of 3-12 carbons (normally 5-8, preferably 5-6) or aralkyl (i.e., arylated alkyl as in benzyl) of 7-12 carbons (normally phenalkyl of 7-11 carbons and preferably phenalkyl of 7-9 carbons), R" can also be aryl (normally hydrocarbon aryl) of 6-14 carbons (normally 6-10 and preferably phenyl), and R' and R" can join with their common carbon atom to form cycloalkyl (mono, bi or tri) of 3-12 carbons (normally 5-10 and preferably 5-8);

$R_1$ and $R_2$ are the same or different and can be alkyl of 1-8 carbons (normally 1-6 and preferably 1-4), cycloalkyl (mono, bi or tri) of 3-12 carbons (normally 5-8) preferably 5-6), aralkyl of 7-12 carbons (normally phenalkyl of 7-11 carbons and preferably phenalkyl of 7-9 carbons) or a 5-6 membered heterocylic ring wherein the hetero ring atom is O, S or N (and the remaining ring atoms are carbon), $R_2$ can also be aryl (normally hydrocarbon aryl) of 6-14 carbons (normally 6-10 and preferably phenyl), and $R_1$ and $R_2$ can join with their common carbon atom to form cycloalkyl of 4-12 carbons (preferably 5-8 carbons);

X can be —Cl, —Br, —C(=O)NH$_2$, —C(=NOH)NH$_2$, —OH, —OR$_2$, —OC(=O)OR$_3$, —OOR$_5$, —SR$_6$, —N$_3$, —SCN, —NCX', —NHC(=X)OR$_3$, —NHC(=X')N(R$_8$)R$_9$,
—NHC(=X')NHNHC(=X')R$_4$,
—NHC(=X')NHN(R$_8$)C(=X')N(R$_8$)R$_9$,
—NHC(=X')N(NH$_2$)R$_{10}$,   —NHC(=X')NHNHR$_{16}$,
—NHC(=X')NHN(R'$_8$)R'$_9$,
—NHC(=X')NHNHC(=X')X'R$_3$,

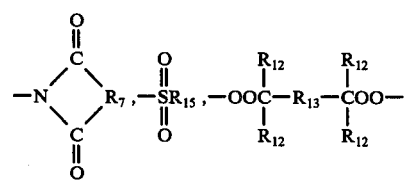

—OC(=O)OR₁₁OC(=O)O—, —OR₁₁O—, —SR₁₄S—, —S—, —NHC(=X')N(R₈)R₁₄N(R₉)C(=X')NH—, —NHC(=X')OR₁₄OC(=X')NH—, —NHC(=X')NHNHC(=X')NHNHC(=X')NH—, —NHC(=X')NHNHC(=X')R₁₄C(=X')NHNHC(=X')NH—, —NHC(=X')N(R₈)N(R₉)C(=X')NH—, —NHC(=X')NHNHC(=X')X'R₁₄X'C(=X')NHNHC(=X')NH—, or
—NHC(=X')NHNHC(=X')N(R₈)R₁₄N(R₉)C(=X')NHNHC(=X')NH—(preferred X groups including those wherein X is —Cl, —CN, —OH, —OR₃, —OOR₅, —OC(=O)OR₃, —SR₆, —N₃, —NCO, —SO₂R₁₅ or

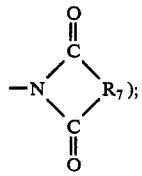

X' is oxygen or sulfur;

R₃ and R₄ are the same (except when R₄ is hydrogen) or different and can be alkyl of 1–12 carbons (preferably 1–4), cycloalkyl of 3–12 carbons (preferably 3–7), aralkyl of 7–12 carbons (preferably phenalkyl of 7–9 carbons) or aryl (normally hydrocarbon aryl) of 6–14 carbons (preferably phenyl), and R₄ can also be hydrogen;

R₅ is tertiary alkyl of 4–12 carbons (preferably 4–8) or tertiary phenalkyl (i.e., phenyl-substituted tertiary alkyl) of 9–12 carbons (preferably 9–11 carbons);

R₆ is alkyl of 1–12 carbons (preferably 1–8), cycloalkyl of 3–12 carbons (preferably 3–8), or aryl (normally hydrocarbon aryl) of 6–14 carbons (preferably phenyl);

R₇ is an alkylene diradical (i.e., a diradical formed by removing two H atoms from an alkane) of 2–10 carbons (preferably 2–6) or arylene (an aromatic diradical, normally hydrocarbon arylene) of 6–14 carbons (preferably phenylene);

R₈, R₉, R'₈ and R'₉ are the same (except that only R₈ and R₉ can be hydrogen) or different and can be alkyl of 1–8 carbons (preferably 1–4), cycloalkyl of 3–12 carbons (preferably 5–8), aralkyl of 7–12 carbons (preferably phenalkyl of 7–9 carbons), or aryl (normally hydrocarbon aryl) of 6–14 carbons (preferably phenyl), or R₈ and R₉ and/or R'₈ and R'₉ can join together to form an alkylene diradical of 3–11 carbons (preferably 4–8), and R₈ and R₉ can also be hydrogen;

R₁₀ is primary or secondary alkyl of 1–12 carbons (preferably 1–4) or cycloalkyl of 3–12 carbons (preferably 5–8);

R₁₁ is an alkylene diradical of 2–12 carbons (preferably 2–6), a cycloalkylene diradical of 3–12 carbons (preferably 5–8), an aralkylene diradical (i.e., a diradical of an aralkane or alkanearalkane) of 7–12 carbons (preferably phenalkylene of 7–9 carbons), or an arylene diradical (normally hydrocarbon arylene) of 6–14 carbons (normally 6–10 carbons and preferably phenylene);

R₁₂ is alkyl of 1–6 carbons (normally 1–2 carbons and preferably methyl);

R₁₃ is alkylene of 1–9 carbons (preferably 1–4), alkenylene or alkynylene of 2–10 carbons (preferably 2–4), cycloalkylene of 3–9 carbons (preferably 5–8), phenalkylene of 7–9 carbons, or arylene (normally hydrocarbon arylene) of 6–10 carbons (preferably phenylene);

R₁₄ is alkylene of 1–20 carbons (preferably 1–10), cycloalkylene of 3–12 carbons (preferably 8–9), arylene (normally hydrocarbon arylene) of 6–14 carbons (preferably phenylene), aralkylene of 7–20 carbons (preferably phenalkylene of 7–12 carbons), or cycloalkylalkylene (i.e., a diradical of cycloalkylalkane or alkylcycloalkylalkyl) of 4–20 carbons (preferably 4–12);

R₁₅ is aryl (normally hydrocarbon aryl) of 6–10 carbons (preferably phenyl or p-tolyl); and R₁₆ is hydrogen, tertiary alkyl of 4–8 carbons (preferably 4–5), tertiary aralkyl of 9–12 carbons (preferably α-cumyl) or aryl (normally hydrocarbon aryl) of 6–14 carbons (preferably phenyl or a lower alkyl or halogen substituted phenyl), it being understood that the above carbon limits are based primarily on practical considerations and are not necessarily limiting; and (B) Processes using compounds (I) as i. Initiators for polymerizing ethylenically unsaturated monomers (such as styrene) which are responsive at suitable temperatures to initiating amounts of free-radical polymerization initiators, especially compounds (I) wherein X is —CN, —C(=O)NH₂, —C(=NOH)NH₂, —OH, —OR₃, —OOR₅, —SR₆, —N₃, —SCN, —NCX',

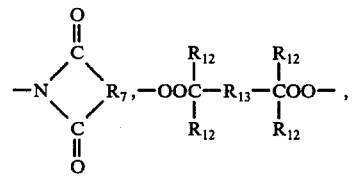

—OR₁₁O—, —SR₁₄S— or —S—;

ii. Curing catalysts for curing unsaturated polyester resin compositions which are responsive at suitable temperatures to initiating amounts of curing catalysts, especially compounds (I) where X is —CN, —C(=O)NH₂, —C(=NOH)NH₂, —OR₃, —OOR₅, —SR₆, —N₃, —OC(=O)OR₃

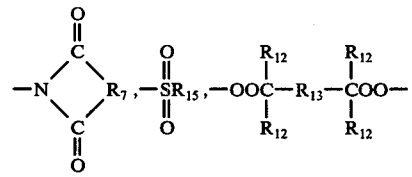

—OR₁₁O—, —SR₁₄S—or —S—; and iii. Otherwise as described hereinafter.

DETAILED DESCRIPTION OF INVENTION

It has now been discovered that secondary-aliphatic α-substituted azoalkanes (I) are more thermally stable than their tertiary-aliphatic counterparts and thus enable these compounds to normally operate efficiently as initiators and curing agents at higher temperatures.

Compounds

The broad definition of the compounds are set forth above and are further illustrated hereinafter in lists of illustrative compounds, examples and methods of preparation. As will be apparent it is contemplated that the various defined R groups can contain non-interfering substituents. Examples of such non-interfering substituents and various R groups are:

One or more or each of R' and R" can be substituted with radicals including lower (lower indicating about 1–5 carbons) akoxy, aryloxy, (preferably phenoxy), hydroxy, carboxy (when X is not —OH), lower alkoxyacarbonyl, aryloxycarbonyl (preferably phenoxycarbonyl), halogen (preferably chlorine or bromine), lower alkylcarbonyloxy, arycarbonyloxy (preferably phenylcarbonyloxy), cyano, amino and, for the aryl groups, alkyl of 1–6 carbons. Typical R' radicals are methyl, ethyl, propyl, i-propyl, butyl, i-butyl, sec.-butyl, t-butyl, amyl, i-amyl, sec.-amyl, t-amyl, hexyl, t-hexyl, t-octyl, n-nonyl, n-decyl, n-dodecyl, cyclopropyl, cyclobutyl, cyclopentyl, cyclohexyl, cyclooctyl, cyclododecyl, perhydronaphthyl, adamantyl, bicylo[2.2.1 ]heptyl, benzyl, α-cumyl, 2-(β-naphthyl)ethyl, 1-phenylcyclohexyl and neopentyl. Typical R" radical include the above plus phenyl, o-, m-, and p-toluyl, naphthyl, triethylphenyl, phenanthryl, p-t-butylphenyl, m and p-methoxyphenyl, o-, m- and p-bromo- (or chloro) phenyl, xylyl, m-cyclopropylphenyl, p-cyclohexyl-phenyl, and p-i-propylphenyl. Examples where R' and R" are joined together include 1,1,3,3-tetramethyl-2-oxopropylene, propylene, butylene, pentamethylene, hexamethylene, heptamethylene, octamethylene, undecamethylene, nonamethylene, and 1,2 or 3-methylpentamethylene.

One or more of each of $R_1$ and $R_2$ can be substituted with radicals as defined above for R' and R". Typical $R_1$ radicals include methyl, ethyl, propyl, i-propyl, butyl, i-butyl, sec.-butyl, t-butyl, amyl, i-amyl, sec-amyl, t-amyl, hexyl, t-hexyl neopentyl, 2-methoxy-2-methylpropyl, n-octyl, t-octyl, cyclopropyl, cyclobutyl, cyclopentyl, cyclohexyl, cyclooctyl, cyclododecyl, perhydronaphthyl, adamantyl, bicyclo[2.2.1] heptyl, benzyl, α-cumyl, α-methyl-α-ethylbenzyl, α,α-diethylbenzyl, α-ethyl-α-propylbenzyl, furyl, pyridyl, 1-phenylcyclohexyl, 3,3,5-trimethylcyclohexyl, 4-t-butylcyclohexyl, methylcyclohexyl, trimethylcyclopentyl and 4-i-propylcyclohexyl. Typical $R_2$ radicals include the above (for $R_1$) plus phenyl, o-, m-, and p-toluyl, naphthyl, triethylphenyl, phenanthryl, p-t-butylphenyl, m- and p-methoxyphenyl, o-, m- and p-bromo(or chloro) phenyl, xylyl, m-cyclopropylphenyl, p-cyclohexylphenyl, and i-propylphenyl. Typical examples where $R_1$ and $R_2$ are joined together are as described above for R' and R". Examples of substituents in R', R", $R_1$ and $R_2$ include ethenyl, allyl, hexenyl, cyclopentenyl, methylcyclohexenyl, ethynyl, propynyl, hexynyl, cyclooctynyl, methoxy, ethoxy, propoxy, hexoxy, isopentoxy, methylcyclopentoxy, cyclohexoxy, phenoxy, naphthoxy, chlorophenoxy, dimethylphenoxy, ethylphenoxy, cyclohexylphenoxy, acetoxy, propionoxy, isohexanoyloxy, cyclohexanecarbonyloxy, benzoyloxy, naphthoyloxy, chlorobenzoyloxy, methylbenzoyloxy, methylnaphthoyloxy, methoxycarbonyl, ethoxycarbonyl, butoxycarbonyl, cyclohexoxycarbonyl, phenoxycarbonyl, naphthoxycarbonyl, chlorophenoxycarbonyl, methylphenoxycarbonyl, methylbiphenyloxycarbonyl, acetyl, propionyl, valeroyl, cyclohexanecarbonyl, benzoyl, naphthoyl, chlorobenzoyl, methylbenzoyl, methylnaphthoyl, carboxy, chlorine, bromine, iodine, fluorine, hydroxy, and cyanide.

One or more of each of the aryl groups in $R_3$ and $R_4$ can be substituted with radicals including halogen, alkoxy of 1–6 carbons or alkyl of 1–6 carbons. Examples of typical $R_3$ and $R_4$ groups include hydrogen ($R_4$ only), methyl, ethyl, propyl, i-propyl, butyl, i-butyl, sec.-butyl, t-butyl, amyl, i-amyl, sec.-amyl, t-amyl, hexyl, t-hexyl, n-heptyl, t-octyl, n-nonyl, n-decyl, n-dodecyl, cyclopropyl, cyclobutyl, cyclopentyl, cyclohexyl, cyclooctyl, cyclododecyl, benzyl, α-cumyl, 2-(β-naphthyl)-ethyl, 1-phenylcyclohexyl, neopentyl, phenyl, naphthyl, phenanthryl, xylyl and triethylphenyl. Examples of substituents in $R_3$ include chlorine, bromine, fluorine, iodine, methoxy, ethoxy, propoxy, i-propoxy, butoxy, i-butoxy, t-amyloxy, methyl, ethyl, propyl, i-propyl, butyl, i-butyl, sec.-butyl, amyl, sec-amyl, t-amyl, and hexyl, sec.-butoxy, t-butoxy and t-butyl.

Examples of typical $R_5$ groups include t-butyl, t-amyl, t-hexyl, t-octyl, α-cumyl, α-methyl-α-ethylbenzyl, α,α-diethylbenzyl and α-ethyl-α-isoprpylbenzyl.

The $R_6$ groups can be substituted with radicals including those defined in R' and R" and lower alkylamino, lower dialkylamino, lower akylcarbonyl, arylcarbonyl (preferably phenylcarbonyl), aryl (preferably phenyl or phenyl substituted with alkyl of 1–6 carbons), lower akylthio, and arylthio (preferably phenylthio or phenylthio substituted with alkyl of 1–6 carbons). Typical $R_6$ radicals include methyl, ethyl, propyl, i-propyl, butyl, i-butyl, sec-butyl, t-butyl, amyl, i-amyl, sec-amyl, t-amyl, hexyl, t-hexyl, n-heptyl, t-octyl, n-nonyl, n-decyl, n-dodecyl, cyclopropyl, cyclobutyl, cyclopentyl, cyclohexyl, cyclooctyl, cyclododecyl, phenyl, naphthyl, phenanthryl, xylyl and triethylphenyl. Examples of substituents in $R_6$ include hydroxy, amino, methylamino, diethylamino, butylamino, carboxy, acetyl, propionyl, valeroyl, cyclohexanecarbonyl, benzoyl, naphthoyl, acetoxy, propionoxy, isohexanoyloxy, cyclohexanecarbonyloxy, benzoyloxy, naphthoyloxy, methoxycarbonyl, ethoxycarbonyl, butoxycarbonyl, cyclohexoxycarbonyl, phenoxycarbonyl, naphthoxycarbonyl, chlorophenoxycarbonyl, chlorine bromine, fluorine, iodine, phenyl, naphthyl, chlorophenyl, bromophenyl, methoxyphenyl, methoxy, ethoxy, propoxy, hexoxy, cyclohexoxy, phenoxy, naphthoxy, chorophenoxy, dimethylphenoxy, methylthio, propylthio, isopropylthio, butylthio, sec.-butylthio, t-butylthio, thiophenoxy, p-t-butylthiophenoxy, cyano, toluyl, xylyl, p-t-butylphenyl, methylphenyl and i-propylphenyl.

The arylene groups in $R_7$ can be substituted as in $R_3$ and $R_4$. Examples of typical $R_7$ groups include ethylene, tetramethylene, pentamethylene, dodecamethylene, o-phenylene, phenanthrylene, nephthylene, chlorophenylene, methylphenylene and cyclohexenylene.

One or more of each $R_8$, $R_9$, $R'_8$ and $R'_9$ can be substituted with radicals as defined above for R' and R" and carbamoyl, lower N-alkylcarbamoyl, lower N,N-dialkylcarbamoyl, N-phenylcarbamoyl and N,N-diphenylcarbamoyl. Typical $R_8$, $R_9$, $R'_8$ and $R'_9$ radicals are hydrogen ($R_8$ and $R_9$ only), methyl, ethyl, propyl, i-propyl, butyl, i-butyl, sec.-butyl, t-butyl, amyl, i-amyl, sec.-amyl, t-amyl, hexyl, t-hexyl, heptyl, octyl, t-octyl, cyclopropyl, cyclobutyl, cyclopentyl, cyclohexyl, cyclooctyl, cyclodecyl, cyclododecyl, phenyl, toluyl, xylyl, m-cyclopropylphenyl, p-cyclohexylphenyl, furyl, thiophenyl, pyridyl, pyranyl, benzyl, α-cumyl, 2-(β-naphthyl)ethyl, β-phenylethyl, α,α-diethylbenzyl, α-ethyl-α-isopropylbenzyl, propylene, butylene, pentamethylene, hexamethylene, heptamethylene, octamethylene, undecamethylene, and methylpentamethylene. Substituents include those named for R', R", $R_1$ and $R_2$ plus carbamoyl, N,N-diethylcarbamoyl, N-methylcarbamoyl, N-phenylcarbamoyl, and N,N-diphenylcarbamoyl.

$R_{10}$ can be substituted with radicals including lower alkoxy, hydroxy, halogen or cyano. Examples of $R_{10}$ groups are methyl, ethyl, propyl, i-propyl, butyl, i-butyl, sec.-butyl, n-amyl, i-amyl, sec-amyl, hexyl, heptyl, octyl, decyl, dodecyl, cyclopropyl, cyclobutyl, cyclopentyl, cyclohexyl, cyclohexptyl, cyclooctyl, cyclododecyl and $R_{10}$ substituents include chlorine, bromine, fluorine, iodine, cyano, hydroxy, methoxy, ethoxy, propoxy, i-propoxy, i-butoxy, sec.-butoxy, t-butoxy, t-amyloxy, sec.-amyloxy and n-amyloxy.

Examples of $R_{11}$ groups are ethylene, tetramethylene, pentamethylene, dodecamethylene, p-phenylene, 4,4'-biphenylene, hexamethylene-p-phenyl, phenanthrylene, naphthylene, cyclohexylene, cyclopentylene, phenylpentamethylene, and pinanylene.

Examples of $R_{12}$ groups are methyl, ethyl, propyl, i-propyl, n-butyl, i-butyl, sec.-butyl, t-butyl, amyl, i-amyl, sec.-amyl, t-amyl, hexyl, sec-hexyl, and t-hexyl.

Examples of $R_{13}$ groups are methylene, ethylene, propylene, tetramethylene, hexamethylene, octamethylene, nonamethylene, p-phenylene, m-phenylene, trimethylene-phenyl, cyclohexylene, cyclopentylene, ethynylene and ehtenylene.

The alkylene, cycloalkylene, aralkylene and cycloalkylalkylene groups in $R_{14}$ can contain one or more nonadjacent and non-terminal oxygen, sulfur and/or nitrogen atoms in the backbone structure, preferably 1 or 2 nonadjacent and non-terminal groups selected from —X'—, —OC(=O)—, —NHC(=O)—, —OC(=X'OC(= and —OC(=S)S—. The arylene groups in $R_{14}$ can be substituted with radicals as in $R_3$ and $R_4$. Examples of $R_{14}$ groups are ethylene, tetramethylene, dodecamethylene, ethyleneoxycarbonylethyl, trimethyleneoxycarbonylethyl, propylidene, ethyleneoxyethyl, tetramethyleneaminocarbonylbutyl, tetramethylenethiobutyl, hexamethylenethiooxycarbonylneopentyl, p-phenylene, 4,4'-biphenylene, octamethylene-p-phenyl, p-phenyleneoxycarbonylneopentyl, phenanthrylene, naphthylene, propenyleneaminocarbonyloxypentyl, cyclohexylene, cyclopentylene, cyclohexyleneoxycarbonyloxyisoheptyl, chlorophenylene, cyanonaphthylene, 3-phenylpentamethylene, phenylethylenecarbonyloxypropyl, cyclohexenylene, methylenecarbonyloxypropyl, acenaphthenylene, 2-butenylene, and pinanylene.

$R_{15}$ can be substituted with radicals including alkyl of 1–4 carbons. Examples of $R_{15}$ are phenyl, toluyl, xylyl, tetramethylphenyl, p-t-butylphenyl, ethylphenyl, naphthyl, trimethylphenyl, diethylphenyl and isopropylphenyl.

The aryl groups in $R_{16}$ can be substituted with lower alkyl or halogen. Examples of $R_{16}$ are t-butyl, t-amyl, t-octyl, α-cumyl, α,α'-diethylbenzyl, α-ethyl-α-isopropylbenzyl, α-methyl-α-propylbenzyl, phenyl, naphthyl, phenanthryl, chlorophenyl, bromophenyl, methylphenyl, ethylphenyl, diethylphenyl and t-butylphenyl.

Typical compounds (I) include the following:

1.a. 2-(pentadec-2-ylazo)-2-chloropropane
2.a. 2-(oct-2-ylazo)-2-chloropropane
3.a. 1-[1-(cyclopropyl)ethylazo]-1-chloro-1-cyclopropylethane
4.a. 1-[1-(cyclohexyl)ethylazo]-1-chloro-1-cyclohexylethane
5.a. 1-[1-(cyclododecyl)ethylazo]-1-chloro-1-dodecylethane
6.a. 1-[1-(cyclopentyl)ethylazo]-1-chloro-1-cyclopentylethane
6.a'. 1-[1-(cycloheptyl)ethylazo]-1-chloro-1-cycloheptylethane
7.a. 2-[1-(cycloheptyl)ethylazo]-2-chloropropane
8.a. 1-[1-(norborn-2-yl)ethylazo]-1-chloro-1-norborn-2-ylethane
9.a. 1-[1-(adamant-2-yl)ethylazo]-1-chloro-1-adamant-2-ylethane
10.a. 2-[1-(phenyl)prop-2-ylazo]-2-chloro-1-phenylpropane
11.a. 2-[4-(naphth-2-yl)but-2-ylazo]-2-chloro-4-phenylbutane
12.a. 2-[1-(p-t-butylphenyl)prop-2-ylazo]-2-chloro-1-(p-t-butylphenyl)propane
13.a. 1-[1-(phenyl)ethylazo]-1-chloro-1-phenylethane
14.a. 2-[5-(phenyl)pent-2-ylazo]-2-chloro-5-phenylpentane
15.a. 1-[1-(phenanthr-2-yl)ethylazo]-1-chloro-1-(phenanthyr-2-yl)-ethane
16.a. 1-[1-(naphth-2-yl)ethylazo]-1-chloro-1-(naphth-2-yl)ethane
17.a. 2-[1-(p-methylphenyl)ethylazo]-2-chlorobutane
18.a. 2-cyclopropylazo-2-chloropropane
19.a. 1-cyclododecylazo-1-chlorocyclododecane
20.a. 1-cyclopentylazo-1-chloroecyclobutane
21.a. 1-cycloheptylazo-1-chorocycloheptane
22.a. 1-cyclononylazo-1-chlorocyclononane
23.a. 2-(norborn-2-ylazo)-2-chloronorbornane
24.a. 2-(2.2.2-bicyclooct-2-ylazo)-2-chloro(2.2.2-bicyclooctane)
25.a. 2-adamant-2-ylazo-2-chloroadamantane
26.a. 2-(4-methoxy-4-methylpent-2-ylazo)-2-chloropropane
27.a. 2-(4-phenoxy-4-methylpent-2-ylazo)-2-chloro-4-phenoxy-4-methylpentane
28.a. 2-(4-hydroxy-4-methylpent-2-ylazo)-2-chloro-4-hydroxy-4-methylpentane
29.a. 2-(5-hydroxypent-2-ylazo)-2-chloro-5-hydroxypentane
30.a. 2-(4-carboxybut-2-ylazo)-2-chloropropane
31.a. 2-[4-(n-butyoxycarbonyl)but-2-ylazo]-2-chloropropane
32.a. phenyl-5-[5-(phenoxycarbonyl)pent-2-ylazo]-5-chlorohexanoate
34.a. 1-[1-(p-chlorophenyl)ethylazo]-1-chloro-1-(p-chlorophenyl)-ethane
35.a. 1-[1-(m-bromophenyl)ethylazo]-1-chloro-1-(m-bromophenyl)-ethane
36.a. 1-[1-(p-fluorophenyl)ethylazo]-1-chloro-1-(p-fluorophenyl)-ethane
37.a. 1-[1-(p-iodophenyl)propylazo]-1-chloro-1-(p-iodophenyl)-propane
38.a. 2-[4-(benzoyloxy)but-2-ylazo]-2-chloro-4-(benzoyloxy)-butane
39.a. 1-[1-(p-cyanophenyl)ethylazo]-1-chloro-1-(p-cyanophenyl)-ethane
40.a. 2-(5-aminopent-2-ylazo)-2-chloro-5-aminopentane
41.a. 2-(4-methylcyclohexylazo)-2-chloropropane
42.a. 1-cyclobutylazo-1-chloro-1-cyclobutylethane
43.a. 2-[(2,2,4-tetramethyl-3-oxo)cyclobutylazo]-2-chloropropane
44.a. 2-[1-(ethoxycarbonyl)prop-2-ylazo]-2-chloropropane
45.a. 2-(tetral-2-ylazo)-2-chlorotetralin
46.a. 2-[1,3-di-(ethoxycarbonyl)prop-2-ylazo]-2-chloropropane
47.a. 4-[2,6-(dimethyl)hept-4-ylazo]-4-chloro-2,6-dimethylheptane
48.a. 2-[3,3-(dimethyl)but-2-ylazo]-2-chloro-3,3-dimethylbutane 49.a. 2-[4,4-(dimethyl)pent-2-ylazo]-2-chloro-4,4-dimethylpentane
50.a. 2-[1,3-(diphenyl)prop-2-ylazo]-2-chlorodecane
51.a. 2-(tridec-7-ylazo)-2-chloropropane
52.a. 2-(1-phenyl-5-carboxypentylazo)-2-chloropropane
53.a. 2-[4-(t-butyl)cyclohexylazo]-2-chlorobutane
54.a. 2-(1-methoxyprop-2-ylazo)-2-chlorooctane
55.a. 2-indan-2-ylazo-2-chloroindane
56.a. 2-(dicyclopropylmethylazo)-2-chloropropane
57.a. 1-cyclohexylazo-1-(fur-2-yl)-1-chloroethane
58.a. 1-cyclohexylazo-1-tetrahydrofur-2-yl)-1-chloroethane
59.a. 1-cyclohexylazo-1-chloro-1-(pyrid-4-yl)ethane
60.a. 1-cyclopentylazo-1-chloro-1-(thiophen-2-yl)ethane
61a. 1-isopropylazo-1-chloro-1-(anthracen-9-yl)ethane
62.a. 1-isopropylazo-1-chloro-1-(pyrid-2-yl)ethane
1.b. 2-(pentadec-2-ylazo)-2-cyanopropane
2.b. 2-(oct-2-ylazo)-2-cyanopropane
3.b. 1-[1-(cyclopropyl)ethylazo]-1-cyano-1-cyclopropylethane
4.b. 1-[1-(cyclohexyl)ethylazo]-1-cyano-1-cyclohexylethane
5.b. 1-[1-(cyclododecyl)ethylazo]-1-cyano-1-dodecylethane
6.b. 1-[1-(cyclopentyl)ethylazo]-1-cyano-1-cyclopentylethane
6'.b. 1-[1-(cycloheptyl)ethylazo]-1-cyano-1-cycloheptylethane
7.b. 2-[1-(cycloheptyl)ethylazo]-2-cyanopropane
8.b. 1-[1-(norborn-2-yl)ethylazo]-1-cyano-1-norborn-2-ylethane
9.b. 1-[1-(adamant-2-yl)ethylazo]-1-cyano-1-adamant-2-ylethane
10.b. 2-[1-(phenyl)prop-2-ylazo]-2-cyano-1-phenylpropane
11.b. 2-[4-(naphth-2-yl)but-2-ylazo]-2-cyano-4-phenylbutane
12.b. 2-[1-(p-t-butylphenyl)prop-2-ylazo]-2-cyano-1-(p-t-butylphenyl)propane
13.b. 1-[1-(phenyl)ethylazo]-1-cyano-1-phenylethane
14.b. 2-[5-(pheny)pent-2-ylazo]-2-cyano-5-phenylpentane
15.b. 1-[1-(phenanthr-2-yl)ethylazo]-1-cyano-1-(phenanthr-2-yl)-ethane
16.b. 1-[1-(naphth-2-yl)ethylazo]-1-cyano-1-(naphth-2-yl)ethane
17.b. 2-[1-(p-methylphenyl)ethylazo]-2-cyanobutane
18.b. 2-cyclopropylazo-2-cyanopropane
19.b. 1-cyclododecylazo-1-cyanocyclododecane
20.b. 1-cyclopentylazo-1-cyanocyclobutane
21.b. 1-cycloheptylazo-1-cyanocycloheptane
22.b. 1-cyclononylazo-1-cyanocyclononane
23.b. 2-(norborn-2-ylazo)-2-cyanonorbornane
24.b. 2-(2.2.2-bicyclooct-2-ylazo)-2-cyano(2.2.2.bicyclooctane)
25.b. 2-adamant-2-ylazo-2-cyanoadamantane
26.b. 2-(4-methoxy-4-methylpent-2-ylazo)-2-cyanopropane
27.b. 2-(4-phenoxy-4-methylpent-2-ylazo)-2-cyano-4-phenoxy-4-methylpentane
28.b. 2-(4-hydroxy-4-methylpent-2-ylazo)-2-cyano-4-hydroxy-4-methylpentane
29.b. 2-(5-hydroxypent-2-ylazo)-2-cyano-5-hydroxypentane
30.b. 2-(4-carboxybut-2-ylazo)-2-cyanopropane
31.b. 2-[4-(n-butoxycarbonyl)but-2-ylazo]-2-cyanopropane
32.b. phenyl 5-[5-(phenoxycarbonyl)pent-2-ylazo]-5-cyanohexanoate
34.b. 1-[1-(p-chlorophenyl)ethylazo]-1-cyano-1-(p-chlorophenyl)-ethane
35.b. 1-[1-(m-bromophenyl)ethylazo]-1-cyano-1-(m-bromophenyl)-ethane
36.b. 1-[1-(p-fluorophenyl)ethylazo]-1-cyano-1-(p-fluorophenyl)-ethane
37.b. 1-[1-(p-iodophenyl)propylazo]-1-cyano-1-(p-iodophenyl)-propane
38.b. 2-[4-(benzoyloxy)but-2-ylazo]-2-cyano-4-(benzoyloxy)butane
39.b. 1-[1-(p-cyanophenyl)ethylazo]-1-cyano-1-(p-cyanophenyl)-ethane
40.b. 2-(5-aminopent-2-ylazo)-2-cyano-5-aminopentane
41.b. 2-(4-methylcyclohexylazo)-2-cyanopropane
42.b. 1-cyclobutylazo-1-cyano-1-cyclobutylethane
43.b. 2-[(2,2,4,4-tetramethyl-3-oxo)cyclobutylazo]-2-cyanopropane
44.b. 2-[1-(ethoxycarbonyl)prop-2-ylazo]-2-cyanopropane
45.b. 2-(tetral-2-ylazo)-2-cyanotetralin
46.b. 2-[1,3-di-(ethoxycarbonyl)prop-2-ylazo]-2-cyanopropane
47.b. 4-[2,6-(dimethyl)hept-4-ylazo]-4-cyano-2,6-dimethylheptane
48.b. 2-[3,3-(dimethyl)but-2-ylazo]-2-cyano-3,3-dimethylbutane
49.b. 2-[4,4-(dimethyl)pent-2-ylazo]-2-cyano-4,4-dimethylpentane
50.b. 2-[1,3-(diphenyl)prop-2-ylazo]-2-cyanodecane
51.b. 2-(tridec-7-ylazo))-2-cyanopropane
52.b. 2-(1-phenyl-5-carboxypentylazo)-2-cyanopropane
53.b. 2-[4-(t-butyl)cyclohexylazo]-2-cyanobutane
54.b. 2-(1-methoxyprop-2-ylazo)-2-cyanooctane
55.b. 2-indan-2-ylazo-2-cyanoindane
56.b. 2-(dicyclopropylmethylazo)-2-cyanopropane
57.b. 1-cyclohexylazo-1-(fur-2-yl)-1-cyanoethane
58.b. 1-cyclohexylazo-1-(tetrahydrofur-2-yl)-1-cyanoethane
59.b. 1-cyclohexylazo-1-cyano-1-(pyrid-4-yl)ethane
60.b. 1-cyclopentylazo-1-cyano-1-(thiophen-2-yl)ethane
61.b. 1-isopropylazo-1-cyano-1-(anthracen-9-yl)ethane
62.b. 1-isopropylazo-1-cyano-1-(pyrid-2-yl)ethane
1. c. 2-(pentadec-2-ylazo)-2-hydroxypropane
2. c. 2-(oct-2-ylazo)-2-hydroxypropane
3. c. 1-[1-(cyclopropyl)ethylazo]-1-hydroxy-1-cyclopropylethane
4. c. 1-[1-(cyclohexyl)ethylazo]-1-hydroxy-1-cyclohexylethane
5. c. 1-[1-(cyclododecyl)ethylazo]-1-hydroxy-1-dodecylethane
6. c. 1-[1-(cyclopentyl)ethylazo]-1-hydroxy-1-cyclopentylethane
6'.c. 1-[1-(cycloheptyl)ethylazo]-1-hydroxy-1-cycloheptylethane
7.c. 2-[1-(cycloheptyl)ethylazo]-2-hydroxypropane
8.c. 1-[1-(norborn-2-yl)ethylazo]-1-hydroxy-1-norborn-2-ylethane
9.c. 1-[1-(adamant-2-yl)ethylazo]-1-hydroxy-1-adamant-2-ylethane
10.c. 2-[1-(phenyl)prop-2-ylazo]-2-hydroxy-1-phenylpropane
11.c. 2-[4-(naphth-2-yl)but-2-ylazo]-2-hydroxy-4-phenylbutane
12.c. 2-[1-(p-t-butylphenyl)prop-2-ylazo]-2-hydroxyl-1-(p-t-butylphenyl)propane
13.c. 1-[1-(phenyl)ethylazo]-1-hydroxy-1-phenylethane 14.c. 2-[5-(phenyl)pent-2-ylazo]-2-hydroxy-5-phenylpentane
15.c. 1-[1-(phenanthr-2-yl)ethylazo]-1-hydroxy-1-(phenanthr-2-yl)ethane
16.c. 1-[1-(naphth-2-yl)ethylazo]-1-hydroxy-1-(naphth-2-yl)-ethane
17.c. 2-[1-(p-methylphenyl)ethylazo]-2-hydroxybutane
18.c. 2-cyclopropylazo-2-hydroxypropane
19.c. 1-cyclododecylazo-1-hydroxycyclododecane
20.c. 1-cyclopentylazo-1-hydroxycyclobutane
21.c. 1-cycloheptylazo-1-hydroxycycloheptane
22.c. 1-cyclononylazo-1-hydroxycyclononane
23.c. 2-(norborn-2-ylazo)-2-hydroxynorbornane
24.c. 2-(2.2.2-bicyclooct-2-ylazo)-2-hydroxy(2.2.2-bicyclooctane)
25.c. 2-adamant-2-ylazo-2-hydroxyadamantane
26.c. 2-(4-methoxy-4-methylpent-2-ylazo)-2-hydroxypropane
27.c. 2-(4-phenoxy-4-methylpent-2-ylazo)-2-hydroxy-4-phenoxy-4-methylpentane
28.c. 2-(4-hydroxy-4-methylpent-2-ylazo)-2,4-dihydroxy-4-methylpentane
29.c. 2-(5-hydroxypent-2-ylazo)-2,5-dihydroxypentane
30.c. 2-(4-acetoxybut-2-ylazo)-2-hydroxypropane
31.c. 2-[4-(n-butoxycarbonyl)-but-2-ylazo]-2-hydroxypropane
32.c. phenyl 5-[5-(phenoxycarbonyl)pent-2-ylazo]-5-hydroxyhexanoate
34.c. 1-[1-(p-chlorophenyl)-ethylazo]-1-hydroxy-1-(p-chlorophenyl)-ethane
35.c. 1-[1-(m-bromophenyl)ethylazo]-1-hydroxy-1-(m-bromophenyl)-ethane
36.c. 1-[1-(p-fluorophenyl)ethylazo]-1-hydroxy-1-(p-fluorophenyl)-ethane
37.c. 1-[1-(p-iodophenyl)propylazo]-1-hydroxy-1-(p-iodophenyl)-propane
38.c. 2-[4-(benzoyloxy)but-2-ylazo]-2-hydroxy-4-(benzoyloxy)-butane
39.c. 1-[1-(p-cyanophenyl)ethylazo]-1-hydroxy-1-(p-cyanophenyl)-ethane
40.c. 2-(5-aminopent-2-ylazo)-2-hydroxy-5-aminopentane
41.c. 2-(4-methylcyclohexylazo)-2-hydroxypropane
42.c. 1-cyclobutylazo-1-hydroxy-1-cyclobutylethane
43.c. 2-[(2,2,4,4-tetramethyl-3-oxo)cyclobutylazo]-2-hydroxypropane
44.c. 2-[1-(ethoxycarbonyl)prop-2-ylazo]-2-hydroxypropane
45.c. 2-(tetral-2-ylazo)-2-hydroxytetralin
46.c. 2-[1,3-di-(ethoxycarbonyl)prop-2-ylazo]-2-hydroxypropane
47.c. 4-[2,6-(dimethyl)hept-4-ylazo]-4-hydroxy-2,6-dimethylheptane
48.c. 2-[3,3-(dimethyl)but-2-ylazo]-2-hydroxy-3,3-dimethylbutane
49.c. 2-[4,4-(dimethyl)pent-2-ylazo]-2-hydroxy-4,4-dimethylpentane
50.c. 2-[1,3-(diphenyl)prop-2-ylazo]-2-hydroxydecane
51.c. 2-(tridec-7-ylazo)-2-hydroxypropane
52.c. 2-(1-phenyl-5-acetoxypentylazo)-2-hydroxypropane
53.c. 2-[4-(t-butyl)cyclohexylazo]-2-hydroxybutane
54.c. 2-(1-methoxyprop-2-ylazo)-2-hydroxyoctane
55.c. 2-indan-2-ylazo-2-hydroxyindane
56.c. 2-(dicyclopropylmethylazo)-2-hydroxypropane
57.c. 1-cyclohexylazo-1-(fur-2-yl)-1-hydroxyethane
58.c. 1-cyclohexylazo-1-(tetrahydrofur-2-yl)-1-hydroxyethane
59.c. 1-cyclohexylazo-1-hydroxy-1-pyrid-4-yl)ethane
60.c. 1-cyclopentylazo-1-hydroxy-1-(thiophen-2-yl)ethane
61.c. 1-isopropylazo-1-hydroxy-1-(anthracen-9-yl)ethane
62.c. 1-isopropylazo-1-hydroxy-1-(pyrid-2-yl)ethane
1. d. 2-(pentadec-2-ylazo)-2-methoxypropane
2. d. 2-oct-2-ylazo)-2-methoxypropane
3. d. 1-[1-(cyclopropyl)ethylazo]-1-methoxy-1-cyclopropylethane
4. d. 1-[1-(cyclohexyl)ethylazo]-1-methoxy-1-cyclohexylethane
5. d. 1-[1-(cyclododecyl)ethylazo]-1-methoxy-1-dodecylethane
6. d. 1-[1-(cyclopentyl)ethylazo]-1-methoxy-1-cyclopentylethane
6'. d. 1-[1-(cycloheptyl)ethylazo]-1-methoxy-1-cycloheptylethane
7. d. 2-[1-(cycloheptyl)ethylazo]-2-methoxypropane
8. d. 1-[1-(norborn-2-yl)ethylazo]-1-methoxy-1-norborn-2-ylethane
9. d. 1-[1-(adamant-2-yl)ethylazo]-1-methoxy-1-adamant-2-ylethane
10. d. 2-[1-(phenyl)prop-2-ylazo]-2-methoxy-1-phenylpropane
11. d. 2-[4-(naphth-2-yl)but-2-ylazo]-2-methoxy-4-phenylbutane
12. d. 2-[1-(p-t-butylphenyl)prop-2-ylazo]-2-methoxy-1-(p-t-butylphenyl) propane
13. d. 1-[1-(phenyl)ethylazo]-1-methoxy-1-phenylethane
14. d. 2-[5-(phenyl)pent-2-ylazo]-2-methoxy-5-phenylpentane
15. d. 1-[1-(phenanthr-2-yl)ethylazo]-1-methoxy-1-(phenanthr-2-yl)ethane
16. d. 1-[1-(naphth-2yl)ethylazo]-1-methoxy-1-(naphth-2-yl)-ethane
17. d. 2-[1-(p-methylphenyl)ethylazo]-2-methoxybutane
18. d. 2-cyclopropylazo-2-methoxypropane
19. d. 1-cyclododecylazo-1-methoxycyclododecane
20. d. 1-cyclopentylazo-1-methoxycyclobutane
21. d. 1-cycloheptylazo-1-methoxycycloheptane
22. d. 1-cyclononylazo-1-methoxycyclononane
23. d. 2-(norborn-2-ylazo)-2-methoxynorbornane
24. d. 2-(2.2.2-bicyclooct-2-ylazo)-2-methoxy(2.2.2-bicyclooctane)
25. d. 2-adamant-2-ylazo-2-methoxyadamantane
26. d. 2-(4-methoxy-4-methylpent-2-ylazo)-2-methoxypropane
27. d. 2-(4-phenoxy-4-methylpent-2-ylazo)-2-methoxy-4-phenoxy-4-methylpentane
28. d. 2-(4-hydroxy-4-methylpent-2-ylazo)-2-methoxy-4-hydroxy-4-methylpentane
29. d. 2-(5-hydroxypent-2-ylazo)-2-methoxy-5-hydroxypentane
30. d. 2-(4-carboxybut-2-ylazo)-2-methoxypropane
31. d. 2-[4-(n-butoxycarbonyl)but-2-ylazo]-2-methoxypropane
32. d. phenyl 5-[5-phenoxycarbonyl)pent-2-ylazo]-5-methoxyhexanoate
34. d. 1-[1-(p-chlorophenyl)ethylazo]-1-methoxy-1-(p-chlorophenyl)ethane
35. d. 1-[1-(m-bromophenyl)ethylazo]-1-methoxy-1-(m-bromophenyl)ethane
36. d. 1-[1-(p-fluorophenyl)ethylazo]-1-methoxy-1-(p-fluorophenyl)ethane
37. d. 1-[1-(p-iodophenyl)propylazo]-1-methoxy-1-(p-iodophenyl)propane 38. d. 2-[4-(benzoyloxy)but-2-ylazo]-2-methoxy-4-(benzoyloxy)butane
39. d. 1-[1-p-cyanophenyl)ethylazo]-1-methoxy-1-(p-cyanophenyl)ethane
40. d. 2-(5-aminopent-2-ylazo)-2-methoxy-5-aminopentane
41. d. 2-(4-methylcyclohexylazo)-2-methoxypropane
42. d. 1-cyclobutylazo-1-methoxy-1-cyclobutylethane
43. d. 2-[(2,2,4,4-tetramethyl-3-oxo)cyclobutylazo]-2-methoxypropane
44. d. 2-[1-(ethoxycarbonyl)prop-2-ylazo]-2-methoxypropane
45. d. 2-(tetral-2-ylazo)-2-methoxytetralin
46. d. 2-[1,3-di-(ethoxycarbonyl)prop-2-ylazo]-2-methoxypropane
47. d. 4-[2,6-(dimethyl)hept-4-ylazo]-4-methoxy-2,6-dimethylheptane
48. d. 2-[3,3-(dimethyl)but-2-ylazo]-2-methoxy-3,3-dimethylbutane
49. d. 2-[4,4-(dimethyl)pent-2-ylazo]-2-methoxy-4,4-dimethylpentane
50. d. 2-[1,3-(diphenyl)prop-2-ylazo]-2-methoxydecane
51. d. 2-tridec-7-ylazo]-2-methoxypropane
52. d. 2-(1-phenyl-5-carboxypentylazo)-2-methoxypropane
53. d. 2-[4-(t-butyl)cyclohexylazo]-2-methoxybutane
54. d. 2-(1-methoxyprop-2-ylazo)-2-methoxyoctane
55. d. 2-indan-2-ylazo-2-methoxyindane
56. d. 2-(dicyclopropylmethylazo)-2-methoxypropane
57. d. 1-cyclohexylazo-1-(fur-2-yl)-1-methoxyethane
58. d. 1-cyclohexylazo-1-(tetrahydrofur-2-yl)-1-methoxyethane
59. d. 1-cyclohexylazo-1-methoxy-1-(pyrid-4-yl)ethane
60. d. 1-cyclopentylazo-1-methoxy-1-(thiophen-2-yl)ethane
61. d. 1-isopropylazo-1-methoxy-1-(anthracen-9yl)ethane
62. d. 1-isopropylazo-1-methoxy-1-(pyrid-2-yl)ethane
63. 2-cyclohexylazo-2-ethoxypentane
64. 2-cyclohexylazo-2-propoxy-3-methylbutane
65. 1-cyclohexylazo-1-isopropoxycyclobutane
66. 3-cyclohexylazo-3-t-butoxypentane
67. 2-cyclohexylazo-2-dodecyloxypropane
68. 2-isopropylazo-2-cyclopropoxypropane
69. 3-isopropylazo-3-cyclohexoxyheptane
70. 2-sec.-butylazo-2-cycloheptyloxybutane
71. 2-cyclopentylazo-2-dodecyloxypropane
72. 2-cycloheptylazo-2-benzyloxypropane
73. 2-isopropylazo-2-[3-(phenyl)propoxy]pentane
74. 2-isopropylazo-2-[4-(phenyl)cyclohexoxy]propane
75. 2-isopropylazo-2-(phenanthr-2-yloxy)propane
76. 2-isopropylazo-2-(naphth-2-yloxy)propane
77. 2-isopropylazo-2-(p-chlorophenoxy)propane
78. 2-isopropylazo-2-(m-methoxyphenoxy)propane
79. 2-isopropylazo-2-(p-methylphenoxy)propane
80. 1-cyclohexylazo-1-(t-butylperoxy)cyclohexane
81. 2-isopropylazo-2-(t-amylperoxy)butane
82. 1-isopropylazo-1-(1,1,3,3-tetramethylbutylperoxy)-1-cyclohexylethane
83. 1-sec.butylazo-1-(α-cumylperoxy)cyclopentane
84. 2-(pent-2-ylazo)-2-[α,α-diethylbenzylperoxy]propane
85. 1-isopropylazo-1-methylthio-1-cyclohexylethane
86. 1-isopropylazo-1-t-butylthio-1-cyclopropylethane
87. 2-sec.butylazo-2-dodecylthiobutane
88. 2-sec.-butylazo-2-isopropylthiobutane
89. 2-(1,3,3-trimethylpropylazo)-2-[(1,1,3,3-tetramethyl)-butylthio]butane
90. 1-(non-5-ylazo)-1-sec.-butylthio-1-cyclopentylethane
91. 2-isopropylazo-2-(cyclopropylthio)butane
92. 1-cyclohexylazo-1-(cyclododecylthia)cyclohexane
93. 1-cyclohexylazo-1-n-octylthio-1-cyclopropylethane
94. 1-cyclohexylazo-1-(naphth-2-ylthio)-1-phenylethane
95. 2-cyclopentylazo-2-(phenanthr-2-ylthio)butane
96. 2-cycloheptylazo-2-(m-methylthiophenoxy)propane
97. 2-isopropylazo-2-(2-aminoethylthio)propane
98. 2-isopropylazo-2-[2-(diethylamino)ethylthio]propane
99. 1-sec.-butylazo-1-(2-carboxyethylthio)-1-cyclopentylethane
100. 2-sec.-butylazo-2-(2-acetoxyethylthio)butane
101. 2-sec.-butylazo-2-(2-acetylethylthio)butane
102. 2-sec.-butylazo-2-[2-(ethoxycarbonyl)ethylthio]butane
103. 2-sec.-butylazo-2-[2-(phenoxycarbonyl)ethylthio]butane
104. 2-sec.-butylazo-2-(p-bromothiophenoxy) butane
105. 2-sec.-butylazo-2-(m-fluorothiophenoxy)butane
106. 2-sec.-butylazo-2-(m-chlorothiophenoxy)octane
107. 3-sec.-butylazo-3-(2-phenylethylthio)heptane
108. 1-sec.-butylazo-1-(p-methylbenzylthio)-1,1-dicyclopropylmethane.
109. 1-isopropylazo-1-(2-methoxyethylthio)-1,1-dicyclohexylmethane
110. 1-isopropylazo-1-(2-phenoxyethylthio)-1-phenylpropane
111. 3-isopropylazo-3-[2-(methylthio)ethylthio]pentane
112. 3-isopropylazo-3-[2-(phenylthio)ethylthio]hexane
113. 2-sec.-butylazo-2-[2-(p-t-butylphenylthio)ethylthio]-octane
114. 2-(pent-2-ylazo)-2-(2-cyanoethylthio)pentane
115. 4-isopropylazo-4-(p-methyl)thiophenoxyvaleric acid
115a. allyl 4-isopropylazo-4-(p-hexylthiophenoxy)valerate
116. 2-isopropylazo-2-succinimido-propane
117. 2-isopropylazo-2-(1,10-decanedicarboximido)butane
118. 2-isopropylaze-2-(m-methylphthalimido)butane
119. 2-isopropylazo-2-(hexahydrophthalimido) pentane
120. 2-isopropylazo-2-(1,8-naphthalimido)hexane
121. 2-cyclohexylazo-2-(6,7-phenanthrenedicarboximido)propane
122. 2-cyclopentylazo-2-(1,8-octahydronaphthalimido)butane
123. 1-cyclohexylazo-1-azidocyclohexane
123a. methyl 2-cyclopentylazo-2-azidovalerate
124. 1-(1,3-dimethylbutylazo)-1-azido-1-cyclohexylethane
125. 2-isopropylazo-2-thiocyanopropane
126. 2-sec.-butylazo-2-isothiocyanobutane
127. 2-[1-(phenyl)ethylazo]-2-(ethoxycarbonylamino)propane
128. 3-(oct-2-ylazo)-3-(propoxythiocarbonylamino)-5-methylhexane
129. 2-cyclohexylazo-2-(methoxythiocarbonylamino)propane
130. N-[1-(cyclohexylazo)-1-methylethyl]urea
131. N-[1-(cyclohexylazo)-1-methylethyl]thiourea
132. N-[1-(isopropylazo)-1,2-dimethylpropyl]-N'-methyl-N'-n-butylurea
133. N-[1-(sec.butylazo)-1-methylethyl]N',n-octylthiourea 134. N-[1-(sec.-butylazo)-1-methylethyl]-N'-cyclopropyl-N'-methylurea
135. N-[1-(isopropylazo)-1-methylethyl]-N'-cyclododecylurea
136. N-[1-(cyclohexylazo)-1-methylethyl]-N'-cyclopentyl-N'-methylthiourea
137. N-[1-(cyclohexylazo)-1-methylpropyl)-1-methylpropyl]-N'-cyclooctyl-N'-ethylthiourea
138. N-[1-(cyclohexylazo)-1-ethylpropyl]-N'-methyl-N'-benzylurea
139. N-[1-(cyclopentylazo)-1-methylethyl]-N'-(3-phenyl)propylurea
140. N-[1-(cyclopentylazo)-1-methylpentyl]-N'-(4-phenyl)-cyclohexylurea
141. N-[1-(1-cyclopropylethylazo)-1-cyclopropylethyl]-N'-phenylurea
142. N-[1-(1-cyclopropylethylazo)-1-methylethyl]-N'-(p-methyl)-phenylurea
143. N-[1-(isopropylazo)-1-methylethyl]-N'-phenanthr-2-ylthiourea
144. N-[1-(cyclohexylazo)-1-methylethyl]-N'-naphth-2-ylurea
145. N-[1-(cyclohexylazo)-1-methylethyl]-N',N'-trimethyleneurea
146. N-[1(pent-2-ylazo)-1-phenylethyl]-N',N'-undecamethyleneurea
147. N-[1-(cyclohexylazo)-1-methylethyl]-N',N'-tetramethyleneurea
148. N-[1-(isopropylazo)-1-methylethyl]-N',N'-octamethylenethiourea
149. N-[1-(isopropylazo)-1-methylethyl]-N'-(2-hydroxyethyl)urea
150. N-[1-(isopropylazo)-1-methylethyl]-N',N'-di(2-methoxyethyl)-urea
151. N-[1-(isopropylazo)-1-methylethyl]-N'-(2-phenoxyethyl)-urea
152. N-[1-(isopropylazo)-1-methylethyl]-N'-(6-carboxy)hexylurea
153. N-[1-(isopropylazo)-1-methylethyl]-N'-(6-methoxycarbonyl)-hexylurea
154. N-[1-(isopropylazo)-1-methylethyl]-N'-(6-phenoxycarbonyl)-hexylthiourea
155. N-[1-(cyclohexylazo)-1-methylethyl]-N'-(2-acetoxyethyl)-urea
156. N-[1-(cyclohexylazo)-1-methylethyl]-N'-(2-phenoxyethyl)-urea
157. N-[1-(cyclohexylazo)-1-methylpropyl]-N'-(a-chloroethyl)-urea
158. N-[1-(cyclopentylazo)-1-methylpropyl]-N'-(2-cyanoethyl)-thiourea
159. N-[1-(cyclohexylazo)-1-methylethyl]-N'-(6-carbamoylhexyl)-thiourea
160. 1-acetyl-4-[1-(cyclohexylazo)-1-methylethyl]-semicarbazide
161. 1-pivaloyl-4-[1-(cyclohexylazo)-1-methylethyl]thiosemicarbazide
162. 1-thiacetyl-4-[1-(cyclohexylazo)-1-methylethyl]-semicarbazide
163. 1-thiobenzoyl-4-[1-(cyclohexylazo)-1-methylethyl]-thiosemicarbazide
164. 1-methyl-1-aminocarbonyl-4-[1-(cyclohexylazo-1-methylethyl]-semicarbazide
165. 1-propyl-1-n-butylaminocarbonyl-4-[1-(cyclohexylazo-1-methylethyl]thiosemicarbazide
166. 1-(phenylaminothiocarbonyl)-4-[1-(cyclohexylazo)-1-methylethyl]semicarbazide.
167. 1-methyl-1-(diethylaminothiocarbonyl)-4-[1-(cyclohexylazo)-1-methylethyl] thiosemicarbazide
168. 2-methyl-4-[1-(isopropylazo)-1-methylethyl] semicarbazide
169. 2-n-dodecyl-4-[1-(isopropylazo)cyclohexyl]-semicarbazide
170. 2-sec.-butyl-4-[1-(isopropylazo)cyclohexyl] thiosemicarbazide
171. 2-cyclopropyl-4-[1-(isopropylazo)-1-methylpropyl]semicarbazide
172. 2-dodecyl-4-[1-(isopropylazo)-1-methylpropyl]thiosemicarbazide
173. 2-cyclopentyl-4-[1-(sec.-butylazo)-1-methylpropyl]semicarbazide.
174. 2-cyclooctyl-4-[1-(sec.-butylazo)-1-methylpropyl]-thiosemicarbazide
175. 2-(2-hydroxyethyl)-4-[1-(1-phenylethylazo)-1-methylethyl]-semicarbazide
176. 2-(2-methoxyethyl)-4-[1-(1-phenylethylazo)-1-methylethyl]-thiosemicarbazide
177. 2-(2-chloroethyl)-4-[1-(2-phenyl-1-methylethylazo)-1-methylethyl]semicarbazide
178. 2-(2-cyanoethyl)-4-[1-(isopropylazo)-1-methylethyl]-semicarbazide
179. 1-phenyl-4-[1-(isopropylazo)-1-methylethyl]-semicarbazide
180. 1-(p-methylphenyl)-4-[1-(isopropylazo)-1-methylethyl]-thiosemicarbazide
181. 1-(2,4,6-trichlorophenyl)-4-[1-(isopropylazo)-1-methylethyl]semicarbazide
182. 1-(phenanthr-2-yl)-4-[1-(isopropylazo)-1-methylethyl]-semicarbazide
183. 4-[1-(isopropylazo)-1-methylethyl] semicarbazide
184. 1-t-butyl-4-[1-(isopropylazo)-1-methylethyl]thiosemicarbazide
185. 1-(1,1,3,3-tetramethylbutyl)-4-]1-(isopropylazo)-1-methylethyl]semicarbazide
186. 1-t-amyl-4-[1-(cyclohexylazo)-1-methylethyl]thiosemicarbazide
187. 1-α-cumyl-4-[1-(cyclohexylazo)-1-methylethyl]-semicarbazide
188. 1-(α,α-diethylbenzyl)-4-[1-(cyclohexylazo)-1-methylethyl]-semicarbazide
189. 1,1-dimethyl-4-[1-(cyclohexylazo)-1-methylethyl]-semicarbazide
190. 1,1-pentamethylene-4-]1-(cyclohexylazo)-1-methylethyl]-thiosemicarbazide
191. 1-methoxycarbonyl-4-[1-(cyclohexylazo)-1-methylethyl]-semicarbazide
192. 1-n-butylthiocarbonyl-4-[1-(cyclohexylazo)-1-methylethyl]-semicarbazide
193. 1-(isopropoxythiocarbonyl)-4-[1-(cyclohexylazo)-1-methylethyl]semicarbazide
194. 1-(cyclohexoxycarbonyl)-4-[1-(isopropylazo)cyclohexyl]-thiosemicarbazide
195. 1-(phenylthiocarbonyl)-4-[1-(isopropylazo)cyclohexyl]-thiosemicarbazide
196. 1-(methylthio)thiocarbonyl-4-[1-(isopropylazo)cyclohexyl]-thiosemicarbazide
197. 1-(benzyloxy)thiocarbonyl-4-[1-(sec.-butylazo)-1-methyl-propyl]thiosemicarbazide
198. 2-sec.-butylazo-2-(benzenesulfonyl)butane
199. 2-cyclohexylazo-2-(p-toluenesulfonyl)propane
200. 1-cyclopentylazo-1-(1-naphthalenesulfonyl)-1-cyclohexyl ethane.
201. 1-isopropylazo-1-(p-t-butylbenzenesulfonyl)-1-phenylethane
202. 1,3-di[1-oxo-2-(cyclopentylazo)-2-methylpropyl]-cyclopentane 203. 1,5-di[1-thia-2-(1-phenylethylazo)-2-methylpropyl]-cyclooctane
204. 1-(2-thia-3,3,6,8-tetramethyl-4,5-diaza-Δ⁴-nonenyl)-4-(1-thia-2,2,5,7-tetramethyl-3,4-diaza-Δ³-octenyl)-benzene
205. 1,4-di(4-thia-5,8-dimethyl-5-propyl-6,7-diaza-Δ⁶-undecenyl)benzene
206. 1-(1,1,3,3,6-pentamethyl-2-thia-4,5-diaza-Δ⁴-heptenyl)-4-(1-thia-2,2,5-trimethyl-3,4-diaza-hexenyl)-benzene
207. 1,4-di[1-thia-2-(cyclohexylazo)-2-methylpropyl]-benzene
208. 1,5-di(1-oxa-2,2,5-trimethyl-3,4-diaza-Δ³-hexenyl)-cyclooctane
209. 1-[2-oxa-3-(cyclohexylazo)-3-methylbutyl]-4-[1-oxa-2-(cyclohexylazo)-2-methylpropyl]benzene
210. 1,4-di[4-oxa-5-(cyclohexylazo)-5-methylhexyl]benzene
211. 1-[1,1,3-trimethyl-2-oxa-3-(cyclopentylazo)pentyl]-4-[1-oxa-2-methyl-2-(cyclopentylazo)butyl]benzene
212. 1,4-di(1-oxa-2,5-dimethyl-2-ethyl-3,4-diaza-Δ³-heptenyl) benzene
213. 1,5-di(1-oxa-2,2,5-trimethyl-3,4-diaza-Δ³-hexenyl)-naphthalene
214. 2,7-di[1-oxa-2-methyl-2-(cyclohexylazo)propyl]-phenanthrene
215. 2,5,5,9,9,12-hexamethyl-3,4,10,11-diaza-6,8-dithia-Δ³,¹⁰-tridecadiene
216. 2,25-di(cyclohexylazo)-2,25-dimethyl-3,24-dithiahexacosane
217. 1-[1,3-dimethyl-2-thia-2-(cyclopentylazo)butyl]-4-[1-thia-2-methyl-2-(cyclopentylazo)propyl]cyclohexane
218. 2,27-di(cyclobutylazo)-2,27-dimethyl-3,26-dithia-6,23-dioxa-7,22-dioxo-octacosane
219. 2,5,20,23-tetramethyl-3,4,9,16,21,22-hexaaza-5,20-dipentyl-6,19-dithia-10,15-dioxa-Δ³,²¹-tetracosadiene
220. 3,6,6,23,23,26-hexamethyl-4,5,24,25-diaza-7,22-dithia-10,12,17,19-tetraoxa-11,18-dioxo-Δ⁴,²⁴-octacosadiene
221. 1,28-diphenyl-2,5,24,27-tetramethyl-3,4,25,26-tetraza-5,24-dibenzyl-5,10,17,22-tetrathia-8,19-dioxa-9,18-dithio-Δ³,²⁵-octacosadiene
222. 1,4-di(1,4,4,7-tetramethyl-1,3,5,6-tetraaza-2-oxo-Δ⁵-octenyl) benzene
223. 2,8-di[1,3-diaza-2-thio-4-methyl-4-(cyclohexylazo)-pentyl]-phenanthrene
224. 1-[1,3-diaza-2-oxo-4-methyl-4-(cyclohexylazo)pentyl]-4-[1-oxa-2,17-dioxo-16,18-diaza-19-methyl-19-(cyclohexylazo)-cicosyl] benzene
225. 1-[1,3-diaza-2-oxo-3-(1-cyclopentylazocyclopentyl)propyl]-3-methyl-4-[3,5-dioxa-4-thio-16,18-diaza-17-oxo-18-(1-cyclopentylazo-cyclopentyl)octadecyl]-cyclohexane
226. 2,5,5,8,8,11,11,14,14,17-decamethyl-3,4,15,16-tetraaza-6,7,12,13-tetraoxa-Δ³,¹⁵-octadecadiene
227. 7,16-di(cyclohexylazo)-7,10,10,13,13,16-hexaethyl-8,9,14,15-tetraoxa-docosane
228. 1,4-di(1,4,7-trimethyl-1-hexyl-2,3-dioxa-4-ethyl-5,6-diaza-Δ⁵-nonenyl) cyclohexane
229. 3,11-di(cyclopentylazo)-3,11-diethyl-4,5,9,10-tetraoxa-6,6,8,8-tetramethyl-tridecane
230. 1,2-di(1,1,4,4-tetramethyl-2,3-dioxa-5,6-diaza-7-phenyl-Δ⁵-octenyl) acetylene
231. 3,6,6,15,15,18-hexaethyl-4,5,16,17-tetraaza-7,8,13,14-tetraoxa-9,9,12,12-tetramethyl-Δ⁴,¹⁰,¹⁶-eicosatriene 232. 1-(3,3,6,6,9-pentamethyl-4,5-dioxa-7,8-diaza-Δ⁷-decenyl)-2-methyl-4-(1,1,4,4,7-pentamethyl-2,3-dioxa-5,6-diaza-Δ⁵-octenyl)benzene
233. 1,3-di(1,1,4,7-tetramethyl-2,3-dioxa-4-ethyl-5,6-diaza-Δ⁵-nonenyl) benzene
234. 2,5,5,19,19,22-hexamethyl-3,4,6,18,20,21-hexaaza-7,12,17-trioxo-8,11,13,16-tetraoxa-Δ³,²⁰-tricosadiene
235. 1,4-di[2-oxa-3-oxo-4-aza-5-methyl-5-(cyclohexylazo)-heptyl]cyclohexane
236. 1,12-di[1-(cyclohexylazo)cyclohexyl]-1,12-diaza-2,11-dithio-3,10-dioxa-dodecane
237. 1,5-di[1-(cyclopentylazo)-1-methylpropylaminocarbonyl]-carbohydrazide
238. 1,5-di[1-(cyclooctylazo)-1-methylethylaminocarbonyl]-thiocarbohydrazide
239. 1,5-di[1-(isopropylazo)-1-methylethylaminothiocarbonyl]-carbohydrazide
240. 1,5-di[1-(1-phenylethylazo)-1-methylethylaminothiocarbonyl]-thiocarbohydrazide
241. 1,4-di(1,4-dioxa-2,3,5,7,8-pentaaza-6,6,9-trimethyl-Δ⁷-decenyl) benzene
242. 3,6,21,24-tetramethyl-4,5,7,9,10,17,18,20,22,23-decaaza-6,2¹-diethyl-8,19-dithio-11,16-dioxo-Δ⁴,²²-hexacosadiene
243. 2,5,5,20,20,23-hexamethyl-3,4,6,8,9,16,17,19,21,22-decaaza-7,18-dioxo-10,15-dithio-Δ³,²¹-tetracosadiene
244. 1,4-di[1,4-dithio-2,3,5-triaza-6-methyl-6-(cyclohexylazo)-heptyl]benzene
245. 1,2-di[1-(cyclopentylazo)cyclohexylaminocarbonyl]hydrazine
246. 1,2-di[1-(1-phenyethylazo)-1-methylethylaminothiocarbonyl]-1-methylhydrazine
247. 2,5,5,11,18,24,24,27-octamethyl-3,4,6,8,9,11,18,20,21,23,25,26-dodecaaza-7,10,19,22-tetraoxo-Δ³,²⁵-octacosadiene
248. 1,4-di(1,3,4,6,8,9-hexaaza-1,7-diethyl-2-thio-5-oxo-7,10-dimethyol-Δ⁸-dodecenyl) benzene
249. 1,4-di[1,3,4,6-tetraaza-2,5-dithio-7,8-dimethyl-7-(4-methylcyclohexylazo)nonyl]benzene
250. 1,4-di[1,3,4,6-tetraaza-2-oxo-5-thio-7-methyl-7-(4-t-butylcyclohexylazo)-nonyl]-2-isopropylcyclohexane
251. 2,5,5,22,22,25-hexamethyl-3,4,7,10,17,20,23,24-decaaza-7,10,17,20-tetraoxo-11,16-dioxa-Δ³,²³-hexacosadiene
252. 2,5,24,27-tetramethyl-3,4,6,8,9,20,21,23,25,26-decaaza-5,24-diethyl-7,10,19,22-tetraoxo-11,18-dithia-Δ³,²⁵-octacosadiene
253. 1,4-di(2-oxa-3-thio-4,5,7,9,10-pentaaza-6-oxo-8,8,11-trimethyl-Δ⁹-dodecenyl)-cyclohexane
254. 1-[1,1,8-trimethyl-2-thia-3-oxo-4,5,7-triaza-6-thio-8-(2-methyl-cyclohexylazo)tridecyl]-4-[1-thia-2-oxo-3,4,6-triaza-5-thio-7-(2-methylcyclohexylazo)-dodecyl]-cyclohexane
255. 2,21-di(cyclohexylazo)-2,21-dimethyl-3,5,6,17,18,20-hexaaza-4,7,16,19-tetrathio-8,15-dithia-docosane
256. 2,17-di(cyclopentylazo)-2,17-dimethyl-3,5,6,13,14,16-hexaaza-4,15-dithio-7,12-dioxo-8,11-dioxa-octadecane
257. ethylene bis(1-isopropylazo-1-methylethyl ether)
258. 1,6-hexylene bis(1-cyclohexylazo-1-methylpropyl ether)
259. 1,12-dodecylene bis(1-sec-butylazo-1-methylethyl ether)
260. 1,2-cyclopropylene bis(1-isopropylazo-1-methylethyl ether)
261. 1,7-cyclododecylene bis(1-sec-butylazo-1-methylpropyl ether)

262. 1,4-butylene bis(1-cyclopentylazo-1-methylbutyl ether)
263. ethylene bis(1-isopropylazo-1-methylethyl carbonate)
264. 1,6-hexylene bis(1-cyclohexylazo-1-methylpropyl carbonate)
265. 1,12-dodecylene bis(1-sec-butylazo-1-methylethyl carbonate)
266. 1,2-cyclopropylene bis(1-isopropylazo-1-methylethyl carbonate)
267. 1,7-cyclododecylene bis(1-sec-butylazo-1-methylpropyl carbonate)
268. 1,4-butylene bis(1-cyclopentylazo-1-methylbutyl carbonate)
269. 2-isopropylazo-2-(methoxycarbonyloxy)-propane
270. 2-sec-butylazo-2-(ethoxycarbonyloxy)butane
271. 2-sec-butylazo-2-(isopropoxy-carbonyloxy)propane
272. 1-cyclohexylazo-1-(t-butoxycarbonyloxy)-cyclohexane, and
273. 2-isopropylazo-2-(phenoxycarbonyloxy)-propane Preparation of compounds (I)

The compounds of this invention are derived from secondary-alkylhydrazines and secondary-alkylhydrazones. There are numerous methods described in the literature for preparing secondary-alkylhydrazines. A preferred method is the method described by Hawkins (J.Chem. Soc. C 1971 p. 1474) for the preparation of cyclohexanone cyclohexylhydrazone from hydrogenation of cyclohexanone ketazine hydrochloride in ethanol. It is found that this method is applicable to most ketazines and the hydrazones can easily be hydrolyzed to the secondary-alkylhydrazine hydrochlorides by addition of water to the hydrogenation reaction mixture $$\underset{R''}{\overset{R'}{>}}C=N-N=C\underset{R''}{\overset{R'}{<}} + HCl + H_2 \xrightarrow[C_2H_5OH]{PtO_2}$$

$$\underset{R''}{\overset{R'}{>}}CH-NH-N=C\underset{R''}{\overset{R'}{<}} \cdot HCl \xrightarrow{H_2O}$$

$$\underset{R''}{\overset{R'}{>}}CH-NH-NH_2 \cdot HCl + R'-\underset{\underset{O}{\parallel}}{C}-R''$$

The ketazines are prepared by reacting hydrazine with two equivalents of a suitable ketone [R'—C(=O)—R''] where R' and R'' are as previously described). With the more reactive ketones the reaction can be run by adding the ketone to the hydrazine, refluxing for approximately 1 hour, cooling and separating and drying the organic layer that forms. With the less reactive ketones the reaction can be run in benzene or toluene and the water azeotroped off.

Some of the more suitable ketones for preparing the ketazines include: acetone, methyl ethyl ketone, methyl propyl ketone, methyl isopropyl ketone, methyl isobutyl ketone, methyl butyl ketone, 4,4-dimethylpentanone-2, 2-octanone, cyclopentanone, cyclohexanone, cyclooctanone, cyclododecanone, undecanone-2, methyl cyclopropyl ketone, methyl cyclohexyl ketone, 4-t-butyl-cyclohexanone, 3,3,5-trimethylcyclohexanone, 2-methylcyclohexanone, acetophenol, diisobutyl ketone, diethyl ketone, 1,3-diphenylacetone, 1'-acetonaphthone, 2'-acetonaphthone, indanone, tetralone, propiophenone, pinacolone, benzylacetone, cyclohexylacetone, di-n-hexyl ketone, 3,5-dimethyl-4-heptanone, 2,4-dimethyl-3-hexanone, 5-methyl-2-hexanone, 10-nonadecanone, 4-octanone, 6-undecanone, 9-acetylanthracene, p-bromobutyrophenone, p-chloropropiophenone, 3,4-dimethylacetophenone, p-fluoropropiophenone, 8-ketotricyclo-[5.2.1.0$^{2,6}$] decane, 5-methoxy-2-tetralone, 1-adamantyl methyl ketone, cyclobutyl phenyl ketone, cyclopropyl phenyl ketone, cyclohexyl phenyl ketone, cyclopentyl phenyl ketone, 4-methoxy-4-methylpentanone-2, tetramethyl-1,3-cyclobutanedione, levulinic acid, esters of levulinic acid such as allyl levulinate and n-butyl levulinate, acetonyl acetone, 3-acetyl-1-propanol and 5-benzoylvaleric acid, all of which are commercially available.

The ketone secondary-alkylhydrazones are prepared by refluxing an aqueous solution of the secondary-alkylhydrazine with an equivalent amount of the desired ketone [R$_1$—C(=O)—R$_2$] cooling and separating and drying the organic layer that forms. In the case of the less reactive ketones the reaction can be carried out by azeotroping off the water from a benzene solution of the secondary-alkylhydrazine and the desired ketone.

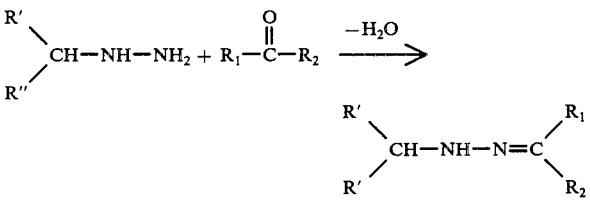

In the case where R'=R$_1$ and R''=R$_2$, the hydrazone can often be isolated from the hydrogenation reaction by neutralizing the reaction mixture with a base before adding water and then quickly extracting with a solvent such as pentane, hexane or methylene chloride.

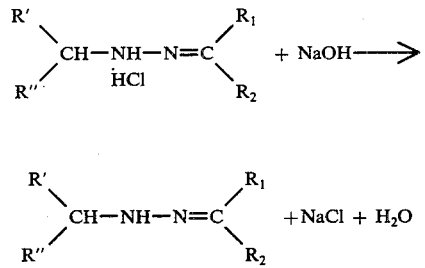

The ketones [R'—C(=O)—R''] mentioned above for the preparation of the ketazines are also very suitable for the preparation of the secondary-alkylhydrazones.

Secondary-alkyl-α-haloazoalkanes

The secondary-alkyl-α-chloroazoalkanes are prepared by chlorinating the corresponding secondary-alkyl ketone hydrazones in an inert solvent in the presence of a tertiary amine such as triethylamine. The procedure is similar to that described for the preparation of the t-alkyl-α-chloroazoalkanes in Application Ser. No. 79,713 of R. E. MacLeay and H. C. Lange filed Oct. 10, 1970.

Suitable solvents for the reaction include hydrocarbon and chlorinated hydrocarbon solvents such as pentane, hexane, heptane, octane, decane, cyclohexane, methylcyclohexane, benzene, toluene, chlorobenzene, methylene chloride, chloroform, trichloroethylene etc. However, if the α-chloroazo is to be isolated (or the reaction products of the α-chloroazo) it is desirable to use the more volatile solvents such as pentane or hexane. The triethylamine hydrochloride that forms as a by-product is insoluble in the hydrocarbon solvents and can be separated by filtration or centrifugation from the soluble α-chloroazoalkane.

The tertiary amine acts as a hydrogen chloride scavenger. In the absence of the tertiary amines, the secondary-alkylhydrazones pick up the hydrogen chloride to form the insoluble (in most cases) hydrazone hydrochloride and the reaction stops around 50% completion.

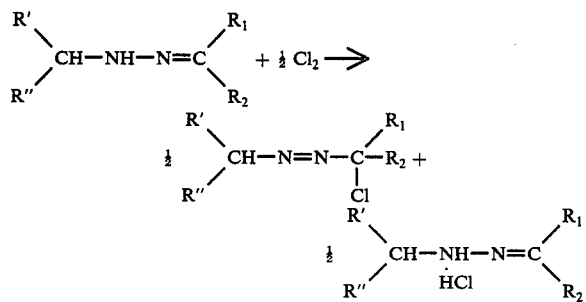

The secondary-alkyl-α-bromoazoalkanes are prepared by the same method substituting liquid bromine for the chlorine gas and separating the insoluble triethylamine hydrobromide. From an economic standpoint it is more advantageous to prepare the α-chloroazos.

Secondary-alkyl-α-cyanoazoalkanes

Process #1

The first process consists essentially of reacting a secondary-(alkyl, cycloalkyl, bicycloalkyl or aralkyl) hydrazine (or its acid salt) [A] with HCN (or NaCN or KCN) and $R_1'$—C(=O)—$R_2'$ in water to form the hydrazo compound [B] and then after separating the aqueous layer, oxidizing [B] to form the corresponding azo product [C]

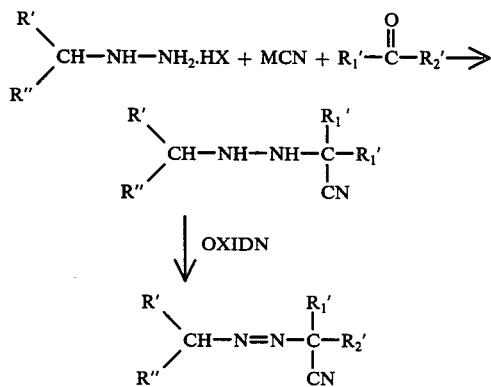

where $R_1'$ is methyl or ethyl $R_2'$ is unbranched lower alkyl of 1-6 carbons, 2-carboxyethyl, or $(CH_2)_{1-3}$—OH and $R_1'$ and $R_2'$ together can form the diradical —$CH_2$—$(CH_2)_n$—$CH_2$— where n=2-5 and the diradical may also be substituted with lower alkyl groups except on both terminal methylene groups when the substituent is particularly bulky such as t-butyl.

R' and R" are as previously defined.

The concentration of the hydrazine or hydrazine salt in the water may vary over a large range, i.e from less than 1% to greater than 50% but for practical use it is preferable to use a solution of about 5% to 20%. If a concentration of less than 5% is used, the yield decreases slightly and the amount of product obtained per reactor volume is small. On the other hand, if the concentration exceeds 20%, the hydrazine salt usually crystallizes out of solution. If the free base is used, higher concentrations are practical. Hydrocyanic acid, NaCN, KCN or any other economical source of cyanide ion may be used, but the pH of the resulting aqueous solution must be adjusted to essentially neutral or slightly basic so as not to form water soluble acid salts of the hydrazo [B].

The ketones $R_1'$—C(=O)—$R_2'$ suitable for use in Process 1 are methyl or ethyl ketones of 3-9 carbons which are non-sterically hindered, non-sterically hindered substituted cyclopentanones and cyclohexanones. Examples of suitable ketones are acetone, methyl ethyl ketone, 1-acetyl-3-propanol, hydroxyacetone, 2-octanone, levulinic acid, cyclohexanone, methyl n-propyl ketone, diethyl ketone, 2-methylcyclohexanone, 2-methylcyclohexanone, 4-methylcyclohexanone, cyclopentanone, methyl benzyl ketone, ethyl acetoacetate, methyl acetoacetate, acetonyl acetate, cycloheptanone and cyclooctanone.

The reaction works very well with the lower molecular weight ketones such as acetone, methyl ethyl ketone and methyl propyl ketone. As the molecular weight increases, the yield generally decreases. The reaction also works very well with cyclohexanone, 2,3, or 4-methylcyclohexanone and cyclopentanone. In the case of the hydroxy containing ketones such as hydroxyacetone and 1-acetyl-3-propanol, the hydrazo reaction works very well, but the hydroxyl group has to be blocked in the case of hydroxyacetone before oxidizing and the hydroxy group should be blocked in the case of 1-acetyl-3-propanol before oxidation to obtain the maximum yield and purity. In the 1-acetyl-3-propanol case the blocking group may be removed after oxidation, but in the hydroxyacetone case, it may not because the β-hydroxyazo is unstable and readily decomposes. In the case of levulinic acid, the hydrazo is water soluble and must be separated out of the water either by extraction or by exceeding the solubility by using concentrated hydrazine solutions.

The hydrazo reactions may be run at 10° C to 80° C but preferably are run at 20°–60° C for 1–3 hours. Running the reaction at a lower temperature or for shorter periods of time usually results in lower yields. Running at higher temperatures usually results in some decomposition of the hydrazo, again resulting in lower yields. Shorter reaction periods can usually be compensated for by higher temperatures and vice versa. The hydrazo products in most cases have very low water solubility and can be easily separated from the aqueous solution. Those having water solubility, such as those derived from ketones having hydroxyl or carboxylic substituents, can be extracted with chlorinated hydrocarbons.

The hydrazo compound is then oxidized under conventional conditions to the corresponding azo compound. The oxidation may be carried out neat or in a nonoxidizable solvent such as ether, benzene, hydrocarbons, or chlorinated hydrocarbons. Suitable oxidizing agents include aqueous solutions of alkali metal hypohalite, preferably sodium hypochlorite; aqueous hypochlorous acid, bromine, potassium permanganate, lead tetracetate, ammonium nitrite, nitric acid, and the oxides of silver and mercury. For economic reasons, ease of handling, and purity of the final product, it is preferable to use aqueous solutions of sodium hypochlorite in most cases. The oxidations may be carried out from 0° C to just below the decomposition temperature of the azo. For the more vigorous oxidations, such as aqueous hypochlorous acid, it is preferable to run the oxidations at the lower temperatures where the exotherm can be easily controlled. For the less vigorous oxidizing agents such as silver or mercuric oxide, it is preferable to run the oxidations at room temperature or slightly higher. When using aqueous sodium hypochlorite, it is preferable to carry out the oxidations at 25°-50° C, carefully controlling the exotherm with a cooling bath.

The oxidation may be carried out by adding the oxidizing agent to the hydrazo or vice versa. Sometimes it is preferable to add the hydrazo to the oxidizing agent and in other cases, the reverse is true. The azos may be purified by washing them with aqueous acid. The aqueous acid wash destroys an undesirable by-product. The by-product has the following structure and is unstable at ambient temperature, therefore, presenting a hazardous situation unless it is broken down by acid.

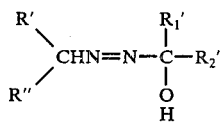

The acid decomposition of the impurity should be carried out slowly by cooling the azo and slowly adding dilute acid to the stirred azo. This will prevent a rapid breakdown of the impurity with a subsequent rapid evolution of nitrogen.

Process II

The second process consists essentially of adding hydrocyanic acid to a preformed secondary (alkyl, cycloalkyl, bicycloalkyl or aralkyl) hydrazone of a ketone $R_1-C(=O)-R_2$ to form a hydrazo compound and then oxidizing to the corresponding azo product.

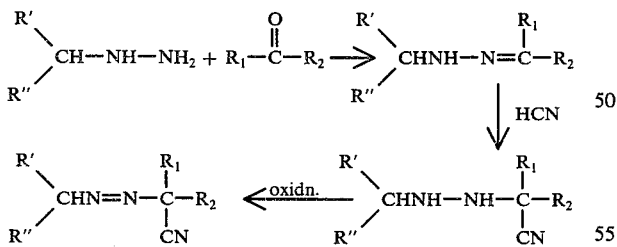

where R', R'', $R_1$ and $R_2$ are as previously defined.

The secondary-(alkyl, cycloalkyl, bicycloalkyl or aralkyl)-hydrazone may be prepared by the conventional methods (i.e., azeotroping off the water from a benzene solution of approximately equimolar quantities of the alkylhydrazine and ketone or refluxing an alcohol solution of approximately equal molar quantities of the secondary-alkylhydrazine and ketone and then evaporating the alcohol) or by refluxing an aqueous solution of the hydrazine with the ketone and separating the organic layer that forms. The reaction of the hydrazone with hydrocyanic acid can be carried out from about 0° C to 80° C, preferably from about 10° C to about 40° C. The hydrazone may be diluted with a nonreactive solvent such as a hydrocarbon, chlorinated hydrocarbon, ether or ester. The reaction may be run in the presence of water, but the smaller the amount of water present, the better the reaction runs. The hydrazo reaction can be run over a period of 1 hour to 1 week or longer, but usually 3 hours at room temperature or above is sufficient. The reaction can be run in an autoclave, a pressure bottle, or in a reactor equipped with a condenser cold enough to condense HCN vapors back into the reaction medium. For optimum yields, it is advisable to have a slight molar excess of HCN over the hydrazone. It is also advisable to add a drop of acid to the hydrazo reaction to prevent decomposition of the HCN. After the hydrazo reaction is complete, the excess HCN may be removed by pulling a vacuum on the reaction flask and stripping it off under reduced pressure or by washing the hydrazo with water. The choice depends on the stability of the individual hydrazo compounds. Those hydrazo compounds derived from sterically hindered ketones tend to evolve HCN more readily and in the presence of water, revert to some degree to the hydrazone. In some cases, it is desirable to oxidize the excess HCN right along with the hydrazo.

The hydrazo compounds may then be oxidized by the oxidation procedures described in Process I. For those hydrazo compounds that readily evolve HCN in the presence of water, it is preferable to use non-aqueous oxidizing systems (such as mercuric oxide) or else add the hydrazo (or hydrazo solution) to an aqueous solution of the oxidizing agent at a rate and temperature such that the hydrazo compound will be readily oxidized to the stable azo compound before it can revert to the hydrazone. In some cases it is advantageous to convert the hydrazo to its more stable acid salt such as the hydrochloride, before oxidizing it.

Process III

The third process consists essentially of reacting a secondary-(alkyl, cycloalkyl, bicycloalkyl or aralkyl)-hydrazine with a ketone $R_1-C(=O)-R_2$ to form a secondary (alkyl, cycloalkyl, bicycloalkyl or aralkyl) hydrazone, reacting with a halogen (chlorine or bromine) to form the α-haloazo product and then reacting the α-haloazo with a metal cyanide in a solvent system for the α-chloroazo and the metal cyanide to give the corresponding azo.

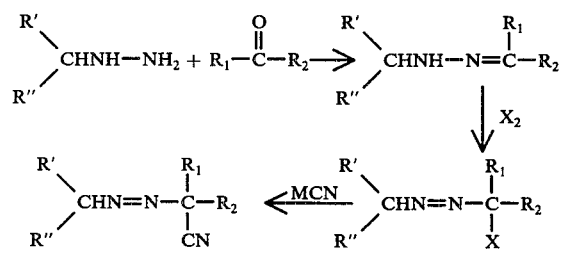

where
R', R'', $R_1$ and $R_2$ are as previously defined
X is chlorine or bromine
and M is Na, K, Cs, Ag The secondary -(alkyl, cycloalkyl, bicycloalkyl or aralkyl)-hydrazone may be prepared by the same procedures as the hydrazone in Process II. The secondary -(alkyl, cycloalkyl, bicycloalkyl or aralkyl) azoalkanes containing one α-chloro group are prepared according to the procedure described earlier.

The conversion of the α-haloazo to the α-cyanoazo may be carried out from about 0° C to 50° C but preferably is carried out at 10° C to 30° C. If the reaction is run much below 10° C, the rate of reaction is quite slow and if the reaction is run much above 30° C, you have problems with the stability of the α-halozao and may also have problems with the stability of some of the products depending on their structure.

Suitable solvents for the conversion of the α-haloazos to the α-cyanoazos include the lower molecular weight alcohols ($C_1$–$C_5$ alcohols), ethers such as dioxane, glyme, and diglyme, dimethylformamide, acetone and methyl ethyl ketone. Preferably these solvents are mixed with water to give aqueous solutions which dissolve the metal cyanide more readily. Especially suitable solvents are 60–80% aqueous solutions of methanol, ethanol, dioxane, dimethylformamide or acetone. Since both water and the alcohols react with the α-haloazos, it is advisable to add the α-haloazo to the cyanide solution (or slurry) so that an excess of cyanide is always present. Since the cyanide is more reactive toward the α-haloazos, only small amounts of the corresponding α-alkoxyazos and α-hydroxyazos will be formed. The small amounts of the α-alkoxyazos and α-hydroxyazos can be destroyed by washing the α-cyanoazos with acids such as hydrochloric or sulfuric acid diluted to about 10–20% with water. The α-haloazos can be added to the cyanide solution neat or in a non-reactive solvent (presumably the solvent it was made in), such as a hydrocarbon, chlorinated hydrocarbon, ether or low molecular weight ester such as ethyl acetate.

At the end of the reaction the product can be isolated by diluting the reaction mixture with water to dissolve the salts and the water miscible solvent. The product or its solution will separate and is purified by washing it with dilute solutions of acid and sodium bicarbonate.

Any metal cyanide may be used in the reaction, but for solubility and economic reasons sodium cyanide and potassium cyanide are the preferred reagents.

The α-cyanoazos can be converted to the α-amidoazos

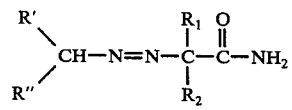

by hydrolysis in concentrated sulfuric acid provided the α-cyanoazo does not contain any other hydrolyzable or acid sensitive groups. The α-cyanoazos can also be reacted with alcoholic solutions of hydroxylamine to form the corresponding α-amidoximoazos

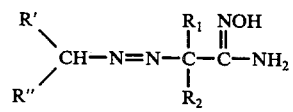

provided $R_1$ and $R_2$ do not contain any substituents that will also react with alcoholic hydroxylamine. The α-cyanoazos may also be hydrolyzed to esters and iminoesters with hydrogen chloride in anhydrous alcohol using procedures well known in the art.

Secondary-alkyl-α-hydroxyazoalkanes

Process #1

The first process consists essentially of reacting a secondary-(alkyl, cycloalkyl, bicycloalkyl, or aralkyl)-α-chloroazoalkane with alkali metal or alkaline earth hydroxides in an inert cosolvent.

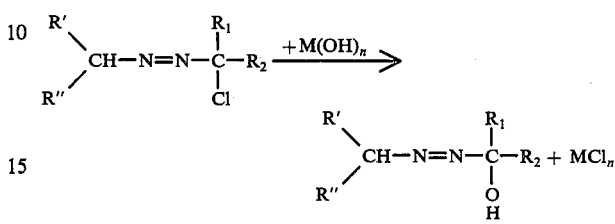

where R′, R″, $R_1$, and $R_2$ are as previously defined and M is an alkali metal or alkaline earth metal or valence $n$.

The solvent for the reaction should be a non-reactive water miscible cosolvent (such as dioxane, t-butyl alcohol, t-amyl alcohol, dimethylformamide, or acetone) for the α-chloro azo compound and the sodium or potassium hydroxide. Methanol, ethanol, propanol and isopropanol are not suitable solvents since they react with the α-chloro azo compounds to form the corresponding alkoxy compounds.

By using the cosolvent the reaction goes to completion in a very short time at 0°–5° C, normally in less than 30 minutes. The cosolvent can then be removed by adding water, separating the organic layer and washing it with water until the solvent is washed out. The reaction can be carried out at −10° C to 40° C, but preferably at 5° to 20° to reduce the reaction period and reduce the thermal decomposition to a negligible amount. Inert diluents such as hydrocarbons, ethers and chlorinated hydrocarbons may be used to dilute the α-chloroazo compounds but they reduce the reaction rate and consequently extend the reaction period. Therefore it is preferable to remove any (or most of the) solvent from the α-chloroazo compounds before reacting them with the caustic solution.

Process #2

The second process consists essentially of oxidizing secondary-(alkyl, cycloalkyl, bicycloalkyl or aralkyl)-ketone hydrazones with aqueous hypochlorite to the corresponding α-hydroxy azo compound.

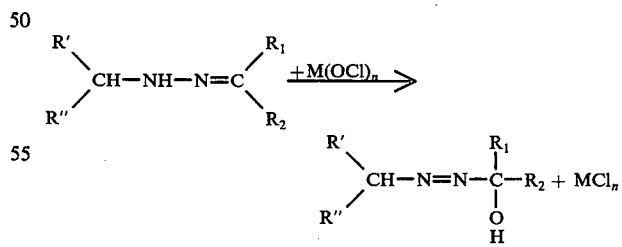

where R′, R″, $R_1$ and $R_2$ are as previously defined and M is an alkali or alkaline earth metal.

When $R_1$=$CH_3$ or $C_2H_5$ and $R_2$=$CH_3$, $C_2H_5$, $C_3H_7$ or $C_4H_9$, the secondary-(alkyl, cycloalkyl, bicycloalkyl or aralkyl)-ketone hydrazones have some water solubility and the reaction goes very smoothly at 20°–25° C. When $R_1$ = $R_2$ = $CH_3$ the reaction goes very smoothly as low as 0° C. An aqueous solution of 5–15% NaClO is slowly added to the hydrazone controlling the temperature at 0°-30° C depending on the reactivity of the hydrazone. The reaction may also be run by adding the hydrazone to an excess of the sodium hypochlorite solution while controlling the temperature. An inert diluent such as low boiling hydrocarbons, diethyl ether, or chlorinated hydrocarbons may be used to moderate the reaction but are not necessary. A convenient method of determining when the reaction is complete is to monitor the disappearance of the hydrazone by vapor phase chromatography. When all of the hydrazone has been oxidized, the aqueous layer is separated, the organic layer washed with a bicarbonate solution to remove any remaining hypochlorite, dried, and stored below 0° C.

As the size of $R_1$ and $R_2$ increases and the hydrazone becomes less water soluble, the hypochlorite oxidation becomes more difficult due to the heterogeneity of the reaction mixture and inert cosolvents such as dioxane or t-butyl alcohol have to be employed.

Process #3

The third process consists essentially of reducing the corresponding secondary-(alkyl, cycloalkyl, bicycloalkyl or aralkyl)-α-hydroperoxyazoalkane to the α-hydroxyazo compound with a mild non-acidic reducing agent such as aqueous sodium sulfite.

The α-hydroperoxyazoalkanes are prepared by bubbling oxygen into a solution of the corresponding secondary-(alkyl, cycloalkyl, bicycloalkyl or aralkyl)-hydrazone in an inert solvent until the hydrazone has been completely oxidized to the α-hydroperoxyazoalkane. The method is described in Application Ser. No. 88,248 of R. E. MacLeay and O. L. Mageli and Application Ser. No. 88,249 of R. E. MacLeay and C. S. Sheppard both filed Nov. 9, 1970 both now abandoned. Most of the α-hydroperoxyazoalkanes are thermally unstable and shock sensitive so extreme care should be exercised in handling them. It is desirable to isolate the final α-hydroxyazo, it is preferable to use a low boiling hydrocarbon as the solvent such as pentane or hexane.

Since both the α-hydroperoxyazoalkanes and the α-hydroxyazoalkanes are sensitive to acidic reagents, it is essential that the reducing system used be essentially neutral or basic. Dilute aqueous solutions of sodium sulfite reduce the α-hydroperoxyazoalkane smoothly. On the other hand, dilute aqueous solutions of sodium bisulfite, which is somewhat acidic give much lower yields due to acidic decomposition of the αhydroperoxyazoalkane. Due to the thermal instability of the α-hydroperoxyazoalkanes and the α-hydroxyazos the reductions are usually carried out below 25° C. This requires cooling and slow addition of the reducing agent to control the exotherm generated in the reduction. Vapor phase chromatography offers a convenient method for monitoring the reduction.

The temperature range for the reduction should take into consideration the thermal stability of the starting azohydroperoxide and the final product. Therefore the reduction should be run below 50° C, preferably below 35° C, and most preferably below 25° C. Since the azohydroperoxide reacts very readily, the lower temperature limit will be controlled by the freezing point of the aqueous solution. Preferably it should be run above −10° C and most preferably above −5° C. Since the azohydroperoxides and the α-hydroxyazos are quite soluble in hydrocarbons, chlorinated hydrocarbons, alcohols, ethers, esters and nitriles, any of these inert solvents are suitable providing the reaction is not run below the freezing point of the solvent. Examples of such suitable solvents are pentane, hexane, heptane, octane, methanol, ethanol, isopropanol, propanol, n-butyl alcohol, isobutyl alcohol, t-butyl alcohol, nonane, decane, dodecane, cyclohexane, methylcyclohexane, cyclopentane, benzene (above 5° C), toluene, dichlorobenzene, trichlorobenzene, t-butylbenzene, xylene, methylene chloride, chloroform, carbon tetrachloride, perchloroethylene, mineral spirits, styrene, α-methylstyrene, diethyl ether, dipropyl ether, di-butyl ether, dioxane, tetrahydrofurane, ethyl acetate, methyl acetate, ethyl benzoate, acetonitrile and propionitrile. However, if the α-hydroxyazo is to be isolated, it is preferable to use the more volatile solvents. The concentration of the azohydroperoxide in the solvent can vary from 1% to 99% but for practical reasons it is preferable to use a concentration above 25%. For safety reasons it is preferable to use a concentration of 75% or less.

Due to the acid sensitivity of the α-hydroxyazo products and the azohydroperoxide starting material, it is essential that the pH of the reducing system be at pH 7 or above at the beginning and throughout the reduction. Aqueous sodium sulfite solution is the most preferred reducing system. The concentration of the solution can vary from ½% to a saturated solution. However the more concentrated the solution, the slower it must be added to control the reaction exotherm. Another suitable reducing system would be hydrogen in the presence of hydrogenation catalysts such as Raney nickel, platinum on carbon, platinum oxide, palladium on charcoal, etc. It would be preferable to run these hydrogenations in the presence of a weak base to prevent acid decomposition of the azo-hydroperoxide or α-hydroxyazo. Other suitable reducing systems would include potassium iodide in a basic system, sodium borohydride, sodium thiosulfate, sodium and alcohol, lithium aluminum hydride, aluminum isopropoxide and sodium in ammonia. Again the most preferred system utilizes sodium sulfite, a cheap reagent which gives a clean reaction.

Secondary-alkyl-α-alkoxyazoalkanes

The secondary-(alkyl, cycloalkyl, bicycloalkyl or aralkyl)-α-alkoxyazoalkanes are prepared by reacting the corresponding secondary-alkyl-α-chloroazoalkane with a solution of the potassium or sodium salt of the desired alcohol in that alcohol. For the lower molecular weight alcohols such as methanol and ethanol, a solution of potassium or sodium hydroxide in methanol or ethanol is sufficient. For the higher molecular weight alcohols, the sodium salt can be prepared from the alcohols with sodium metal or from sodium hydride in dimethylformamide and then the α-chloroazo added.

The reactions can be run from 0° C to 50° C but is preferably run at 15°-30° C. The α-chloroazoalkane should be added to the alcohol solution to insure the presence of excess base throughout the reaction. If the alcohol solution is added to the α-chlorazo, it will still react but the free alcohol will also react to generate HCl and both the α-chloroazos and the α-alkoxyazos are unstable in the presence of acid. The product is isolated by diluting the alcohol solution with water and separating the organic layer that forms.

Difunctional secondary-alkyl-α-alkoxyazoalkanes can be prepared by reacting the corresponding α-chloroazoalkanes with sodium salts of diols in inert solvents such as ethers.

Secondary-alkyl-α-aryloxyazoalkanes

The secondary-(alkyl, cycloalkyl, bicycloalkyl or aralkyl)-α-aryloxyazoalkanes were prepared by reacting the corresponding secondary-alkyl-α-chloroazoalkane with a solution of the appropriate phenol and an equivalent amount of sodium or potassium hydroxide in methanol. The phenol being more acidic than the methanol preferentially reacts with the secondary-alkyl-α-chloroazoalkane.

The reaction can be run from 0° C to 50° C but is preferably run at 15°–30° C. The α-chloroazoalkane should be added to the alcohol solution to insure the presence of excess base throughout the reaction and to minimize the formation of methoxy by-product. The product is isolated by diluting the alcohol solution with water and separating the organic layer that forms. Excess phenol can be removed by a dilute caustic wash.

Difunctional secondary-alkyl-α-aryloxyazoalkanes can be prepared by reacting the corresponding α-chloroazoalkanes with sodium salts of dihydroxy aromatic compounds in inert solvents such as ethers.

Secondary-alkyl-α-carbonatoazoalkanes

The secondary-(alkyl, cycloalkyl, bicycloalkyl or aralkyl)-α-carbonatoazoalkanes are prepared by reacting the corresponding secondary-alkyl-α-chloroazoalkane with a slurry of the sodium or potassium alkyl carbonate in N,N-dimethylformamide. The reactions can be run from 0° C to 70° C but are preferably run at 30°–50° C to complete the reaction in a reasonable time and to minimize any decomposition of the α-chloroazo. The product is isolated by diluting the mixture with water and separating the organic layer that forms.

The secondary-(alkyl, cycloalkyl, bicycloalkyl or aralkyl)-α-carbonatoazoakanes can also be prepared by reacting the sodium salts of the corresponding α-hydroxyazoalkanes with chloroformates and bis chloroformates. The sodium salts of the α-hydroxyazoalkanes can be prepared by reacting the α-hydroxyazoalkanes with sodium hydride in N,N-dimethylformamide.

Secondary-alkyl-α-(t-alkyl or t-aralkyl)peroxyazoalkanes

The secondary-(alkyl, cycloalkyl, bicycloalkyl or aralkyl)-α-(t-alkyl or t-aralkyl)peroxyazoalkanes are prepared by reacting the corresponding α-chloroazoalkane with alkali metal (sodium or potassium) salts (or salt solutions) of t-alkyl or t-aralkylhydroperoxides.

The reaction can be run in water, alcohols and inert solvents such as ethers, hydrocarbon solvents, dimethylformamide or dimethyl sulfoxide. When the lower molecular weight t-alkyl hydroperoxides, such as t-butyl, α,α-dimethylbenzyl, t-amyl or t-octyl hydroperoxides which readily form aqueous salt solutions, are employed, the preferred solvent is water. The water reacts to a small extent with the α-chlorazo compound to form α-hydroxy azo as an impurity. When the lower molecular weight alcohols such as methanol, ethanol or isopropanol are used as the solvent, the α-chlorazo compound reacts to a small extent with the solvent to form the α-alkoxy azo as an impurity.

When the higher molecular weight t-aliphatic hydroperoxides, which do not form salts readily in aqueous solution, are employed, the preferred solvent is an inert solvent such as ethers or hydrocarbons in combination with the anhydrous salt of the hydroperoxide.

The reaction can be run at −10° to 40° C but preferably at 15° to 25° C. This allows for a reasonable reaction rate and a minimum of decomposition. At the lower temperature the rate of the reaction of the α-chlorazo compounds with the salts of the hydroperoxides slows down and the side reactions (reaction with water or alcohols) become more pronounced. At the higher temperatures, the yield begins to suffer due to partial thermal decomposition of the product. One also increases the chance of having a rapid decomposition of the product occurring when operating a the higher temperature. When an aqueous or methanolic system is employed, the α-chloro-azo compound should be added to the hydroperoxide solution. In this manner there will always be an excess of the hydroperoxide which will keep the side reactions with the water or alcohol at a minimum. In the reverse addition, the α-chloro-azo compound would be in excess throughout the first 3/4 of the reaction and could readily react with the water and/or alcohol present. The α-chloro-azo compound can be added neat or in a solution of an inert solvent such as ethers, hydrocarbons or chlorinated hydrocarbons. The reaction of the α-chloro-azo compound with the hydroperoxide is moderately exothermic so the α-chloro-azo compound must be added slow enough and with sufficient cooling that the reaction temperature does not exceed the prescribed range. Although some reaction will occur no matter what the mole ratios of the reagents are it is preferably to use a slight equivalent excess of the hydroperoxide salt to minimize the side reactions. In addition we have found that the results are even better if a small amount of the free hydroperoxide is also present. This can be removed in most cases by a basic wash after the reaction is over. Due to the low thermal stability of these compounds, it is essential that once the product is formed, the washes and subsequent workup should be carried out below room temperature, preferably between 0°–5° C. Likewise any containers for holding these products should be precooled before the azo-peroxide is added to it. The product should be stored below 0° C; preferably around −20° C to prevent thermal decomposition. The compounds are very susceptible to acid decomposition and practical grades of hydrocarbons should be washed with $NaHCO_3$ solutions and dried before using as diluents. It is recommended that the α-peroxyazo compounds be diluted with inert solvents such as hydrocarbons to at least 75% and preferably 50% for safety reasons. Some of these compounds are shock sensitive in the pure form. Consequently care must be exercised in the low temperature storage of these compounds where the pure material may crystallize out of solution upon storage at very low temperatures.

Difunctional secondary-alkyl-α-(t-alkyl or t-aralkyl) peroxyazoalkanes can be prepared in a similar manner by reacting the α-chlorazo compound with di-sodium or potassium salts of dihydroperoxides.

Examples of suitable dihydroperoxides include 2,5-dihydroperoxy-2,5-dimethylhexane, 2,5-dihydroperoxy-2,5-dimethylhexyne-3 and 1,3-di[2-hydroperoxypropyl-2]benzene.

Secondary-alkyl-α-(alkylthio or arylthio)azoalkanes

The secondary-(alkyl, cycloalkyl, bicycloalkyl or aralkyl)-α-(alkylthio or arylthio) azoalkanes are conveniently prepared by reacting an alcohol solution of an alkali or alkaline earth salt of the corresponding thio compound with a secondary-(alkyl, cycloalkyl, bicycloalkyl or aralkyl)-α-chloroazoalkane. The reaction can be run from 0° C to 50° but is preferably run at 15°–30° C. The α-chloroazoalkane should be added to the solution of the metal salt of the thio compound in the alcohol. The reaction proceeds quite readily and the product is isolated by diluting the reaction mixture with water and separating the organic layer that forms. Excess thio compounds can be removed by basic washes. Suitable alcoholic solvents include methanol (preferred), ethanol, propanol and isopropanol.

Difunctional secondary-alkyl-α-(alkylthio or arylthio)-azoalkanes can be prepared by reacting the corresponding α-chloroazoaikane with the di-sodium or di-potassium salt of a dithiol in alcohol.

Difunctional sulfides can be prepared from the corresponding α-chloroazoalkanes and sodium sulfide in aqueous isopropanol.

Secondary-alkyl-α-azidoazoalkanes

The secondary-(alkyl, cycloalkyl, bicycloalkyl or aralkyl)-α-azidoazoalkanes are prepared by reacting the corresponding α-chloroazoalkane with a solution of sodium azide.

The reaction can be run from 0° C to 50° C but is preferably run at 15°–30° C. The α-chloroazoalkane should be added to the solution of the sodium azide. The reaction proceeds quite rapidly in aqueous methanol, ethanol, propanol, isopropanol or acetone. The product is isolated by diluting the reaction mixture with water and separating the organic layer that forms. In some cases the product is shock sensitive and this should be kept in mind while handling these compounds.

Secondary-alkyl-α-imidoazoalkanes

The secondary-(alkyl, cycloalkyl, bicycloalkyl or aralkyl)-α-imidoazoalkanes are prepared by reacting the corresponding α-chloroazoalkane with alkali metal or alkaline earth salts (or their solutions) of imides.

The reaction should be run in inert solvents. Preferably the solvents should be miscible with water and capable of at least partially dissolving the metal salt of the imide. Examples of such solvents are acetone, dimethylsulfoxide, dimethylformamide and t-butanol. Water itself is a good reaction medium, however the yields are generally improved by using aqueous solutions of the above mentioned solvents. Methanol, ethanol, propanol and isopropanol are poor solvents for this reason because they are capable of reacting with the α-chloroazo compound to form the α-alkoxyazo compound and thereby lower the yield and purity of the desired product. The reaction can be run at 0°–90° C but preferably is run at 25°–50° C to obtain a reasonable reaction rate and a minimum of decomposition. The α-chloroazo compound is preferably added at a moderate rate to a slurry or solution of the imide salt. The α-chlorazo compound can be added neat or in a solution of an inert solvent such as ethers, hydrocarbons, chlorinated hydrocarbons, dimethylsulfoxide, dimethylformamide or t-butanol. The imide salt may be prepared and isolated before adding it to the reaction medium or it may be prepared in situ by adding approximately an equivalent amount of a strong inorganic base such as the alkali metal or alkaline earth hydroxides, preferably the more economic hydroxides such as sodium or potassium are used, to a solution (or slurry) of the imide. It is also preferable to have a slight excess of the imide over the alkali hydroxide and a slight excess of the imide salt over the α-chloroazo compound. The reaction period generally varies from ½ hour to 4 hours depending on the choice of solvent and the reaction temperature. The reaction product is isolated by diluting the reaction mixture with water and separating (or extracting) the organic layer.

Secondary-alkyl-α-(thiocyanato, isothiocyanato and isocyanatpo)azoalkanes

The secondary-(alkyl, cycloalkyl, bicycloalkyl or aralkyl)-α-thiocyanatoazoalkanes are prepared by reacting the corresponding α-chlorazo compound with an aqueous alcohol solution of ammonium or sodium thiocyanate. The secondary-(alkyl, cycloalkyl, bicycloalkyl or aralkyl)-α-thiocyanatoazoalkane forms quite readily and can be isolated by dilution with water and separation by filtration or extraction. However on prolonged stirring in the aqueous alcohol, the α-thiocyanatoazoalkane isomerizes to the corresponding α-isothiocyanatoazoalkane which can be isolated by the same technique.

The rate of isomerization of the α-thiocyanato-azoalkane varies with the structure of the azo compound (i.e., R′, R″, $R_1$, and $R_2$) and in some cases a considerable amount of the α-isothiocyanatoazoalkane is obtained upon work-up. The α-thiocyanato-azoalkanes can be isomerized to the corresponding α-isothiocyanato-azoalkanes by gentle warming or by stirring a hydrocarbon solution of the α-thiocyanato-azoalkane over neutral alumina. For the low molecular weight azoalkanes having reasonable thermal stability, the isomers can be separated by gas chromatography. The α-thiocyanatoazoalkanes have a characteristic sharp but weak band around 2350 cm$^{-1}$ in their infrared spectrum while the α-isothiocyanato-azoalkanes have a characteristic strong board band around 1900–2200 cm$^{-1}$.

It is known in the literature that isothiocyanates are thermodynamically more stable than thiocyanates and the rate of isomerization of the thiocyanates to the isothiocyanates is dependent upon the ability of the groups to form carbonium ions. (Peter A. Smith, Open-Chain Nitrogen Compounds, Vol. I, W. A. Benjamin, Inc., New York, p. 237.)

We have found that for the preparation of the α-isothiocyanatoazoalkanes, it is preferable to react the α-chloroazoalkanes at room temperature with sodium or ammonium thiocyanate in 50–75%, preferably 70–75%, aqueous isopropanol for 1–3 hours. It is advantageous to follow the formation of the α-thiocyanatoazoalkane and its consequent rearrangement to the α-isothiocyanatoazoalkane by infrared spectroscopy or gas chromatography. The reaction may also be run in aqueous methanol or ethanol but varying amounts of the corresponding α-alkoxy-azoalkanes form as side products. Other suitable solvents are aqueous solutions of other water miscible solvents such as acetone, dioxane or dimethylformamide.

After the reaction and isomerization are complete, the reaction mixture is poured into water and the product extracted with pentane, hexane or methylene chloride. The solvent solution is washed with 10% NaHCO$_3$ solution, dried and the solvent evaporated under reduced pressure. If there is still some α-thiocyanato-azoalkane left, it can be converted to the α-isothiocyanato-azoalkane or separated from it by column chromatography over neutral alumina.

The secondary-(alkyl, cycloalkyl, bicycloalkyl or aralkyl)-α-isocyanatoazoalkanes are prepared by reacting the corresponding α-chloroazoalkanes with aqueous alcohol solutions of potassium or sodium cyanate. Other suitable solvents are aqueous solutions of acetone, dioxane or dimethylformamide. The reaction conditions are very similar to those for the preparation of the α-isothiocyanatoazoalkanes.

Since some of the α-isocyanato-azoalkanes are more reactive than others, occasionally one obtains varying amounts of the corresponding azoalkanes containing α-carbamate groups due to some reaction of the alcohol solvent with the α-isocyanatoazoalkane. The α-carbamates can be separated from the α-isocyanates by chromatography over alumina if necessary.

Secondary-alkyl-α-(thioureido and ureido) azoalkanes

The α-thioureido and α-ureido derivatives of the secondary-(alkyl, cycloalkyl, bicycloalkyl or aralkyl) azoalkanes were prepared by adding ammonia, primary or secondary amines and primary or secondary diamines to a stirred pentane solution of the corresponding secondary-alkyl-α-(isocyanato or isothiocyanato)-azoalkane. The α-thiourea and α-ureido derivatives are solids which have limited solubility in pentane and crystallize out of solution upon formation in almost all cases. The reaction may be followed by gas chromatography if the starting azo has sufficient thermal stability to go through the gas chromatograph. The reaction may also be followed by following the disappearance of the α-isothiocyanate band around 2000–2200 cm$^{-1}$ or the α-isocyanate band around 2450 cm$^{-1}$ in the infrared spectrum.

In general, the reactions proceed quite rapidly and in some cases it is advisable to cool the reactions. In some cases, if the amine is very weakly basic, it is advisable to form the sodium salt of the amine with sodium hydride in an inert solvent and then add the isothiocyanate or isocyanate to it.

The following is a non-limiting list of amines which are useful in forming the α-thiourea and α-ureido azoalkanes: ammonia, methylamine, ethylamine, propylamine, isopropylamine, n-butylamine, isobutylamine, secondary-butylamine, t-butylamine, ethylenediamine, piperazine, adamantylamine, allylamine, allylcyclohexylamine, 6-aminocaproic acid, 2-aminoheptane, 6-amino-1-hexanol, 1-aminoindane, 5-aminolevulinic acid, 2-amino-1-methoxypropane, 3-aminomethylpyridine, 11-aminoundecanoic acid, n-amylamine, benzylamine, benzylmethylamine, N-benzylpropargylamine, bis-(2-ethoxyethyl)amine, 4-t-butylcyclohexylamine, 4-chlorobenzylamine, cyclododecylamine, cyclohexylamine, cyclopropylamine, n-decylamine, diallylamine, dicyclohexylamine, diethanolamine, diethylamine, diisopropylamine, dimethylamine, dodecylamine, ethanolamine, 2-ethylhexylamine, furfurylamine, hydroxylamine, isoamylamine, methyl 3-aminocrotonate, N-methylaniline, N-methylcyclodecylamine, t-octylamine, phenethylamine, tetrahydrofurfurylamine, n-undecylamine, m-xylylenediamine, m-aminoacetophenone, 1-aminoanthracene, p-aminobenzoic acid, 4-aminobenzylcyanide, 2-aminofluorene, 2-aminonaphthalene, 4-amino-1,8-naphthalimide, p-aminophenol, p-bromoaniline, 2-chloroaniline, 3,5-diaminobenzoic acid, 2,5-diaminofluorene, 2,4-dimethoxyaniline, diphenylamine, ethyl p-aminobenzoate, 3fluoroaniline, methyl anthranilate, p-phenylenediamine, o-toluidine, 2-amino-5-chloropyridine, 2-amino-4-picoline, 2,6-diaminopyridine, glycine methyl ester, L-phenylalanine and L-serine, which are all commercially available.

Difunctional derivatives can be prepared by reacting the α-isocyanato and isothiocyanatoazoalkanes with diamines such as 1,4-diaminobutane, 1,12-diaminododecane, 1,3-diaminopropane and 1,6-hexanediamine.

Secondary-alkyl-α-Semicarbazide and α-Thiosemicarbazide Azoalkanes

The derivatives formed by the reaction of hydrazines and hydrazine derivatives are α-thiosemicarbazide and α-semicarbazide derivatives. Primary and secondary alkylhydrazines react with the α-isothiocyanates and α-isocyanates at the nitrogen adjacent to the alkyl group since this is the more basic nitrogen.

Examples of such hydrazines are methylhydrazine, ethylhydrazine, propylhydrazine, isopropylhydrazine, n-butylhydrazine, isobutylhydrazine, secondary-butylhydrazine, n-amylhydrazine, isoamylhydrazine, cyclohexylhydrazine, n-octylhydrazine, n-dodecylhydrazine, benzylhydrazine, 2-phenylethylhydrazine and 2-hydroxyethylhydrazine, all of which are readily available either commercially or by well-known synthetic routes.

t-Alkylhydrazines and arylhydrazines react with the α-isothiocyanates and α-isocyanates at the terminal nitrogen.

Examples of such hydrazines are t-butylhydrazine, t-amylhydrazine, t-methylcyclohexylhydrazine, t-cumylhydrazine, t-adamantylhydrazine, phenylhydrazine, 3-chlorophenylhydrazine, 4-chloro-o-tolylhydrazine, 2,4-dichlorophenylhydrazine, 3-fluorophenylhydrazine, 2-hydrazinopyridine, o-methoxyphenylhydrazine and m-tolylhydrazine.

Unsymmetrical dialkyl-hydrazines react similar to the t-alkyl-hydrazines (at the terminal nitrogen).

Examples of such hydrazines are 1,1-dimethylhydrazine and 1,1-diethylhydrazine.

Difunctional derivatives can be prepared by reacting the α-isocyanato and isothiocyanatoazoalkanes with hydrazine or symmetrical 1,2-dialkyl or diarylhydrazines such as 1,2-dimethylhydrazine, 1,2-diphenylhydrazine.

Acid hydrazides (and dihydrazides), semicarbazides (and thiosemicarbazides), carbohydrazide and carbazates (thiocarbazates, bis-carbazates and bis-thiocarbazates) also react with the α-isothiocyanates and α-isocyanates on the terminal nitrogen.

Examples of such acid hydrazides and acid dihydrazides are acethydrazide, benzoylhydrazine, butyric acid hydrazide, cyclopropane-carboxylic acid hydrazide, 2-furoic acid hydrazide, glutaric acid dihydrazide, p-hydroxybenzoic acid hydrazide, 2-hydroxy-2-naphthoic acid hydrazide, indole-3-acetic acid hydrazide, isonicotinic acid hydrazide, nicotinic acid hydrazide, oxalyl dihydrazide, phenylacetic acid anhydride, salicylhydrazide, succinic acid dihydrazide and p-toluic acid hydrazide, all of which are commercially available.

Examles of such semicarbazides and thiosemicarbazides are semicarbazide, thiosemicarbazide, 4-allylthiosemicarbazide, 4-cyclohexylthiosemicarbazide, 4-ethyl-3-thiosemicarbazide and 4-phenylsemicarbazide, all of which are commercially available. Other semicarbazides which are readily available from the reaction of 2-phenyl-α$^2$-1,3,4-oxadiazolin-5-ones with amines followed by acid hydrolysis [A. Stempel, J. Zelanskas and J. Aeschlimann, J. Org. Chem. 20, 412 (195)] include 4-allylsemicarbazide, 4-n-butylsemicarbazide, 4,4-diethylsemicarbazide, 4,4-dimethylsemicarbazide, and 4-methylsemicarbazide.

Bis semicarbazides which are useful in the above reactions are prepared by the reaction of diamines with 2-phenyl-$\alpha^2$-1,3,4-oxadiazolin--oxadiazlin-5-one followed by acid hydrolysis (U.S. Pat. No. 3,585,200), include 4,4'-ethylenebis-semicarbazide and 4,4,4',4' diethylene-bis-semicarbazide. Other bis semicarbazides can be made by the same route by substituting diamines such as 1,4-diaminobutane, 1,12-diaminododecane, 1,3-diamino-propane, 1,6-hexanediamine, m-xylylenediamine and 2,6-diaminopyridine, all of which are commercially available.

Carbohyrazide, which is also commercially available, reacts with the $\alpha$-isothiocyanates and $\alpha$-isocyanates in a manner similar to the bis semicarbazides.

Examples of suitable carbazates which are commercially available include t-butyl carbazate and ethyl carbazate. Other carbazates easily prepared from hydrazine and the corresponding carbonates and/or chloroformates include butyl, isobutyl, amyl, isoamyl, hexyl, heptyl, octyl and dodecyl carbazates [Japan, 14, 720 (63)].

Thiocarbazates that can be prepared from hydrazine and the corresponding thiocarbonates and/or thiochloroformates include butyl, isobutyl, amyl, isoamyl, hexyl, heptyl, octyl and dodecyl thiocarbazates.

Bis carbazates that can be prepared from 2 moles of hydrazine and 1 mole of bis chloroformate include butylene, ethylene, diethylene, triethylene and hexylene bis carbazates. Likewise bis thiocarbazates that can be prepared from 2 moles of hydrazine and 1 mole of bis thiochloroformate include butylene, ethylene, diethylene, triethylene, and hexylene bis thiocarbazates.

Secondary-alkyl-$\alpha$-(Carbamate and Thiocarbamate)azoalkanes

The $\alpha$-carbamate and $\alpha$-thiocarbamate azoalkanes are formed by reacting the $\alpha$-isocyanato and $\alpha$-isothiocyanato azoalkanes with alcohols in the presence of a base. Alcohol solutions of metal hydroxides such as sodium or potassium hydroxide are especially suitable for these reactions. The $\alpha$-isocyanato azoalkanes are much more reactive than the corresponding $\alpha$-isothiocyanato-azoalkanes. Many of the $\alpha$-isocyanato azoalkanes will react to a considerable extent without any basic catalyst while the $\alpha$-isothiocyanatoazoalkanes have to be stirred overnight to obtain complete reaction. The reactions are easily carried out in the lower molecular weight alcohols such as methanol, ethanol, propanol, isopropanol, butanol, isobutanol, sec-butanol and tert.-butanol. If for some reason it is desirable to run the reaction with higher molecular weight alcohols then inert solvents such as ethers or N,N-dimethylformamide have to be employed.

Secondary-alkyl-$\alpha$-arylsulfonylazoalkanes

The secondary-(alkyl, cycloalkyl, bicycloalkyl, or aralkyl)-$\alpha$-arylsulfonyl-azoalkanes were prepared by reacting the corresponding secondary-alkyl-$\alpha$-chloroazoalkanes with the sodium salt of an aromatic sulfinic acid in aqueous solutions of alcohol (such as methanol, ethanol, propanol or isopropanol), ketones (such as acetone or methyl ethyl ketone) dioxane or dimethylformamide. The reaction can be run from $-10°$ to $50°$ C but preferably is run at $0°$–$20°$ C. The $\alpha$-chloroazoalkane should be added to the aqueous solution to insure an excess of the sodium salt throughout the reaction and minimize side reactions between the $\alpha$-chlorazo and the solvents. The product is isolated by diluting the reaction mixture with water and separating or extracting the organic layer that forms.

Utility

Compounds (I) in general are useful as free radical generators, polymerization initiators, curing agents for unsaturated polyester resin compositions, initiators for free radical initiated chemical reactions, blowing agents for producing foamed polymers and plastics, and cross-linking agents for polyethylenes and rubbers.

Polymerization

In the free-radical initiated polymerization (or copolymerization) of ethylenically unsaturated monomers at suitable temperatures, compounds (I) are found to be effective polymerization initiators.

Illustrative polymerizable monomers include olefins such as ethylene, propylene, styrene, chlorostyrene, vinyltoluene, vinylpyridine, divinylbenzene and $\alpha$-methylstyrene; conjugated olefins such as 1,3-butadiene, isoprene and chloroprene; vinyl esters such as vinyl acetate, vinyl propionate, vinyl laurate, vinyl benzoate and divinyl carbonate; allyl esters such as allyl acetate, diallyl carbonate, allyl diglycol carbonate, allyl benzoate and diallyl phthalate; unsaturated conjugated nitriles such as acrylonitrile and methacrylonitrile; acrylic acid and methacrylic acid and their esters and amides such as methyl, ethyl, n-butyl and 2-ethylhexyl acrylates and methacrylates and acylamide and methacrylamide; maleic anhydride; maleic acid and fumaric acid and their esters; vinyl halo and vinylidene halo compounds such as vinyl chloride, vinyl bromide, vinyl fluoride, vinylidene chloride and vinylidene fluoride; perhalo olefins such as tetrafluoroethylene, hexafluoropropylene, and chlorotrifluoroethylene; vinyl ethers such as methyl vinyl ether and n-butyl vinyl ether; allyl ethers; vinyl and allyl ketones; acrolein; and mixtures thereof, especially ethylene, vinyl acetate, acrylonitrile, vinyl chloride, ethyl acrylate, methyl methacrylate and styrene.

Temperatures of from about $0°$ C. (e.g., with acrylonitrile) to about $260°$ C. (e.g., with ethylene), preferably about $20°$–$235°$ C., and initiator levels of about 0.005–1.0% or more (preferably 0.01–0.5%) by weight based on monomer, depending on azo half-life, temperature and monomer, are normally employed.

Especially preferred initiators are compounds I where X is —CN or —N$_3$, the $\alpha$-cyanoazos normally being used in the range of about $70°$–$130°$ C. Other very efficient initiators for vinyl monomers are (temperatures where given indicate preferred ranges of use) compounds (I) where X is —C(=O)NH$_2$ (about $15°$–$25°$ C. higher than corresponding $\alpha$-cyanoazo), —C(=NOH)HN$_3$ (about $10°$ C. higher than $\alpha$-cyanoazos), —OOR$_5$ (useful at lower temperatures such as used for vinyl chloride polymerizations), —SCN, —NCX',

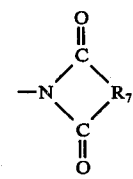

(high temperatures) and

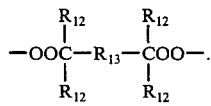

Other effective initiators include those where X is —OH, —OR$_3$ (higher temperatures), —OC(=O)OR$_3$, —SR$_6$ (high temperatures), —OR$_{11}$O—, —SR$_{14}$S— or —S—.

Curing

In curing unsaturated polyester resin compositions at suitable curing temperatures in the presence of initiating amounts of free-radical curing catalysts, compounds (I) are found to be effective curing catalysts.

Unsaturated polyester resins curable by the subject azos normally consist of an unsaturated polyester and a polymerizable monomer.

The unsaturated polyester component is normally obtained by the esterification of one or more ethylenically unsaturated di- or polycarboxylic acids or their anhydrides, such as maleic acid, fumaric acid, glutaconic acid, itaconic acid, mesaconic acid, citraconic acid, allylmalonic acid, allylsuccinic acid, and others, with saturated or unsaturated polyalcohols such as ethylene glycol, diethylene glycol, triethylene glycol, 1,2-propanediol, 1,3-propanediol, 1,2-butanediol, 1,4-butanediol, 2,2-dimethyl-1,3-propanediol, 2-buten-1,4-diol, 2-butyn-1,4-diol, glycerol, 2,2,4-trimethyl-1,3-pentanediol, 2,2,4,4-tetramethyl-1,3-cyclobutanediol, 1,4-di(hydroxymethyl)cyclohexane, 1,2,5-hexanetriol, pentaerythritol, mannitol and others. Mixtures of such acids and/or alcohols may also be used. The unsaturated di- or polycarboxylic acids may be replaced, at least partly, by saturated carboxylic acids such as adipic acid, succinic acid, sebacic acid and others, or by aromatic dicarboxylic acids, such as phthalic acid, tetrahydrophthalic acid, and others and their anhydrides such as phthalic anhydride. The acids used as well as the alcohols employed may be substituted by halogen or other substituents, preferably by halogen. Examples of such suitable halogenated acids are, for instance, tetrachlorophthalic acid, 1,4,5,6,7,7-hexachloro-2,3-dicarboxybicyclo (2.2.1)-5-heptene, and others, or their anhydrides.

The other component of the unsaturated polyester resin compositions is an ethylenically unsaturated monomer, preferably ethylenically unsaturated monomers such as styrene, chlorostyrene, vinyltoluene, methyl methacrylate, diallyl phthalate, dibutyl fumarate, acrylonitrile, triallyl cyanurate, α-methylstyrene, divinylbenzene, methyl acrylate, diallyl maleate, ethyl methacrylate, ethyl acrylate and others, which are co-polymerizable with said unsaturated polyesters.

A preferred resin composition contains as the polyester component the esterification product of propylene glycol (a polyalcohol), maleic anhydride (an anhydride of an unsaturated dicarboxylic acid) and phthalic anhydride (an anhydride of an aromatic dicarboxylic acid) and as the monomer component styrene.

Initiating temperatures of about 20°-150° C. and azo levels of about 0.05 to 5.0% or more (preferably 0.1-2.0%) by weight of curable resin, depending on resin, azo half-life and temperature, are normally employed.

Especially preferred as curing agents are compounds I where X is —CN (preferably at 60°-145° C.) or —N$_3$. Also efficient are those where X is —C(=O)NH$_2$, —C(=NOH)NH$_2$. —OOR$_5$ (effective at low temperatures),

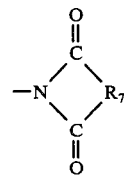

(preferably at 115°-130° C.), —SO$_2$R$_{15}$ (preferably at 130°-145° C) and

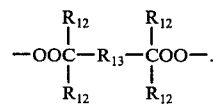

Other effective compounds (I) include those wherein X is —OR$_3$, —SR$_6$, —OR$_{11}$O—, —SR$_{14}$S— or —S—. In using the more acid sensitive azo compounds, such as where X is —Cl, —Br, —OH, —OC(=O)OR$_3$, —SR$_6$, —OR$_3$, —SCN or —NCX' (and their derivatives), —OR$_{11}$O—, —OC(=O)OR$_{11}$OC(=O)O—, —SR$_{14}$S— or —S—, it is desirable to use resin compositions which have low acid numbers.

Other Uses

As indicated above, many of these compounds have other uses besides curing and initiating polymerizations. For example, these compounds evolve one mole of nitrogen gas per azo group in the compound when decomposed. In addition, other gases are evolved from the breakdown and/or disproportionation of the radicals formed. Thus the compounds are useful in applications where copious quantities of gases are desired such as in producing foamed polymers.

Many of the compounds, as where X is —Cl, —Br, —OH, —OR$_3$, —OC(=O)OR$_3$, —SR$_6$, —NCO, —NHC(=X')OR$_3$, —NHC(=X')N(R$_8$)(R$_9$), —NHC(=X')NHNHC(=X')R$_4$, —NHC(=X')NHN(R$_8$)C(=X')N(R$_8$)(R$_9$), —NHC(=X')N(NH$_2$)R$_{10}$, —NHC(=X')NHNHR$_{16}$, —NHC(=X')NHNHC(=X')X'R$_3$, —NHC(=X')NHN(R'$_8$)(R'$_9$), —OR$_{11}$O—, —OC(=O)OR$_{11}$OC(=O)O—, —SR$_{14}$S—, —S—, —NHC(=X')N(R$_8$)R$_{14}$N(R$_9$)C(=X')NH—, —NHC(=X')X'R$_{14}$X'C(=X')NH—, —NHC(=X')X'R$_{14}$X'C(=X')NH—, —NHC(=X')NHNHC(=X')NHNHC(=X')NH—, —NHC(=X')NHNHC(=X')R$_{14}$C(=X')NHNHC(∇X')NH—, —NHC(=X')N(R$_8$)N(R$_9$)C(=X')NH—, —NHC(=X')NHNHC(=X')N(R$_8$)R$_{14}$N(R$_9$)C(=X')NHNHC(=X')NH— or —NHC(=X')NHNHC(=X')X'R$_{14}$X'C(=C(=X')NHNHC(=X')NH—, are thermally stable at or near room temperature but can be activated by a variety of acids to decompose quite rapidly at room temperature or below, generating gaseous products in the process. These compounds are thus useful in the preparation of rigid unsaturated polyester foams and other polymeric foams at ambient temperatures. Some of the compounds (α-hydroxy, α-isocyanato, α-chloro and others) are sensitive enough that the acidity of certain polyester resins is sufficient to activate them, resulting in simultaneous foaming and gelling. Others (α-alkoxy, α-thio, etc.) can be activated by strong acids or acyl alkyl-sulfonyl per-oxides. As the gelling an foaming occurs, the temperature of the foam increases and a cure occurs resulting in a rigid foam. Curing of the foams can also be enhanced by heating or by the addition of a conventional curing agent such as a peroxide or an acid insensitive azo compound. Polymerizable media include polyester resins, polymeric molecules (containing two or more copolymerizable vinyl unsaturation only in the terminal or pendant positions) dissolved in suitable copolymerizable vinyl monomers, viscous syrups of polymers dissolved in monomers, epoxy-containing monomers, and the like. Use of some of the compounds (I) to prepare foamed polyester resins of varying densities is illustrated in the examples. A more complete description of the foaming utility is contained in copending application S.N. filed (concurrently herewith, attorney docket no. IR-1741) of Ronald E. MacLeay et al for "Process For Preparing Foamed Structures".

Compounds (I) where n is 2 can be sequentially decomposed to generate free radicals by a variety of techniques and thus are useful as sequential free radical initiators for preparing block copolymers.

The preferred sequential decomposition method is to use two different temperatures, wherein at the lower temperature, the reaction is carried out for such a time interval that only a partial decomposition of Compound I is obtained, and subsequently, the second stage of the reaction is carried out at the higher temperature to completely decompose the remainder of I. Another method is to use the same temperature for both stages, wherein the second state is initiated after the first stage had been carried out for a specified time interval wherein only partial decomposition of I has occurred. Other methods of decomposing I (either partially or completely) that can be used include irradiation and chemical activation. Depending upon their structure, the 10-hour half-life temperature of the azo compounds varies from below 25° C to above 160° C. Thus, when using thermal decomposition techniques only, the symmetrical bis-azo compounds can be used to generate free radicals in sequence at temperatures from about 20° C to above 200° C. By employing irradiation or chemical activation techniques, the decomposition temperatures can be lowered to below 0° C. The amount of azo that is used will depend upon whether the compound is used to generate free radicals in sequence for the purpose of supplying reactant species or initiating species. In the former case stoichiometric amounts are used, while in the latter case relatively smaller amounts are used ranging from about 0.005 to about 20.0 percent of the reactants used. A preferred method is to employ the compounds as sequential free radical initiators for preparing block copolymers by partially decomposing the bis-azo compound in the presence of at least one monomer containing ethylenic unsaturation and subsequently completing the decomposition of the bis-azo in the presence of at least one other vinyl monomer. Standard polymerization techniques are used such as emulsion, suspension, solution and bulk free radical polymerizations. Such block copolymers are useful as compatibilizing agents for normally incompatible polymers.

Many of the azo compounds (I) are also useful intermediates as partially illustrated above in the preparation discussion.

Some of the higher temperature compounds (as where X is —OR$_3$, —SR$_6$ or

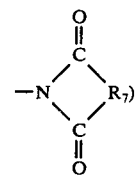

operate efficiently as finishing catalysts for variious monomers (such as styrene) and as initiators for high pressure ethylene polymerizations.

EXAMPLES

The following examples further illustrate the subject invention but are not in limitation thereof.

I. General Procedure for the Preparation of sec-Alkylhydrazines

A. Preparation of Ketazines

1. Aqueous System

Into a two liter 3-neck round bottom flask equipped with a reflux condenser, thermometer, magnetic stirrer and large addition funnel was added 344 grams (5.0 moles) of 46.5% aqueous hydrazine. Over approximately ½ hour, 10 moles of the desired ketone was added from the addition funnel, allowing the temperature to rise from 25 to about 90° - 95° C. The reaction mixture was refluxed in an oil bath around 100° C for 1 hour and cooled back to room temperature. The ketazine was taken up in 1 liter of pentane and the aqueous layer separated and discarded. The pentane solution was dried over anhydrous sodium sulfate, filtered and the pentane stripped off on a rotating evaporator. The yield was usually 95 - 100%. This method was used successfully to prepare ketazines from the following ketones: acetone, methyl ethyl ketone, cyclohexanone and cyclopentanone.

I. A. 2. Azeotropic Distillation

Into a 1 liter round bottom flask equipped with a magnetic stirrer and a Dean Stark trap containing a reflux condenser was added 103 grams (1.5 moles) of 46.5% aqueous hydrazine, about 0.2 grams of para-toluenesulfonic acid and 300 mls of benzene. To this solution was slowly added 3.0 moles of the appropriate ketone. The reaction mixutre was then heated up in an oil bath and the water azeotroped off. After the water had ceased to azeotrope, the reaction mixture was cooled and the benzene was stripped off on a rotating evaporator. The yield was usually above 90%. This method was used successfully to prepare ketazines from the following ketones: acetophenone, methyl isobutyl ketone and methyl norborn-2-yl ketone.

I. B. Preparation of sec-Alkylhydrazines

To a solution of 0.25 moles of the desired ketazine in 150 mls of ethanol cooled in an ice bath was slowly added 27 mls (approximately 0.25 moles) of 37% hydrochloric acid. The solution was transferred to a 500 ml hydrogenation bottle containing 50 mls of cold ethanol and 0.25 grams of platinum oxide. The bottle was placed on a Paar Hydrogenator, flushed 3 times with hydrogen, pressurized to 60 p.s.i. with hydrogen and the agitation begun. After the hydrogen pressure dropped 21 p.s.i. (approximately 0.26 moles), the hydrogenation was stopped, the excess hydrogen removed by water aspirator and the reaction mixture filtered. The filtrate was diluted with water (250–500 mls), transferred to a distilling flask and the ethanol distilled off. The aqueous The sec-alkylhydrazones in Table I were prepared by this method from the indicated sec-alkylhydrazine and ketone.

Table I

| Example # | sec-alkylhydrazone | starting sec-alkylhydrazine | starting ketone |
| --- | --- | --- | --- |
| 2-1 | cyclohexanone cyclopentylhydrazone | cyclopentylhydrazine | cyclohexanone |
| 2-2 | acetone cyclopentylhydrazone | cyclopentylhydrazine | acetone |
| 2-3 | acetone isopropylhydrazone | isopropylhydrazine | acetone |
| 2-4 | acetone sec-butylhydrazone | sec-butylhydrazine | acetone |
| 2-5 | acetone 1,3-dimethylbutylhydrazone | 1,3-dimethylbutylhydrazine | acetone |
| 2-6 | acetone cyclohexylhydrazone | cyclohexylhydrazine | acetone |
| 2-7 | acetone 1-phenylethylhydrazone | 1-phenylethylhydrazine | acetone |
| 2-8 | cyclohexanone isopropylhydrazone | isopropylhydrazine | cyclohexanone |
| 2-9 | cyclohexanone sec-butylhydrazone | sec-butylhydrazine | cyclohexanone |
| 2-10 | cyclohexanone 1-phenylethylhydrazone | 1-phenylethylhydrazine | cyclohexanone |
| 2-11 | cyclohexanone 1,3-dimethylbutylhydrazone | 1,3-dimethylbutylhydrazine | cyclohexanone |
| 2-12 | cyclohexanone cyclohexylhydrazone | cyclohexylhydrazine | cyclohexanone |
| 2-13 | methyl isobutyl ketone 1,3-dimethylbutylhydrazone | 1,3-dimethylbutylhydrazine | methyl isobutyl ketone |
| 2-14 | cyclopentanone cyclopentylhydrazone | cyclopentylhydrazine | cyclopentanone |
| 2-15 | methyl isobutyl ketone cyclohexylhydrazone | cyclohexylhydrazine | methyl isobutyl ketone |
| 2-16 | methyl isobutyl ketone isopropylhydrazone | isopropylhydrazine | methyl isobutyl ketone |
| 2-17 | 4-methoxy-4-methylpentanone-2 isopropylhydrazone | isopropylhydrazine | 4-methoxy-4-methylpentanone-2 |
| 2-18 | 4-methoxy-4-methylpentanone-2 1,3-dimethylbutylhydrazone | 1,3-dimethylbutylhydrazine | 4-methoxy-4-methylpentanone-2 |
| 2-19 | 4-methoxy-4-methylpentanone-2 cyclohexylhydrazone | cyclohexylhydrazine | 4-methoxy-4-methylpentanone-2 |
| 2-20 | methyl isobutyl ketone sec-butylhydrazone | sec-butylhydrazine | methyl isobutyl ketone |
| 2-21 | 4-methoxy-4-methylpentanone-2 sec-butylhydrazone | sec-butylhydrazine | 4-methoxy-4-methylpentanone-2 |
| 2-22 | methyl isobutyl ketone 1-phenylethylhydrazone | 1-phenylethylhydrazine | methyl isobutyl ketone |
| 2-23 | acetone 1-(norborn-2-yl)-ethylhydrazone | 1-(norborn-2-yl)ethylhydrazine | acetone |
| 2-24 | allyl levulinate isopropylhydrazone | isopropylhydrazine | allyl levulinate |
| 2-25 | methyl ethyl ketone 1,3-dimethylbutylhydrazone | 1,3-dimethylbutylhydrazine | methyl ethyl ketone |
| 2-26 | methyl ethyl ketone isopropylhydrazone | isopropylhydrazine | methyl ethyl ketone |
| 2-27 | methyl ethyl ketone sec-butylhydrazone | sec-butylhydrazine | methyl ethyl ketone |
| 2-28 | methyl ethyl ketone cyclohexylhydrazone | cyclohexylhydrazine | methyl ethyl ketone | solution was made basic to pH 12–14 and extracted with pentane to remove any ketone or hydrazo compound. The aqueous solution was then assayed iodometrically for % sec-alkylhydrazine and the yield determined. The yield was usually 90 – 95%. The following sec-alkylhydrazines were prepared by this method: isopropylhydrazine, sec-butylhydrazine, cyclohexylhydrazine, cyclopentylhydrazine, 1-phenylethylhydrazine, 1,3-dimethylbutylhydrazine and 1-(norborn-2-yl)-ethylhydrazine.

Note: The 1-(norborn-2-yl)ethylhydrazine was quite insoluble in the aqueous solution and the pentane and separated as a third layer between the two.

II. General Procedure for the Preparation of sec-Alkylhydrazones

Into a 500 ml round bottom flask equipped with a magnetic stirrer and reflux condenser was added an aqueous solution containing 0.25 moles of the desired sec-alkylhydrazine (from I B) and 0.25 moles of the desired ketone. The solution was then refluxed for approximately 1 hour in an oil bath at 100° C, cooled back to room temperature and the organic layer which formed was separated, dried over anhydrous Na$_2$SO$_4$ and filtered. The yields were usually about 90%. In the case of some of the lower molecular weight hydrazones, the yield was increased by extracting the aqueous layer with pentane or methylene chloride.

III. General Procedure for the Preparation of sec-Alkyl-μ-chloroazoalkanes

Into a 500 ml 4-neck round bottom flask equipped with a thermometer, mechanical stirrer, gas inlet tube and an air cooled condenser was added 0.25 moles of the appropriate sec-alkylhydrazone of a ketone (from II), 25.3 grams (0.25 moles) of triethylamine and 200 mls of pentane. The solution was cooled to −5° C in a dry-ice isopropanol bath and with vigorous stirring 0.25 moles of chlorine was passed into the solution while holding the temperature at −5 to 10° C. After the addition was complete, the reaction mixture was filtered to remove the triethylamine hydrochloride which had formed. The filter cake was slurried in 100 ml of fresh pentane and refiltered. The filtrates were combined and the pentane evaporated on a rotating evaporator. The products were yellow or orange (when crude) liquids and were usually isolated in 80 – 90% yields. The chlorinations can be followed by gas phase chromatography for the low molecular weight compounds. The infrared spectra of the products are in agreement with the structure of the α-chloroazos (absence of NH, carbonyl, C=N bands and the presence of a carbon-chlorine band in the 800–825cm$^{-1}$ region). The sec-alkyl-α-chloroazoalkanes in Table II were prepared by this method from the sec-alkylhydrazones of ketones in Table I. 2-(1,3-Dimethylazo)-2-bromobutane was prepared from methyl ethyl ketone 1,3-dimethylbutylhydrazone in 85% yield by substituting an equal number of moles of bromine for chlorine in the above procedure.

Table II

| Example # | sec-Alkyl-α-chloroazoalkane | Example number of starting hydrazone | % Yield |
| --- | --- | --- | --- |
| 3-1 | 2-[1-(norborn-2-yl)ethylazo]-2-chloropropane | 2-23 | 80% |

Table II-continued

| Example # | sec-Alkyl-α-chloroazoalkane | Example number of starting hydrazone | % Yield |
|---|---|---|---|
| 3-2 | 1-isopropylazo-1-chlorocyclohexane | 2-8 | 83% |
| 3-3 | allyl 4-isopropylazo-4-chlorovalerate | 2-24 | 62% |
| 3-4 | 1-cyclopentylazo-1-chlorocyclohexane | 2-1 | 79% |
| 3-5 | 2-isopropylazo-2-chlorobutane | 2-27 | 48% |
| 3-6 | 2-isopropylazo-2-chloropropane | 2-3 | 40% |
| 3-7 | 2-(1,3-dimethylbutylazo)-2-chlorobutane | 2-26 | 51% |
| 3-8 | 2-sec-butylazo-2-chlorobutane | 2-28 | 64% |
| 3-9 | 2-cyclohexylazo-2-chlorobutane | 2-29 | 74% |
| 3-10 | 2-cyclopentylazo-2-chloropropane | 2-2 | 71% |
| 3-11 | 1-cyclohexylazo-1-chlorocyclohexane | 2-12 | 99% |
| 3-12 | 2-[1-(phenyl)ethylazo]-2-chloropropane | 2-7 | 87% |
| 3-13 | 2-(1,3-dimethylbutylazo)-2-chloro-4-methyl-pentane | 2-13 | 91% |
| 3-14 | 2-(1,3-dimethylbutylazo)-2-chloropropane | 2-5 | 91% |
| 3-15 | 1-cyclopentylazo-1-chlorocyclopentane | 2-14 | 93% |
| 3-16 | 1-(1,3-dimethylbutylazo)-1-chlorocyclohexane | 2-11 | 96% |
| 3-17 | 2-cyclohexylazo-2-chloropropane | 2-6 | 89% |
| 3-18 | 2-cyclohexylazo-2-chloro-4-methylpentane | 2-15 | 94% |
| 3-19 | 2-isopropylazo-2-chloro-4-methylpentane | 2-16 | 93% |
| 3-20 | 2-isopropylazo-2-chloro-4-methoxy-4-methylpentane | 2-17 | 75% |
| 3-21 | 2-(1,3-dimethylbutylazo)-2-chloro-4-methoxy-4-methylpentane | 2-18 | ~80% |
| 3-22 | 2-cyclohexylazo-2-chloro-4-methoxy-4-methylpentane | 2-19 | 88% |
| 3-23 | 2-sec-butylazo-2-chloro-4-methylpentane | 2-20 | 88% |
| 3-24 | 2-sec-butylazo-2-chloro-4-methoxy-4-methylpentane | 2-21 | 91% |
| 3-25 | 1-[1-(phenyl)ethylazo]-1-chlorocyclohexane | 2-10 | 96% |
| 3-26 | 2-[1-(phenyl)ethylazo]-2-chloro-4-methylpentane | 2-22 | 68% |
| 3-27 | 2-sec-butylazo-2-chloropropane | 2-4 | 80% |

IV. General Procedures for the Preparation of sec-Alkyl-α-cyanoazoalkanes

A. α-Chlorazo Route

Into a 2 liter jacketed reactor equipped with a mechanical stirrer and thermometer was added a solution of 20.6 grams (0.42 moles) of sodium cyanide in 200 mls of 75% aqueous methanol. To this solution was added 0.41 moles of the appropriate sec-alkyl-α-chloroazo from Table II with vigorous agitation over approximately 15 minutes. The reaction temperature was held at 20° C±5° C by circulating cool water through the reactor jacket. After the addition was complete, the reaction was stirred an additional 30 – 60 minutes at 20° – 25° C, diluted with 300 ml water and the organic layer extracted with 200 mls of pentane. The pentane layer was separated and washed twice with 10% HCl, once with water, 20% sodium hydroxide, water, and saturated NaHCO₃ solution. The pentane solution was dried over anhydrous Na₂SO₄, filtered and the pentane evaporated on a rotating evaporator under reduced pressure. The crude products were usually orange-yellow liquids which could be purified to light yellow liquids by chromatographing them over alumina using pentane as the eluent. In most cases the above reaction was scaled down to a 0.1 mole scale. The infrared spectra of the products were in agreement with the structure of the sec-alkyl-α-cyanoazoalkanes (absence of NH peaks at 3200–3400 cm$^{-1}$, absence of carbonyl peaks and C=N band at 1600–1650 cm$^{-1}$ and a weak cyano band at 2225 cm$^{-1}$). The sec-alkyl-α-cyanoazoalkanes in Table III were prepared by this method using sec-alkyl-α-chlorazoalkane) from Table II.

Table III

| Example # | sec.-Alkyl-α-cyanoazoalkane | Example number of starting α-chloroazoalkane | % Yield |
|---|---|---|---|
| 4-a-1 | 1-cyclopentylazo-1-cyanocyclohexane | 3-4 | 86 |
| 4-a-2 | 2-cyclopentylazo-2-cyanopropane | 3-10 | 41 |
| 4-a-3 | 2-isopropylazo-2-cyanopropane | 3-6 | 53 |
| 4-a-4 | 2-(1,3-dimethylbutylazo)-2-cyanopropane | 3-14 | 95 |
| 4-a-5 | 2-cyclohexylazo-2-cyanopropane | 3-17 | 60 |
| 4-a-6 | 2-[1-(phenyl)ethylazo]-2-cyanopropane | 3-12 | 85 |
| 4-a-7 | 1-[1-(phenyl)ethylazo]-1-cyanocyclohexane | 3-25 | 72 |
| 4-a-8 | 1-(1,3-dimethylbutylazo)-1-cyanocyclohexane | 3-16 | 55 |
| 4-a-9 | 1-cyclohexylazo-1-cyanocyclohexane | 3-11 | 78 |
| 4-a-10 | 2-(1,3-dimethylbutylazo)-2-cyano-4-methylpentane | 3-13 | 92 |
| 4-a-11 | 1-cyclopentylazo-1-cyanocyclopentane | 3-15 | 49 |
| 4-a-12 | 2-cyclohexylazo-2-cyano-4-methylpentane | 3-18 | 86 |
| 4-a-13 | 2-isopropylazo-2-cyano-4-methylpentane | 3-19 | 84 |
| 4-a-14 | 2-isopropylazo-2-cyano-4-methoxy-4-methylpentane | 3-20 | 52 |
| 4-a-15 | 2-(1,3-dimethylbutylazo)-2-cyano-4-methoxy-4-methylpentane | 3-21 | 83 |
| 4-a-16 | 2-cyclohexylazo-2-cyano-4-methoxy-4-methylpentane | 3-22 | 61 |
| 4-a-17 | 2-sec.-butylazo-2-cyano-4-methylpentane | 3-23 | 76 |
| 4-a-18 | 2-sec.-butylazo-2-cyano-4-methoxy-4-methylpentane | 3-24 | 52 |
| 4-a-19 | 2-[1-(phenyl)ethylazo]-2-cyano-4-methylpentane | 3-26 | 83 |
| 4-a-20 | 2-[1-(norborn-2-yl)ethylazo]-2-cyanopropane | 3-1 | 79 |
| 4-a-21 | allyl 4-isopropylazo-4-cyanovalerate | 3-3 | 52 |
| 4-a-22 | 4-isopropylazo-4-cyanovaleric acid | — | 73* |

*Example 4-a-22 was prepared by the saponification of 4-a-21.

IV. B. Aqueous Cyanide Route

1. α-Cyanoazos derived from cyclohexanones

Into a jacketed 3 liter reactor equipped with a thermometer, water cooled reflux condenser, mechanical stirrer and pressure equalizing addition funnel was successively charged an aqueous solution (5–15%) of 0.25 moles of a secondary alkylhydrazine hydrochloride (from I), 12.25 grams (0.25 moles) of sodium cyanide and 24.5 grams (0.25 moles) of cyclohexanone. The reaction mixture exothermed to about 35° C and then was heated to 50° C for 1 hour by passing hot water through the reactor jacket. After the 1 hour reaction period was complete, 100 ml of hexane was added and the aqueous layer was separated to a waste bottle for cyanide detoxification. The hexane solution was removed from the reactor and transferred to the separatory funnel in the reactor. Into the reactor was charged 500 ml of approximately 10% aqueous sodium hypochlorite solution. The hexane solution of the hydrazo was then slowly added to the stirred hypochlorite solution while controlling the oxidation temperature at 40° C ± 5° C. After the addition was complete, the reaction was stirred at 40° C until gas chromatography indicated the oxidation was complete (usually 15-30 minutes). When the oxidation was complete, the organic layer was separated, washed successively with 50 ml portions of 20% HCl, water, 15% sodium bisulfite solution, saturated sodium bicarbonate solution, dried over anhy- The pentane solution of the hydrazo was then slowly added to the stirred hypochlorite solution while controlling the oxidation temperature at 25°-30° C. After the addition was complete, the reaction was stirred at 30° C until gas chromatography indicated the oxidation was complete (usually 15-30 minutes). When the oxidation was complete, the organic layer was separated, washed successively with 50 ml portions of 20% HCl, water, 15% sodium bisulfite solution, saturated sodium bicarbonate solution dried over anhydrous sodium sulfate, filtered and the pentane evaporated under reduced pressure on a rotating evaporator. Examples of α-cyanoazos prepared by this route are also found in Table IV. This method also applies for other sterically unhindered methyl and ethyl ketones such as methyl propyl ketone, methyl butyl ketone, methyl hexyl ketone and diethyl ketone.

Table IV

| IV. B. Example # | sec.-Alkyl-α-cyanoazoalkane | starting hydrazine | starting ketone | % Yield |
| --- | --- | --- | --- | --- |
| 4-b-1 | 1-(1,3-dimethylbutylazo)-1-cyanocyclohexane | 1,3-dimethylbutyl-hydrazine | cyclohexanone | 63% |
| 4-b-2 | 2-(1,3-dimethylbutylazo)-2-cyanopropane | 1,3-dimethylbutyl-hydrazine | acetone | 65% |
| 4-b-3 | 2-sec.-butylazo-2-cyanopropane | sec.-butylhydrazine | acetone | 53% |
| 4-b-4 | 1-sec.-butylazo-1-cyanocyclohexane | sec.-butylhydrazine | cyclohexanone | 50% |
| 4-b-5 | 2-isopropylazo-2-cyanopropane | isopropylhydrazine | acetone | 29% |
| 4-b-6 | 1-isopropylazo-1-cyanocyclohexane | isopropylhydrazine | cyclohexanone | 63% |
| 4-b-7 | 2-cyclohexylazo-2-cyanopropane | cyclohexylhydrazine | acetone | 63% | drous sodium sulfate, filtered and the hexane evaporated under reduced pressure on a rotating evaporator. Examples of α-cyanoazos prepared by this route are found in Table IV. This method also applies for substituted cyclohexanones such as 2-methylcyclohexanone, 3-methylcyclohexanone, 4-t-butylcyclohexanone, 3,3,5-trimethylcyclohexanone etc.

IV. B. (Cont'd.)

2. α-Cyanoazos derived from acetone or methyl ethyl ketone

Into a jacketed 3 liter reactor equipped with a thermometer, water cooled reflux condenser, mechanical stirrer and pressure equalizing addition funnel was successively charged an aqueous solution (5-15%) of 0.25 moles of a secondary alkyl hydrazine hydrochloride (from I), 12.25 grams (0.25 moles) of sodium cyanide and 0.25 moles of the ketone. The reaction mixture exothermed to about 35° C and then was heated to 40°-45° C for 1 hour by passing hot water through the reactor jacket. After the 1 hour reaction period was complete, the reaction mixture was cooled to 25° C and the hydrazo extracted into 100 ml of pentane. The pentane solution was separated and transferred to a separatory funnel in the reactor. Into the reactor was charged 300 ml of approximately 10% aqueous hypochlorite solution.

V. General Procedures for the Preparation of sec.-Alkyl-α-hydroxyazoalkanes

A. α-Chloroazo Route

Into a 125 ml erlenmeyer flask equipped with a magnetic stirring bar and thermometer was added 9.7 grams (0.12 moles) of 50% sodium hydroxide, 35 ml water and 35 ml of t-butanol. From a dropping funnel was added 0.11 moles of the sec.-alkyl-α-chloroazoalkane (from Table II) over 5-10 minutes while holding the reaction temperature between 15 and 25° C with a cooling bath if necessary. After the addition was complete the reaction was stirred an additional 30 minutes at 20° C ± 5° C, diluted with 100 mls of water and extracted with 50 ml of pentane. The pentane solution was washed three times with water to remove the t-butyl alcohol, washed with sodium bicarbonate solution, dried over anhydrous sodium sulfate, filtered and the pentane evaporated at 15°-20° C under reduced pressure on a rotating evaporator. The products were yellow liquids and were stored below 0° C to prevent decomposition. The infrared spectra of the products were in agreement with the structure of the sec-alkyl-α-hydroxyazoalkanes (strong, sharp OH peak around 3350 cm$^{-1}$ and absence of carbonyl peaks and carbon-chlorine band around 800 - 825 cm$^{-1}$). The sec.-alkyl-α-hydroxyazoalkanes in Table V were prepared by this method using the sec.-alkyl-α-chloroazoalkanes in Table II.

Table V

| V. A. Example # | sec.-Alkyl-α-hydroxyazoalkane | Example # of starting α-chloroazoalkane | % Yield |
| --- | --- | --- | --- |
| 5-a-1 | 1-cyclopentylazo-1-hydroxycyclohexane | 3-4 | 92% |
| 5-a-2 | 2-isopropylazo-2-hydroxybutane | 3-5 | 61% |
| 5-a-3 | 2-[1-(norborn-2-yl)ethylazo]-2-hydroxypropane | 3-1 | 86% |
| 5-a-4 | allyl 4-isopropylazo-4-hydroxyvalerate | 3-3 | 27% |
| 5-a-5 | 2-isopropylazo-2-hydroxypropane | 3-6 | 80% |
| 5-a-6 | 2-(1,3-dimethylbutylazo)-2-hydroxypropane | 3-14 | 69% |
| 5-a-7 | 2-(1,3-dimethylbutylazo))-2-hydroxybutane | 3-7 | 87% |
| 5-a-8 | 2-sec.-butylazo-2-hydroxybutane | 3-8 | 80% |
| 5-a-9 | 2-cyclohexylazo-2-hydroxybutane | 3-9 | 84% |
| 5-a-10 | 2-cyclopentylazo-2-hydroxypropane | 3-10 | 58% |
| 5-a-11 | 1-cyclohexylazo-1-hydroxycyclohexane | 3-11 | 81% |

Table V-continued

| V. A. Example # | sec.-Alkyl-α-hydroxyazoalkane | Example # of starting α-chloroazoalkane | % Yield |
|---|---|---|---|
| 5-a-12 | 2-cyclohexylazo-2-hydroxypropane | 3-17 | 96% |
| 5-a-13 | 1-(1,3-dimethylbutylazo)-1-hydroxycyclohexane | 3-16 | 90% |
| 5-a-14 | 2-sec.-butylazo-2-hydroxypropane | 3-27 | 51% |

V. B. Hypochlorite Route

Preparation of 2-Isopropylazo-2-hydroxybutane

Into a 250 ml 4-neck round bottom flask equipped with a reflux condenser, thermometer, graduated addition funnel and a magnetic stirrer was added 18.1 grams (0.14 moles) of methyl ethyl ketone isopropyl-hydrazone. With efficient stirring 170 mls of 12.4% by wt. aqueous sodium hypochlorite was added dropwise while holding the reaction temperature at 25°–30° C with a water bath. The oxidation was monitored by gas chromatography and after 3 hours stirring the hydrazone was completely oxidized. The reaction mixture was transferred to a separatory funnel and the spent aqueous hypochlorite solution separated. The organic layer was washed with 40 ml of cold 15% sodium bisulfite solution and then 25 ml of sodium bicarbonate solution. The organic layer was taken up in 50 ml of pentane, dried over anhydrous sodium sulfate, filtered and the pentane evaporated on a rotating evaporator under reduced pressure at 10°–20° C. The residue was an orange-yellow liquid weighing 9.4 grams (46.5% crude yield). The infrared spectrum of the product was similar to the infrared spectrum of 2-isopropylazo-2-hydroxybutane prepared by the α-chloro route (Example 5-a-2).

The sec-alkyl-α-hydroxyazoalkanes in Table VI were prepared by this method using the corresponding sec.-alkyl ketone hydrazones from Table I. In some cases (where indicated) t-butyl alcohol or dioxane was added to the reaction mixture to speed the reaction up.

VI. General Procedure for the Preparation of sec-Alkyl-α-methoxyazoalkanes

To 50 ml of stirred cold methanol in a 125 ml erlenmeyer flask equipped with a magnetic stirrer and thermometer was added 4.8 grams (0.06 moles) of 50% sodium hydroxide. The solution was cooled to 15° C in a water bath and 0.5 moles of a sec.-alkyl-α-chloroazoalkane (from Table II) was added dropwise from an additional funnel over 5–10 minutes while holding the reaction temperature below 25° C. After the addition was complete the reaction mixture was stirred an additional 30 minutes at room temperature, diluted with 200 ml of water and the product taken up in 50 ml of pentane. The pentane solution was washed successively with 25 ml portions of 10% HCl, water, saturated sodium bicarbonate solution, dried over anhydrous sodium sulfate, filtered and the pentane evaporated under reduced pressure on a rotating evaporator. The crude products were usually orange-yellow liquids which could be purified to light yellow liquids by chromatographing them over alumina using pentane as the eluent. The infrared spectra of the purified products were in agreement with the structure of the sec.-alkyl-α-methoxyazoalkanes (absence of OH or NH bands, carbonyl bands and carbon-chlorine band of the starting material at 800 – 825 $cm^{-1}$). The products are volatile compounds and their purity was checked by gas chromatography. The sec.-alkyl-α-methoxyazoalkanes in Table VII were prepared by this method using sec.-alkyl-α-chloroazoalkanes from Table II.

Table VI

| V. B. Example # | sec.-Alkyl-α-hydroxyazoalkane | Example # of Starting hydrazone | Cosolvent | Crude % Yield |
|---|---|---|---|---|
| 5-b-1 | 2-isopropylazo-2-hydroxybutane | 2-26 | none | 46.5% |
| 5-b-2 | 2-cyclohexylazo-2-hydroxybutane | 2-28 | t-BuOH | 54.5% |
| 5-b-3 | 2-sec-butylazo-2-hydroxpropane | 2-4 | none | 19% |
| 5-b-4 | 2(1,3-dimethylbutylazo)-2-hydroxypropane | 2-5 | dioxane | 44% |
| 5-b-5 | 2-sec.-butylazo-2-hydroxybutane | 2-27 | t-BuOH | 31% |

Table VII

| Example # | sec.-Alkyl-α-methoxyazoalkane | Example # of starting α-chloroazoalkane | Crude % Yield |
|---|---|---|---|
| 6-1 | 1-cyclohexylazo-1-methoxycyclohexane | 3-11 | 72% |
| 6-2 | 2-[1-(phenyl)ethylazo]-2-methoxypropane | 3-12 | 77% |
| 6-3 | 2-(1,3-dimethylbutylazo)-2-methoxy-4-methylpentane | 3-13 | 76% |
| 6-4 | 2-(1,3-dimethylbutylazo)-2-methoxypropane | 3-14 | 94% |
| 6-5 | 1-cyclopentylazo-1-methoxycyclopentane | 3-15 | 45% |
| 6-6 | 1-(1,3-dimethylbutylazo)-1-methoxycyclohexane | 3-16 | 91% |
| 6-7 | 2-cyclohexylazo-2-methoxypropane | 3-17 | 82% |
| 6-8 | 2-cyclohexylazo-2-methoxy-4-methylpentane | 3-18 | 89% |
| 6-9 | 2-isopropylazo-2-methoxy-4-methylpentane | 3-19 | 91% |
| 6-10 | 2-isopropylazo-2,4-dimethoxy-4-methylpentane | 3-20 | 83% |
| 6-11 | 2-(1,3-dimethylbutylazo)-2,4-dimethoxy-4-methylpentane | 3-21 | 78% |
| 6-12 | 2-cyclohexylazo-2,4-dimethoxy-4-methylpentane | 3-22 | 79% |
| 6-13 | 2-sec-butylazo-2-methoxy-4-methylpentane | 3-23 | 93% |
| 6-14 | 2-sec.-butylazo-2,4-dimethoxy-4-methylpentane | 3-24 | 89% |
| 6-15 | 1-[1-(phenyl)ethylazo]-1-methoxycyclohexane | 3-25 | 87% |
| 6-16 | 2-[1-(phenyl)ethylazo]-2-methoxy-4-methylpentane | 3-26 | 61% |

VII. General Procedure for the Preparation of sec.-Alkyl-α-carbonatoazoalkanes To a slurry of 0.12 mole of metal alkyl carbonate in 80 ml of N,N-dimethylformamide was added 0.1 mole of sec.-alkyl-α-chloroazoalkane. The temperature was controlled at 45° C. ± 5° C. for about 4 hours. The mixture was poured into 350 ml water and the product extracted with pentane. The pentane solution was washed successively with 5% HCl, water and saturated sodium bicarbonate solution, dried, filtered and the pentane evaporated. The crude products were usually yellow liquids. The infrared spectra of the products were in agreement with the structure of sec.-alkyl-α-carbonatoazoalkanes (strong carbonyl band at 1750 $cm^{-1}$). Most of the products were volatile and quite pure. The α-carbonatos in Table VIII were prepared by this method using sec.-alkyl-α-chloroazoalkanes from Table II.

Table VIII

| Example No. | sec.-alkyl-α-carbonatoazoalkane | Example No. of α-chloroazoalkane | Crude % Yield |
|---|---|---|---|
| 7-1 | 2-isopropylazo-2-(methoxycarbonyloxy)-butane | 3-5 | 60 |
| 7-2 | 2-isopropylazo-2-(ethoxycarbonyloxy)-butane | 3-5 | 53.4 |
| 7-3 | 2-cyclohexylazo-2-(isopropoxycarbonyloxy)-propane | 3-17 | 77.5 |
| 7-4 | 2-cyclohexylazo-2-(t-butoxycarbonyloxy)-propane | 3-17 | 25 |

EXAMPLE VIII

Preparation of 1-Isopropylazo-1-(tert.-butylperoxy)cyclohexane

To a stirred solution of 24.7 grams (0.11 moles) of 25% potassium hydroxide in an erlenmeyer flask equipped with a magnetic stirrer, thermometer and addition funnel was added 14.0 grams (0.14 moles) of 90% tert.-butylhydroperoxide while holding the temperature below 30° C with a cold water bath. After the addition was complete, the reaction was stirred for 30 minutes at room temperature, cooled to 18° C and with rapid stirring 18.85 grams (0.1 mole) of 1-isopropylazo-1-chlorocyclohexane (from Example 3-2) was added dropwise from the addition funnel over 40 minutes while holding the reaction temperature at 20° C ± 2° C. After the addition was complete, the reaction was stirred for 10 minutes at 15° C, cooled to 0° C and stirred an additional 30 minutes. At this point, 3.2 grams (0.04 mole) of 50% sodium hydroxide was added, the reaction stirred an additional 10 minutes, poured into 100 ml of ice water and the product extracted into 100 ml of pentane. The pentane solution was separated, washed with 50 ml portions of water and saturated sodium bicarbonate, dried over anhydrous sodium sulfate, filtered and the pentane evaporated at 0° C under reduced pressure on a rotating evaporator. The product was a light yellow liquid weighing 18.7 grams (77% crude yield). It was stored in dry ice chest to prevent decomposition and it was not shock sensitive. The infrared spectrum was in agreement with the structure of 1-isopropylazo-1-(tert.-butylperoxy)cyclohexane (absence of the carbon-chlorine band of the starting material at 800–825 $cm^{-1}$ and the presence of a tert.-butyl-peroxy band around 885 $cm^{-1}$.) The presence of a weak OH band at 3350$cm^{-1}$ indicates that a small amount of 1-isopropylazo-1-hydroxycyclohexane also formed.

EXAMPLE IX

Preparation of 1-Cyclohexylazo-1-[para(t-butyl)thiophenoxy]-cyclohexane

To a stirred solution of 4.96 grams (0.062 moles) of 50% sodium hydroxide in 100 ml of methanol in a 250 ml erlenmeyer flask was added 10.45 grams (0.063 moles) of para-(t-butyl)-thiophenol and the solution stirred for 15 minutes at room temperature. The solution was cooled to 5° C and 13.7 grams (.06 moles) of 1-cyclohexylazo-1-chlorocyclohexane (from Example 3-11) was added dropwise over 20 minutes while holding the reaction temperature at 5° to 10° C with a cold water bath. After the addition was complete the bath was removed and the reaction stirred for an additional 60 minutes at room temperature. A 1.0 gram portion of 50% sodium hydroxide was then added to react with any excess thiophenol, the reaction mixture poured into 300 ml water and the product extracted into 100 ml of pentane. The pentane solution was separated and successively washed with 50 ml portions of water, 10% HCl, water, 5% sodium hydroxide and saturated sodium bicarbonate solution, dried over anhydrous sodium sulfate, filtered and the pentane evaporated under reduced pressure on a rotating evaporator. The product was a yellow liquid that weighed 14.0 grams (63% crude yield). The infrared spectrum of the product was in agreement with the structure of 1-cyclohexylazo-1-[para-(t-butyl)-thiophenoxy] cyclohexane.

EXAMPLE X

Preparation of 1-Isoproylazo-1-(β-hydroxyethylthio)cyclohexane

To a stirred solution of 4.8 grams (.06 moles) of 50% sodium hydroxide in 60 ml of methanol in a 125 ml erlenmeyer flask was added 5.46 grams (.07 moles) of 2-mercaptoethanol while holding the reaction temperature below 25° C. After the addition was complete, the mixture was stirred for 20 minutes at 10° C and 9.5 grams (.05 moles) of 1-isopropylazo-1-chlorocyclohexane (from Example 3-2) was added dropwise over 25 minutes while holding the temperature below 15° C. After the addition was complete, the reaction was stirred an additional 60 minutes at 5° to 15° C. A .02 mole portion of 50% sodium hydroxide was added, the reaction stirred an additional 10 minutes, poured into 200 ml of water and the product extracted into 100 ml of pentane. The pentane solution was separated and washed successively with 50 ml portions of 5% HCl, water and saturated sodium bicarbonate solution, dried over anhydrous sodium sulfate, filtered and the pentane evaporated under reduced pressure on a rotating evaporator. The product was a yellow liquid weighing 8.5 grams (74% crude yield). The infrared spectrum was in agreement with the structure of 1-isopropylazo-1-(β-hydroxyethylthio)cyclohexane (absence of carbon-chlorine band at 800 - 825 cm$^{-1}$ and presence of a strong OH band at 3325 cm$^{-1}$.)

EXAMPLE XI

Preparation of Di[1-(isopropylazo)cyclohexy] Sulfide

To a stirred solution of 6.5 grams (.05 moles) of 60% sodium sulfide in 11 ml of water in a 250 ml 4-neck flask equipped with a magnetic stirrer, thermometer, and addition funnel was added 0.2 grams of 50% sodium hydroxide and 33 ml of isopropanol, the solution stirred for 15 minutes at room temperature and 18.85 grams (0.1 moles) of 1-isopropylazo-1-chlorocyclohexane (from Example 3-2) was added dropwise from the addition funnel over 30 minutes while holding the temperature at 20° to 25° C. After the addition was complete, the reaction was stirred an additional 60 minutes at room temperature, poured into 200 ml cold water and the product extracted into 100 ml of pentane. The pentane solution was washed successively with 50 ml portions of water, saturated sodium bicarbonate solution and water, dried over anhydrous sodium sulfate, filtered and the pentane evaporated under reduced pressure on a rotating evaporator. The product was a yellow liquid and weighed 13.4 grams (79% crude yield). The infrared spectrum of the product was in agreement with the structure of di[1-(isopropylazo)cyclohexyl] sulfide.

EXAMPLE XII

Preparation of 1-Isopropylazo-1-azidocyclohexane

To a stirred solution of 9.75 grams (0.15 moles) of sodium azide in 100 mls of 70% aqueous methanol in a 250 ml erlenmeyer flask cooled in an ice bath, was added 18.85 grams (0.1 moles) of 1-isopropylazo-1-chlorocyclohexane (from Example 3-2) over 15 minutes while holding the reaction temperature below 10° C. After the addition was complete the mixture was stirred an additional 20 minutes at room temperature, poured into 200 ml water and extracted into 100 ml of pentane. The pentane solution was washed successively with 50 ml portions of water and saturated sodium bicarbonate solution, dried over anhydrous sodium sulfate, filtered and the pentane evaporated under reduced pressure on a rotating evaporator. The product was a yellow liquid and weighed 18.4 grams (94.4% crude yield). It was not shock sensitive and its infrared spectrum was in agreement with the structure of 1-isopropylazo-1-azidocyclohexane (strong azide band at 2100 cm$^{-1}$).

EXAMPLE XIII

Preparation of 1-Cyclohexylazo-1phthalimidocyclohexane

To a stirred solution of 10.45 grams (.071 moles) phthalimide in 80 mls of N,N-dimethylformamide in a 250 ml 4-neck flask equipped with a magnetic stirrer, thermometer and addition funnel was added 4.0 grams (.05 moles) of 50% sodium hydroxide and the solution stirred for 15 minutes at 40° C. To this solution was added dropwise 11.45 grams (.05 moles) of 1-cyclohexylazo-1chlorocyclohexane (from Example 3-11) over 20 minutes at 40° to 45° C. After the addition was complete, the reaction was stirred an additional 60 minutes at 40° C, poured into 250 ml cold water and the white solid that formed was filtered off and dissolved in 100 ml of pentane. The insolubles were filtered off and the pentane filtrate washed with water and saturated sodium bicarbonate solution, dried over anhydrous sodium sulfate, filtered and the pentane evaporated under reduced pressure on a rotating evaporator. The product was a white solid and weighed 11.5 grams (68% crude yield). The infrared spectrum of the product was in agreement with the structure of 1-cyclohexylazo-1-phthalimidocyclohexane (absence of NH and OH bands and a strong carbonyl band at 1700-1730 cm$^{-1}$).

EXAMPLE XIV

Preparation of 1-Isopropylazo-1-thiocyanocyclohexane and 1-Isopropylazo-1-isothiocyanocyclohexane To a stirred solution of 10.5 grams (0.13 moles) of sodium thiocyanate in 100 ml of 70% aqueous acetone in a 250 ml erlenmeyer flask was added 18.85 grams (0.1 mole) of 1-isopropylazo-1-chlorocyclohexane (from Example 3-2) over 15 minutes while holding the temperature at 10° to 15° C with a cold water bath. After the addition was complete, the reaction was stirred for an additional 20 minutes at 10° to 20° C, poured into 200 ml cold water and the product extracted into 100 ml of pentane. The pentane solution was washed with 50 ml portions of water and saturated sodium bicarbonate solution, dried over anhydrous sodium sulfate, filtered and the pentane evaporated under reduced pressure on a rotating evaporator. The product was a yellow liquid and weighed 18.4 grams (87% crude yield). The infrared spectrum was in agreement with the structure of 1-isopropylazo-1-thiocyanocyclohexane (weak band at 2150 cm$^{-1}$).

A sample of the above 1-isopropylazo-1-thiocyanocyclohexane was stirred over neutral alumina for 4 hours at room temperature. The mixture was then diluted with 50 ml pentane and the alumina filtered off. The pentane filtrate was evaporated under reduced pressure on a rotating evaporator. The product was a yellow-brown liquid and its infrared spectrum (absence of band at 2150 cm$^{-1}$ and strong broad band at 2000 - 2075 cm$^-$) indicated that all of the thiocyano compound had isomerized to the isothiocyano compound.

EXAMPLE XV

Preparation of 1-Isopropylazo-1-(benzenesulfonyl)-cyclohexane

To a stirred solution of 6.57 grams (.04 moles) of sodium benzenesulfinate in 60 ml of 70% aqueous methanol in a 125 ml erlenmeyer flask was added 6.4 grams (.034 moles) of 1-isopropylazo-1-chlorocyclohexane (from Example 3-2) dropwise over 25 minutes while holding the temperature at 0° to 5° C with an ice bath. After the addition was complete, the reaction was stirred for 60 minutes at 0° to 5° C, poured into 200 ml cold water and extracted into 100 ml of pentane. The pentane solution was separated, washed with 50 ml of water, dried over anhydrous sodium sulfate, filtered and the pentane evaporated under reduced pressure on a rotating evaporator. The product was a yellow liquid and weighed 5.95 grams (59.5% crude yield). The infrared spectrum of the product was in agreement with the structure of 1-isopropylazo-1-(benzenesulfonyl)-cyclohexane.

EXAMPLE XVI

Preparation of 1-Isopropylazo-1-phenoxycyclohexane

To a stirred solution of 5.95 grams (.09 moles) of 85% potassium hydroxide in 50 mls of methanol in a 125 ml erlenmeyer flask was added 8.46 grams (.09 moles) of phenol and the solution stirred for 15 minutes. The solution was cooled to 20° C and 15.0 grams (.08 moles) of 1-isopropylazo-1-chlorocyclohexane (from Example 3-2) was added dropwise over 5 minutes and the reaction mixture stirred an additional hour at 20°-25° C. The reaction mixture was poured into 300 mls water and the product extracted with 200 mls of pentane. The pentane solution was separated and washed successively with 100 ml portions of 10% sodium hydroxide, water, 10% HCl (twice), 15% HCl, water, 15% sodium bisulfite solution and saturated sodium bicarbonate solution, dried over anhydrous sodium sulfate, filtered and the pentane evaporated under reduced pressure on a rotating evaporator. The product was a yellow liquid and it weighed 15.7 grams (76.5% crude yield). The infrared spectrum of the product was in agreement with the structure of 1-isopropylazo-1-phenoxycyclohexane. Gas chromatography indicated there was also a small amount of 1-isopropylazo-1-methoxycyclohexane from a competing reaction of the methanol with the 1-isopropylazo-1-chlorocyclohexane.

EXAMPLE XVII

Preparation of
2-sec.-Butylazo-2-isocyanato-4-methylpentane

To a stirred solution of 8.6 grams (0.105 moles) of potassium cyanate in 75 ml of 70% aqueous acetone in a 125 ml erlenmeyer flask was added 19 grams (.093 moles) of 2-sec.-butylazo-2-chloro-4-methylpentane (from Example 3-23) over 10 minutes while holding the reaction temperature at 15°-20° C with a cold water bath. After the addition was complete the reaction was stirred an additional hour at room temperature, poured into 200 ml water and the product extracted with 100 mls of pentane. The pentane solution was separated, washed with 50 ml portions of water and saturated sodium bicarbonate solution, dried over anhydrous sodium sulfate, filtered and the pentane evaporated under reduced pressure on a rotating evaporator. The product was a yellow liquid and weighed 13.1 grams (67% crude yield). The infrared spectrum of the product was in agreement with the structure of 2-sec.-butylazo-2-isocyanato-4-methylpentane (strong broad isocyanate band at 2125-2225 cm$^{-1}$).

EXAMPLE XVIII

Preparation of
2-(1,3-dimethylbutylazo)-2-isocyanatobutane

To a stirred solution of 3.25 grams (.04 moles) of potassium cyanate in 75 ml of 70% aqueous acetone in a 125 ml erlenmeyer flask was added 9.4 grams (.0377 moles) of 2-(1,3-dimethylbutylazo)2-bromobutane (from Example III) over 5 minutes while holding the reaction temperature at 15°-20° C with a cold water bath. After the addition was complete the reaction was stirred an additional hour at room temperature, poured into 200 ml of water and the product extracted with 100 ml of pentane. The pentane solution was separated, washed with 50 ml portions of water and saturated sodium bicarbonate solution, dried over anhydrous sodium sulfate, filtered and the pentane evaporated under reduced pressure on a rotating evaporator. The product was a yellow liquid and weighed 6.4 grams (80.5% crude yield). The infrared spectrum was in agreement with the structure of 2-(1,3-dimethylbutylazo)-2-isocyanatobutane (strong broad isocyanate band at 2125-2225 cm$^{-1}$).

EXAMPLE XIX

Preparation of
2-sec.-Butylazo-2-(methoxycarbonylamino)
4-methylpentane

To 25 ml of stirred methanol in a 125 ml erlenmeyer flask was slowly added 1.2 grams (0.028 moles) of 57% sodium hydride. The solution was cooled to 25° C in a cold water bath and 5.9 grams (.028 moles) of 2-sec.-butylazo-2-isocyanato-4-methylpentane (from Example XVII) was added dropwise over 5 minutes. The reaction was stirred an additional hour at room temperature, poured into 200 ml water, the product extracted with 100 ml pentane, washed with 100 ml saturated sodium bicarbonate solution, dried over anhydrous sodium sulfate, filtered and the pentane evaporated under reduced pressure on a rotating evaporator. The product was a yellow liquid and weighed 3.9 grams (57.3% crude yield). The infrared spectrum was in agreement with the structure of 2-sec-butylazo-2-(methoxycarbonylamino)-4-methylpentane (strong carbonyl band at 1740 cm$^{-1}$, sharp NH at 3375 cm$^{-1}$ and no isocyanate band at 2125-2225 cm$^{-1}$).

EXAMPLE XX

Preparation of
N-[1-(sec.-Butylazo)-1,3-dimethylbutyl]-N'-cyclohexylurea

To 5.3 grams (.025 moles) of stirred 2-sec.-butylazo-2-isocyanato-4-methylpentane (from Example XVII) in a 50 ml erlenmeyer flask was added 2.6 grams (.026 moles) of cyclohexylamine. A solid quickly formed so 25 ml of pentane was added and the slurry stirred for approximately ½ hour, the solid filtered, reslurried in 25 ml of fresh pentane and refiltered. The solid was air dried and weighed. The white powder weighed 4.4 grams (57% crude yield) and had a melting range of 118 to 123° C. The infrared spectrum of the product was in agreement with the structure of N-[1-(sec.-butylazo)-1,3-dimethylbutyl]-N'-cyclohexylurea(sharp NH at 3250 cm$^{-1}$ and strong carbonyl band at 1625 cm$^{-1}$).

EXAMPLE XXI

Preparation of
2-(1,3-Dimethylbutylazo)-2-methylpropionamidoxime

To 10 ml of water and 6.45 grams (0.0926 moles) of hydroxylamine hydrochloride in a 250 ml 3-neck round bottom flask equipped with a magnetic stirrer, air-cooled condenser, thermometer, and immersed in an ice bath was slowly added 7.42 grams (0.0926 moles) of 50% sodium hydroxide, followed by 100 ml of methanol. To this stirred mixture was added 16.4 grams (.0906 moles) of 2-(1,3-dimethyl-butylazo)-2-cyanopropane (from Example 4-a-4). The ice bath was removed and the flask stoppered and the reaction mixture stirred for 1½ hours and allowed to stand over the weekend at room temperature. The insolubles were filtered off and the methanol filtrate was poured into 150 ml water and the product extracted with 100 ml of pentane. The pentane solution was washed twice with 100 ml portions of water, dried over anhydrous sodium sulfate, filtered and the pentane evaporated under reduced pressure on a rotating evaporator. The product was a yellow liquid and weighed 8.8 grams (46% crude yield). The infrared spectrum of the product was in agreement with the structure of 2-(1,3-dimethylbutylazo)-2-methylpropionamidoxime (strong broad NH and OH bands at 3150-3450 cm$^{-1}$, a strong imino band at 1750 cm$^{-1}$ and the absence of the cyano band of the starting material at 2225 cm$^{-1}$).

EXAMPLE XXII

Preparation of 1-Isopropylazo-1-carbamylcyclohexane

To 100 ml of 96% sulfuric acid cooled to 0° C in an ice bath was added 13.5 grams (.0755 moles) of 1-isopropylazo-1-cyanocylohexane (from Example 4-b-6) dropwise over ½ hour while holding the temperature at 0° C. After the addition was complete the temperature was allowed to rise to 10° C over ½ hour and to 25° C over another ½ hour and then stirred another ½ hour at 25° C. The reaction mixture was poured onto ¼ liter of ice and stirred until all of the ice dissolved. A white solid that formed was filtered off and the aqueous acid filtrate was extracted with 200 ml of methylene chloride. The methylene chloride extract was washed with saturated sodium bicarbonate solution, dried over anhydrous sodium sulfate, filtered and the methylene chloride evaporated under reduced pressure on a rotating evaporator. The product was a light brown liquid and weighed 5.0 grams (33.7% crude yield). The infrared spectrum of the product was in agreement with the structure of 1-isopropylazo-1-carbamylcyclohexane (strong broad carbonyl band at 1675-1750 cm$^{-1}$ and NH band at 3500 cm$^{-1}$).

EXAMPLE XXIII

Preparation and Curing of an Unsaturated Polyester-Styrene Resin

Preparation

An unsaturated polyester resin was prepared by reacting maleic anhydride (1.0 mole), phthalic anhydride (1.0 mole), and propylene glycol (2.2 moles) until an acid number of 45-50 was obtained. To this was added hydroquinone at a 0.013% concentration. Seven parts of this unsaturated polyester was diluted with 3 parts of monomeric styrene to obtain a homogeneous blend having a viscosity of 13.08 poise and a specific gravity of 1.14 (after curing the specific gravity of the resin is 1.25).

Curing

To 20 grams of this blend was stirred in 0.2 grams (1%) of the desired secondary-alkyl-α-substituted-azoalkane and the resultant composition poured into a test tube containing a thermocouple and the test tube placed in a constant temperature oil bath (the temperature varying with the thermal stability of the azos — see Table IX). The internal temperature was recorded as a function of time and the time required to reach the peak exotherm as well as the temperature of the exotherm was recorded. The hardness of the resultant cured materials was measured by a barcol tester according to ASTM Test D-2583-67.

The curing results for several of the secondary azos are tabulated in Table IX.

Without an initiator, no cure of

Table IX

| Curing of Unsaturated Polyester-Styrene Resin | | | |
|---|---|---|---|
| Example # of Azo Curing Agent | Bath Temp. °C | Minutes to Peak Exotherm | Peak Exotherm °F | Barcol Hardness |
| 4-a-1 | 115 | 7.5 | 426 | 45 |
| 4-a-2 | 100 | 7.2 | 421 | 45 |
| 4-a-3 | 100 | 5.3 | 432 | 40 |
| 4-a-4 | 100 | 5.7 | 429 | 45 |
| 4-a-6 | 82 | 5.5 | 343 | 45 |
| 4-a-7 | 100 | 1.6 | 408 | 50 |
| 4-a-8 | 115 | 9.8 | 428 | 40 |
| 4-a-9 | 130 | 4.4 | 456 | 45 |
| 4-a-10 | 100 | 4.4 | 412 | 35 |
| 4-a-11 | 100 | 6.0 | 390 | 45 |
| 4-a-12 | 100 | 5.9 | 430 | 45 |
| 4-a-13 | 100 | 4.1 | 430 | 45 |
| 4-a-17 | 100 | 4.5 | 430 | 40 |
| 4-a-19 | 100 | 1.7 | 381 | 45 |
| 4-b-3 | 100 | 6.2 | 430 | 35 |
| 4-b-4 | 115 | 10.8 | 434 | 40 |
| 4-b-5 | 100 | 5.3 | 432 | 40 |
| 4-b-6 | 115 | 8.7 | 439 | 40 |
| VIII | 25 | 5.2 | 316 | 40 |
| XII | 145 | 1.7 | 426 | 50 |
| XIII | 145 | 13.5 | 346 | 15 |
| XVI | 145 | 16.2 | 310 | 10 |

EXAMPLE XXIV

Low Conversion Polymerization of Styrene with sec.-Alkyl-α-substituted-azoalkanes A solution of styrene containing $5 \times 10^4$ moles per deciliter of the sec.-alkyl-α-substituted-azoalkane was heated in a constant temperature oil bath (the temperature of the bath depending on the thermal stability of the individual azo compounds) and the change in density, which is a measure of polymer formation, was followed by means of a dilatometer to measure polymerization rates at 5% and 10% conversion to polystyrene. The rates obtained at 5% and 10% conversion are recorded in moles per liter per minute in Table X for the individual azo compounds. Their rate at 10% conversion ($if_1$) is divided by the rate of a standard ($f_2$) at the same temperature and concentration to give an efficiency rating $f_1/f_2$.

Table X

| Low Conversion Polymerization of Styrene with sec.-Alkyl-α-substituted-azoalkanes | | | | |
|---|---|---|---|---|
| Example # of Azo Initiator | Bath Temp. | Rp at 5% m/l/min | Rp at 10% m/l/min | $f_1/f_2$ (where $f_2$ is t-butyl peroxybenzoate) |
| 4-a-3 | 100° C | $9.34 \times 10^{-3}$ | $7.77 \times 10^{-3}$ | 0.23 |
| 4-a-12 | 100° C | $12.85 \times 10^{-3}$ | $12.85 \times 10^{-3}$ | 0.924 |
| blank | 100° C | $2.92 \times 10^{-3}$ | | |
| blank | 115° C | $11.06 \times 10^{-3}$ | | |
| XII | 115° C | $22.7 \times 10^{-3}$ | $20.6 \times ^{-3}$ | |

EXAMPLE XXV

High Conversion Polymerization of Styrene with 2-Cyclohexylazo-2-cyano-4-methylpentane A series of pyrex test tubes was filled with styrene solutions containing varying amounts of 2-cyclohexylazo-2-cyano-4-methylpentane. The amounts of azo initiator in the tubes were adjusted so that the resulting conversion versus concentration plots would cross 95% conversion, ideally, after 7.0 hours and before 8 hours at 100° C. (The conversion figure was selected as 95% since styrene polymerizations are carried out almost to complete conversion commercially. Hence, initiators that deadened before 95% conversion or achieve 95% conversion only after using very large quantities of initiator are not attractive commercially.) After flushing out the tubes with nitrogen gas, they were sealed and placed in a constant temperature bath thermostated at 100° C. After 8.5 hours at 100° C, the tubes were removed and quickly chilled to 0° C to prevent post polymerization. The sealed tubes were then broken and the polymer dissolved in 1000 ml of methanol to precipitate the polystyrene. The polymer was separted by filtration and dried in an oven at 50°-55° C. The conversion of styrene to polymer was determined and plots of initiator concentration versus conversion were constructed. The initiator concentration required to attain 95% conversion was compared under similar conditions, to that of t-butyl peroxybenzoate. Equation (1) was used to determine efficiency data.

$$F_1/F_2 = Rp_1^2/Rp_2^2 \times Kd_2/Kd_1 \times [I]_2/[I]_1 \quad (1)$$

$F_1/F_2$ is the efficiency of 2-cyclohexylazo-2-cyano-4-methylpentane compared to that of t-butyl peroxybenzoate ($F_2$). $Rp_1$ and $Rp_2$ are the rates of polymerization of the azo initiator and t-butyl peroxybenzoate, respectively, and $[I]_1$ and $[I]_2$ are concentrations of 2-cyclohexylazo-2-cyano-4-methylpentane and t-butyl peroxybenzoate, respectively, required for attainment of 95% conversion after 7.0 hours at 100° C. Under these conditions:

$$Rp_1^2/Rp_2^2 = 1$$

$Kd_2/Kd_1$ are also known from the decomposition kinetics of t-butyl peroxybenzoate and 2-cyclohexylazo-2-cyano-4-methylpentane, respectively. Hence, the value of $F_1/F_2$ can be calculated and in this case $F_1/F_2$ was determined to be 0.52.

EXAMPLE XXVI

Qualitative Evaluation of the I Compounds as Polyester Foaming Agents

The I compounds were qualitatively evaluated as foaming agents for unsaturated polyester resins using the following procedures. The results are tabulated in Table XI.

To 100 grams of the unsaturated polyester resin (prepared as in Example XXIII) were mixed 0.1 gram LUPERSOL® DDM (a commercial methyl ethyl ketone peroxide formulation) and the desired number of grams of the I compounds (see column labeled parts azo in Table XI) using an electric stirrer. Finally the appropriate number of grams of an activator (if required) (see columns labeled activator and parts activator) was mixed into the formulation. The mixture was poured into a waxed paper cup at ambient temperature (75° F) and allowed to foam and cure. The foaming and curing were complete in less than 30 minutes. After the foams had cooled to room temperature the foam density was determined (see column labeled foam density).

Note: The activator acetyl sec-hexyl-sulfonyl peroxide is designated as AH$_6$SP in Table XI. This was added as a 50% solution in dimethyl phthalate. The activator acetyl cyclohexylsulfonyl peroxide is designated as ACSP in Table XI. This was added as a 50% solution in xylene or as a 28% solution in methylene chloride. The phosphoric acid used as an activator was 86% by weight.

Table XI

| Example # of azo foaming agent | Activator | Parts Activator | Parts Azo | Foam Density grams/c.c. |
|---|---|---|---|---|
| X = Cl or Br | | | | |
| 3-1 | ACSP | 2 | 2 | 1.11 |
| 3-4 | None | — | 2 | 1.11 |
| 3-7 | ACSP | 2 | 2 | 1.10 |
| 3-8 | ACSP | 2 | 2 | 1.08 |
| 3-9 | ACSP | 2 | 2 | 0.88 |
| 3-11 | H$_3$PO$_4$ | 2 | 2 | 1.03 |
| 3-12 | H$_3$PO$_4$ | 4 | 2 | 0.87 |
| 3-13 | AH$_6$SP | 2 | 2 | 0.69 |
| 3-14 | ACSP | 2 | 2 | 1.14 |
| 3-16 | AH$_6$SP | 2 | 2 | 0.61 |
| 3-17 | H$_3$PO$_4$ | 4 | 2 | 0.91 |
| 3-18 | ACSP | 2 | 2 | 0.88 |
| 3-19 | ACSP | 2 | 2 | 0.96 |
| 3-19 | None | — | 2 | 1.01 |
| 3-20 | ACSP | 2 | 2 | 1.05 |
| 3-21 | ACSP | 2 | 2 | 0.79 |
| 3-22 | ACSP | 2 | 2 | 0.80 |
| 3-23 | ACSP | 2 | 2 | 0.81 |
| 3-24 | ACSP | 2 | 2 | 0.84 |
| 3-25 | ACSP | 2 | 2 | 0.96 |
| 3-26 | ACSP | 2 | 2 | 0.84 |
| 3-27 | ACSP | 2 | 2 | 1.01 |
| III (X = Br) | None | — | 2 | 1.00 |
| X = OH | | | | |
| 5-a-1 | None | — | 2 | 0.78 |
| 5-a-2 | None | — | 2 | 0.34 |
| 5-a-3 | None | — | 2 | 0.42 |
| 5-a-4 | None | — | 2 | 0.41 |
| 5-a-5 | None | — | 2 | 0.37 |
| 5-a-6 | None | — | 2 | 0.34 |
| 5-a-7 | None | — | 2 | 0.38 |
| 5-a-8 | None | — | 2 | 0.37 |
| 5-a-9 | None | — | 2 | 0.39 |
| 5-a-10 | None | — | 2 | 0.29 |
| 5-a-11 | None | — | 2 | 0.92 |
| 5-a-12 | None | — | 2 | 0.40 |
| 5-a-13 | None | — | 2 | 0.45 |
| 5-a-14 | None | — | 2 | 0.38 |
| X = OCH$_3$ or OC$_6$H$_5$ | | | | |
| 6-1 | H$_3$PO$_4$ | 2 | 4 | 0.74 |
| 6-2 | AH$_6$SP | 2 | 2 | 0.61 |
| 6-3 | ACSP | 2 | 2 | 1.03 |
| 6-4 | AH$_6$SP | 4 | 2 | 0.34 |
| 6-5 | H$_3$PO$_4$ | 2.5 | 2 | 0.87 |
| 6-6 | AH$_6$SP | 2 | 2 | 0.59 |
| 6-7 | H$_3$PO$_4$ | 4 | 2 | 0.74 |
| 6-8 | ACSP | 2 | 2 | 0.92 |
| 6-9 | ACSP | 2 | 2 | 1.00 |
| 6-10 | ACSP | 2 | 2 | 0.99 |
| 6-11 | ACSP | 2 | 2 | 1.06 |
| 6-12 | ACSP | 2 | 2 | 1.02 |
| 6-13 | ACSP | 2 | 2 | 0.92 |
| 6-14 | ACSP | 2 | 2 | 1.02 |
| 6-15 | ACSP | 2 | 2 | 0.97 |
| 6-16 | ACSP | 2 | 2 | 1.00 |
| XVI | None | — | 2 | 1.09 |
| X = —SR$_6$ or —SO$_2$C$_6$H$_5$ | | | | |
| IX | AH$_6$SP | 4 | 2 | 0.39 |
| X | None | — | 2 | 1.16 |
| XV | AH$_6$SP | 2 | 2 | 0.51 |
| X = NCO and derivatives | | | | |
| XVII | None | — | 2 | 0.68 |
| XVIII | AH$_6$SP | 2 | 2 | 0.40 |
| XIX | None | — | 2 | 0.70 |
| XX | None | — | 2 | 0.85 |
| X = OC(=O)OR$_3$ | | | | |
| 7-1 | H$_2$SO$_4$ and 5% copper naphthenate | 1 .05 | 1 | 0.58 |
| 7-2 | H$_2$SO$_4$ and 5% copper naphthenate | 1 .05 | 1 | 0.64 |
| 7-3 | H$_2$SO$_4$ and 5% copper naphthenate | 1 .15 | 1 | 0.60 |
| 7-4 | H$_2$SO$_4$ 5% copper naphthenate | 1 .15 | 1 | 1.00 |

EXAMPLE XXVII

Polymerization of Vinyl Chloride

1-Isopropylazo-1-(t-butylperoxy)cyclohexane of Example VIII was used as an initiator in the polymerization of vinyl chloride using the well known bottle polymerization technique at autogenous pressures. The formulation used in evaluation is set out below:

| | |
|---|---|
| Vinyl chloride monomer | 100 grams |
| Water (distilled) | 210 ml |
| Methocel* (1500 cps) (1% solution) | 20 ml |
| Sorbitan monostearate (1% solution) | 10 ml |
| Polyoxyethylene sorbitan monostearate (1% solution) | 10 ml |
| Crude 1-Isopropylazo-1-(t-butylperoxy)-cyclohexane | Variable |

*A commercial hydroxypropyl methylcellulose product

A water suspension was prepared as set out in the above formulation and added to a 24 ounce beverage bottle which was then frozen at −20° C. A series of bottles was prepared and varying amounts of the initiator added, followed by the freshly distilled vinyl chloride. The bottles were capped and placed in a water bath thermostatted at 50° C. The bath was equipped to cause the rotation of the bottles end over end. After the polymerization had continued at 50° C for 8 hours, the bottles were cooled, vented of excess vinyl chloride monomer, and the yield of polyvinyl chloride determined gravimetrically. The % conversion of vinyl chloride monomer to poly(vinyl chloride) was then calculated. The following results were obtained:

| Grams of Initiator/100 grams Vinyl Chloride | % Conversion |
|---|---|
| 0.0152 g. | 32.6% |
| 0.0197 g. | 40.8% |
| 0.0256 g. | 45.8% |
| 0.0302 g. | 54.6% |
| 0.0355 g. | 62.8% |
| 0.0408 g. | 61.8% |
| 0.0454 g. | 75.6% |
| 0.0497 g. | 82.2% |

What is claimed is:

1. A process which comprises polymerizing ethylenically unsaturated monomer in the presence of an initiating amount of a compound of the formula

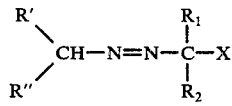

where:
R' and R'' are separately selected from alkyl of 1–12 carbons, cycloalkyl of 3–12 carbons, and aralkyl of 7–12 carbons, or join to form cycloalkyl of 3–12 carbons, and R'' is further selected from aryl of 6–14 carbons;

$R_1$ and $R_2$ are separately selected from alkyl of 1–8 carbons, cycloalkyl of 3–12 carbons and aralkyl of 7–12 carbons or join to form cycloalkyl of 4–12 carbons, and $R_2$ is further selected from aryl of 6–14 carbons;

X is selected from —Cl, —Br, —CN, —C(=O)NH$_2$, —C(=NOH)NH$_2$, —OH, —OR$_3$, —OC(=O)OR$_3$, —OOR$_5$, —SR$_6$, —N$_3$, —SCN, —NCX', —NHC(=X')OR$_3$, —NHC(=X')N(R$_8$)R$_9$, —NHC(=X')NHNHC(=X')R$_4$,
—NHC(=X')NHN(R$_8$)C(=X')N(R$_8$)R$_9$,
—NHC(=X')N(NH$_2$)R$_{10}$,
—NHC(=X')NHNHR$_{16}$,
—NHC(=X')NHN(R'$_8$)R'$_9$,
—NHC(=X')NHNHC(=X')X'R$_3$, and

X' is oxygen or sulfur;

$R_3$ and $R_4$ are separately selected from alkyl of 1–12 carbons, cycloalkyl of 3–12 carbons, aralkyl of 7–12 carbons, and aryl of 6–14 carbons, and $R_4$ is further selected from hydrogen;

$R_5$ is tertiary alkyl of 4–12 carbons or tertiary phenalkyl of 9–12 carbons;

$R_6$ is selected from alkyl of 1–12 carbons, cycloalkyl of 3–12 carbons, and aryl of 6–14 carbons;

$R_8$, $R_9$, $R'_8$ and $R'_9$ are separately selected from alkyl of 1–8 carbons, cycloalkyl of 3–12 carbons, aralkyl of 7–12 carbons, and aryl of 6–14 carbons or $R_8$ and $R_9$ or $R'_8$ and $R'_9$ taken together form alkylene of 3–11 carbons, and $R_8$ and $R_9$ are further selected from hydrogen;

$R_{10}$ is primary or secondary alkyl of 1–12 carbons or cycloalkyl of 3–12 carbons;

$R_{15}$ is aryl of 6–10 carbons; and $R_{16}$ is selected from hydrogen, tertiary alkyl of 4–8 carbons, tertiary aralkyl of 9–12 carbons, and aryl of 6–14 carbons.

2. A process which comprises polymerizing ethylenically unsaturated monomer in the presence of an initiating amount of a compound of the formula

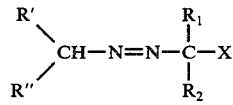

where:
R' and R'' are separately selected from alkyl of 1–12 carbons, cycloalkyl of 3–12 carbons, and aralkyl of 7–12 carbons, or join to form cycloalkyl of 3–12 carbons, and R'' is further selected from aryl of 6–14 carbons;

$R_1$ and $R_2$ are separately selected from alkyl of 1–8 carbons, cycloalkyl of 3–12 carbons and aralkyl of 7–12 carbons, or join to form cycloalkyl of 4–12 carbons, and $R_2$ is further selected from aryl of 6–14 carbons;

X is selected from —CN, —C(=O)NH$_2$, —C(=NOH)NH$_2$, —OH, —OR$_3$, —OOR$_5$, —SR$_6$, —N$_3$, —SCN, —NCX', X' is oxygen or sulfur;

$R_3$ is selected from alkyl of 1–12 carbons, cycloalkyl of 3–12 carbons, aralkyl of 7–12 carbons, and aryl of 6–14 carbons;

$R_5$ is tertiary alkyl of 4–12 carbons or tertiary aralkyl of 9–12 carbons; and $R_6$ is alkyl of 1–12 carbons, cycloalkyl of 3–12 carbons or aryl of 6–14 carbons.

3. A process as in claim 2 wherein X is —CN, —C(=O)NH$_2$, —C(=NOH)NH$_2$, —OOR$_5$, —N$_3$, —SCN, or —NCX'.

4. A process as in claim 2 wherein X is —CN, —OOR$_5$ or —N$_3$.

5. A process as in claim 4 where the compound is 2-cyclohexylazo-2-cyano-4-methylpentane.

6. A process as in claim 4 where the compound is 1-isopropylazo-1-(t-butylperoxy)cyclohexane.

7. A process as in claim 2 where the monomer is styrene.

8. The process of claim 2 wherein the monomer is vinyl chloride.

* * * * *